US009959581B2

(12) United States Patent
Pershing

(10) Patent No.: US 9,959,581 B2
(45) Date of Patent: May 1, 2018

(54) PROPERTY MANAGEMENT ON A SMARTPHONE

(71) Applicant: Eagle View Technologies, Inc., Redmond, WA (US)

(72) Inventor: Chris Pershing, Redmond, WA (US)

(73) Assignee: Eagle View Technologies, Inc., Bothell, WA (US)

(*) Notice: Subject to any disclaimer, the term of this patent is extended or adjusted under 35 U.S.C. 154(b) by 0 days. days.

(21) Appl. No.: 13/844,552

(22) Filed: Mar. 15, 2013

(65) Prior Publication Data
US 2014/0279593 A1  Sep. 18, 2014

(51) Int. Cl.
G06Q 50/16 (2012.01)
G06Q 10/10 (2012.01)

(52) U.S. Cl.
CPC ........... *G06Q 50/163* (2013.01); *G06Q 10/10* (2013.01)

(58) Field of Classification Search
USPC ... 705/1.1, 80, 300–318, 329, 342, 348, 500
See application file for complete search history.

(56) References Cited

U.S. PATENT DOCUMENTS

| 2,791,151 | A | 5/1957 | Pennington |
| 3,617,016 | A | 11/1971 | Bolsey |
| 5,247,356 | A | 9/1993 | Ciampa |
| 5,379,105 | A | 1/1995 | Iki et al. |
| 5,596,494 | A | 1/1997 | Kuo |
| 5,633,946 | A | 5/1997 | Lachinski et al. |
| 5,633,995 | A | 5/1997 | McClain |
| 5,983,010 | A | 11/1999 | Murdock et al. |
| 6,323,885 | B1 | 11/2001 | Wiese |
| 6,333,749 | B1 | 12/2001 | Reinhardt et al. |
| 6,385,541 | B1 | 5/2002 | Blumberg et al. |
| 6,396,491 | B2 | 5/2002 | Watanabe et al. |
| 6,446,053 | B1 | 9/2002 | Elliott |
| 6,448,964 | B1 | 9/2002 | Isaacs et al. |
| 6,496,184 | B1 | 12/2002 | Freeman et al. |
| 6,636,803 | B1 | 10/2003 | Hartz, Jr. et al. |
| 6,836,270 | B2 | 12/2004 | Du |
| 6,980,690 | B1 | 12/2005 | Taylor et al. |
| 7,003,400 | B2 | 2/2006 | Bryant |
| 7,006,977 | B1 | 2/2006 | Attra et al. |
| 7,133,551 | B2 | 11/2006 | Chen et al. |
| 7,233,691 | B2 | 6/2007 | Setterholm |

(Continued)

FOREIGN PATENT DOCUMENTS

| AU | 2008230031 B8 | 11/2009 |
| CA | 2191954 A1 | 12/1995 |

(Continued)

OTHER PUBLICATIONS

"Updating App Resources from server in iOS," Mar. 11, 2013.*

(Continued)

Primary Examiner — Aryan Weisenfeld
(74) Attorney, Agent, or Firm — Dunlap Codding, P.C.

(57) ABSTRACT

Systems and methods are disclosed for a property management system that runs on a smartphone and allows users to identify and track information on one or more properties and to receive property updates from the server. Systems and methods are also disclosed that use the orientation of and images captured by a smartphone camera to identify a facet of an object and to determine its pitch.

18 Claims, 49 Drawing Sheets

(56) References Cited

U.S. PATENT DOCUMENTS

| | | | |
|---|---|---|---|
| 7,305,983 B1 | 12/2007 | Meder et al. | |
| 7,324,666 B2 | 1/2008 | Zoken et al. | |
| 7,327,880 B2 | 2/2008 | Tek | |
| 7,333,963 B2 | 2/2008 | Widrow et al. | |
| 7,343,268 B2 | 3/2008 | Kishikawa | |
| 7,373,303 B2 | 5/2008 | Moore et al. | |
| 7,424,133 B2 | 9/2008 | Schultz et al. | |
| 7,460,214 B2 | 12/2008 | Schiavi | |
| 7,487,114 B2 | 2/2009 | Florance et al. | |
| 7,500,391 B2 | 3/2009 | Woro | |
| 7,509,241 B2 | 3/2009 | Guo et al. | |
| 7,519,206 B2 | 4/2009 | Mulet-Parada et al. | |
| 7,583,275 B2 | 9/2009 | Neumann et al. | |
| 7,629,985 B2 | 12/2009 | McArdle et al. | |
| 7,639,842 B2 | 12/2009 | Kelle et al. | |
| 7,728,833 B2 | 6/2010 | Verma et al. | |
| 7,752,018 B2 | 7/2010 | Rahmes et al. | |
| 7,787,659 B2 | 8/2010 | Schultz et al. | |
| 7,844,499 B2 | 11/2010 | Yahiro et al. | |
| 7,869,944 B2 | 1/2011 | Deaton et al. | |
| 7,873,238 B2 | 1/2011 | Schultz et al. | |
| 7,920,963 B2 | 4/2011 | Jouline et al. | |
| 7,991,226 B2 | 8/2011 | Schultz et al. | |
| 7,995,799 B2 | 8/2011 | Schultz et al. | |
| 7,995,862 B2 | 8/2011 | Tao et al. | |
| 8,051,089 B2 | 11/2011 | Gargi et al. | |
| 8,068,643 B2 | 11/2011 | Schultz et al. | |
| 8,078,436 B2 | 12/2011 | Pershing et al. | |
| 8,081,798 B2 | 12/2011 | Paglieroni et al. | |
| 8,081,841 B2 | 12/2011 | Schultz et al. | |
| 8,131,514 B2 | 3/2012 | Royan et al. | |
| 8,145,578 B2 | 3/2012 | Pershing et al. | |
| 8,170,840 B2 | 5/2012 | Pershing | |
| 8,204,341 B2 | 6/2012 | Schultz et al. | |
| 8,209,152 B2 | 6/2012 | Pershing | |
| 8,233,666 B2 | 7/2012 | Schultz et al. | |
| 8,385,672 B2 | 2/2013 | Giuffrida et al. | |
| 8,401,222 B2 | 3/2013 | Thornberry et al. | |
| 8,417,061 B2 | 4/2013 | Kennedy et al. | |
| 8,624,920 B2 * | 1/2014 | Fujinaga | H04N 1/3871 345/440 |
| 2002/0101594 A1 | 8/2002 | Slatter | |
| 2002/0143669 A1 | 10/2002 | Scheer | |
| 2002/0154174 A1 | 10/2002 | Redlich et al. | |
| 2003/0028393 A1 | 2/2003 | Coulston et al. | |
| 2003/0103651 A1 | 6/2003 | Novak | |
| 2003/0171957 A1 | 9/2003 | Watrous | |
| 2003/0233310 A1 | 12/2003 | Stavrovski | |
| 2004/0128313 A1 | 7/2004 | Whyman | |
| 2005/0267657 A1 | 12/2005 | Devdhar | |
| 2005/0288959 A1 | 12/2005 | Eraker et al. | |
| 2006/0137736 A1 | 6/2006 | Nishitani et al. | |
| 2006/0169775 A1 | 8/2006 | Gray et al. | |
| 2006/0200311 A1 | 9/2006 | Arutunian et al. | |
| 2006/0232605 A1 | 10/2006 | Imamura | |
| 2006/0235611 A1 | 10/2006 | Deaton et al. | |
| 2006/0262112 A1 | 11/2006 | Shimada | |
| 2006/0265287 A1 | 11/2006 | Kubo | |
| 2007/0179757 A1 | 8/2007 | Simpson | |
| 2008/0089610 A1 | 4/2008 | Tao et al. | |
| 2008/0162380 A1 | 7/2008 | Suga et al. | |
| 2008/0204570 A1 | 8/2008 | Schultz et al. | |
| 2008/0221843 A1 | 9/2008 | Shenkar et al. | |
| 2008/0231700 A1 | 9/2008 | Schultz et al. | |
| 2008/0262789 A1 | 10/2008 | Pershing et al. | |
| 2009/0046759 A1 | 2/2009 | Lee et al. | |
| 2009/0085915 A1 | 4/2009 | Kelley et al. | |
| 2009/0141020 A1 | 6/2009 | Freund et al. | |
| 2009/0216552 A1 | 8/2009 | Watrous | |
| 2009/0225026 A1 * | 9/2009 | Sheba | G06F 1/1626 345/156 |
| 2009/0304227 A1 | 12/2009 | Kennedy et al. | |
| 2010/0034483 A1 | 2/2010 | Giuffrida et al. | |
| 2010/0110074 A1 | 5/2010 | Pershing | |
| 2010/0241406 A1 | 9/2010 | Rahmes et al. | |
| 2010/0296693 A1 | 11/2010 | Thornberry et al. | |
| 2011/0086201 A1 | 4/2011 | Shiao et al. | |
| 2011/0096083 A1 | 4/2011 | Schultz | |
| 2011/0187713 A1 | 8/2011 | Pershing et al. | |
| 2011/0205245 A1 | 8/2011 | Kennedy et al. | |
| 2011/0216962 A1 | 9/2011 | Kim et al. | |
| 2012/0007982 A1 | 1/2012 | Giuffrida et al. | |
| 2012/0035887 A1 * | 2/2012 | Augenbraun et al. | 703/1 |
| 2012/0170797 A1 | 7/2012 | Pershing et al. | |
| 2012/0179431 A1 | 7/2012 | Labrie et al. | |
| 2012/0191424 A1 | 7/2012 | Pershing et al. | |
| 2012/0209782 A1 | 8/2012 | Pershing et al. | |
| 2012/0223965 A1 | 9/2012 | Pershing | |
| 2012/0224770 A1 | 9/2012 | Strassenburg-Kleciak | |
| 2013/0202157 A1 | 8/2013 | Pershing | |
| 2013/0204575 A1 | 8/2013 | Pershing | |
| 2013/0226515 A1 | 8/2013 | Pershing et al. | |
| 2013/0262029 A1 | 10/2013 | Pershing | |
| 2014/0177945 A1 | 6/2014 | Pershing et al. | |
| 2015/0181123 A1 * | 6/2015 | Pacurariu | H04N 5/3454 348/208.2 |

FOREIGN PATENT DOCUMENTS

| | | |
|---|---|---|
| CN | 102194120 A | 9/2011 |
| DE | 198 57 667 A1 | 8/2000 |
| EP | 1 010 966 B1 | 10/2002 |
| EP | 1 619 610 A1 | 1/2006 |
| EP | 2 251 833 A2 | 11/2010 |
| WO | 00/29806 A2 | 5/2000 |
| WO | 2005/124276 A2 | 12/2005 |
| WO | 2006/040775 A2 | 4/2006 |
| WO | 2006/090132 A2 | 8/2006 |
| WO | 2011/094760 A2 | 8/2011 |

OTHER PUBLICATIONS

"How to calculate roof pitches in 3D from 2D drawings," Dec. 17, 2007.*
PitchGauge, 2012.*
Roofsnap.*
"3D Reconstruction," retrieved Oct. 25, 2013, from http://www8cs.umu.se/kurser/TDBD19/V705/reconstruct-4.pdf, 5 pages.
"8. Epipolar Geometry and the Fundamental Matrix," retrieved Oct. 25, 2013, from http://www.robtos.ox.ac.uk/~vgg/hzbook/hzbook1/HZepipolar.pdf, 25 pages.
"AeroDach® Online Roof Evaluation Standard Delivery Format and 3D Data File," Document Version 01.00.2002 with alleged publication in 2002, 21 pages.
"AeroDach® Online Dachauswertung: Standardlieferformat and 3D-Datensatz," AEROWEST GMBH, Version 01.00.2002, 6 pages.
"AERODACH® Online Roof Analysis: Standard Delivery Format and 3D Dataset," AEROWESTGmbH, Version as of Jan. 2002, 6 pages.
"AppliCad Software and EagleView® Technologies Partner for Metal Roofing Contractors," EagleView Technologies and AppliCad Software, retrieved from blog.eagleview.com/?=614 on Feb. 1, 2012, 2 pages.
"Definitions of Surveying and Associated Terms," American Congress on Surveying and Mapping, reprinted 1989, p. 3, 2 pages.
"Glossary of the Mapping Sciences," American Society of Civil Engineering, ASCE Publications, 1994, pp. 9-10, 3 pages.
"Microsoft's MSN Virtual Earth: The Map is the Search Platform," Directions Magazine URL=http://www.directionsmag.com/article.php?article_id=873&trv=1, retrieved Feb. 6, 2009, 10 pages.
"Photo Tours Google," Web Search, retrieved Oct. 25, 2013, from http://www.google.com/search?q=photo+tours=google, 2 pages.
"Pictometry—In the News," URL=http://204.8.121.114/pressrelease%20archived/pressrelease_aec.asp, retrieved Feb. 6, 2009, 3 pages.
"Software; New Products," LexisNexis Roofing Contractor article 23(2):121(2), Jan. 3, 2006, 1 page.
"Sorcerer: Nobody builds roofs like this builds roofs," retrieved from URL=http://web.archive.org/web/2006021409237/http://www.applicad.com.au/product-features . . . on Mar. 29, 2012, 2 pages.

(56) References Cited

OTHER PUBLICATIONS

Aerodach, "Protokoll zur Dachauswertung," Oct. 19, 2010, 12 pages.
Aerowest GMBH, "AeroDach—das patentierte Dachaumass," Jan. 1, 2006, retrieved from URL=http://web.archive.org/web/20060101021543/http://www.aerowest.de/aerodach.html on Mar. 25, 2012, 2 pages.
AEROWEST GMBH, "Aerowest Pricelist of Geodata," Oct. 21, 2005, 2 pages.
AEROWEST GMBH, "Geodata Service; AeroDach—Patented Roof Dimensions," Jan. 1, 2006, retrieved from URL=http://web.archive.org/web/20060101021543/http://www.aerowest.de/aerodach.html, on Mar. 25, 2012, 2 pages.
AEROWEST GMBH. "Preisliste Geodaten Aerowest," Oct. 21, 2005, 1 page.
Agarwal et al., "Reconstructing Rome," *IEEE Computer* 43(6): 40-47, Jun. 2010.
Agarwal et al., "Building Rome in a Day," *Communications of the ACM* 54(10): 105-112, Oct. 2011.
Agarwala et al., "Interactive Digital Photomontage," ACM SIGGPRAH 2004, Los Angeles, CA, Aug. 2004, 9 pages.
Agarwala et al., "Panoramic Video Textures," SIGGRAPH 2005, Los Angeles, CA, Aug. 2005, 8 pages.
Appli-cad Australia, "Linear Nesting Reports," AppliCad Sample Reports, Jul. 18, 2000, 9 pages.
Appli-cad Australia, "Roof Magician: Especially suited to single, shake and tile roofing," Sample Reports, Jun. 24, 2004, 13 pages.
Appli-cad Australia, "Roof Wizard: Advanced Software for Roof Modeling and Estimating," Document Issue 1.0.0, Sep. 25, 2004, 10 pages.
Appli-cad Australia, "Roof Wizard: Especially suited to metal roofing," Generate Offcuts Reports, Mar. 9, 2005, 7 pages.
Appli-cad Australia, "Roof Wizard: Especially suited to metal roofing," Generate Offcuts Reports, Sep. 14, 2006, 7 pages.
Appli-cad Australia, "Roof Wizard: Especially suited to metal roofing," Sample Reports, Jul. 13, 2004, 24 pages.
Appli-cad Australia, "Roof Wizard: Especially suited to metal roofing," Sample Reports, Sep. 17, 2002, 12 pages.
Appli-cad Australia, "Sorcerer: Advanced Software for Roof Modeling and Estimating," Reference Guide Version 3, Sep. 8, 1999, 142 pages.
Appli-cad Australia, "Sorcerer: The complete solution for professional roof estimating," Demonstration Kit, Mar. 9, 2005, 15 pages.
AppliCad Roofing, sample report dated Jul. 30, 2007, 1 page.
Applicad Roofing, sample report dated Mar. 2, 2005, 28 pages.
AppliCad USA, "Linear Nesting Reports," AppliCad Sample Reports, Nov. 25, 1999, 9 pages.
Applicad webpage 2005 snip different color lines, 1 page.
AppliCad, "Example Output and Brochures," retrieved from URL=http://www.applicad.com/au/product-reports.html on Apr. 16, 2012, 2 pages.
AppliCad, "Product Overview—Sorcerer: Advanced Software for Roofing Modeling, Estimating, Presentation and Installation," Issue 5, Mar. 2, 2001, 15 pages.
AppliCad, "Roofing Software: Product Bulletin Section 1—Modeling the Roof," Dec. 20, 2005, retrieved from URL=htpp://web.archive.org/web/20021122204408/http://www.applicad.com.au/ on Apr. 16, 2012, 3 pages.
AppliCad, "Roofing Software: Product Bulletin Section 1—Modeling the Roof," Jan. 7, 2002, retrieved from URL=htpp://web.archive.org/web/20021122204408/http://www.applicad.com.au/ on Apr. 16, 2012, 3 pages.
AppliCad, "Roofing Software: Product Bulletin Section 2—Modifying the Model," Dec. 20, 2005, retrieved from URL=http://web.archive.org/web/20051210130430/http://www.applicad.com.au/ on Apr. 16, 2012, 2 pages.
AppliCad, "RoofScape: Advanced Software for Roof Modeling and Estimating," Learning Guide (English Units), Revision 1.1, Aug. 2007, 48 pages.

Atkinson, "Therory of Close Range Photogrammetry," Chapter 2, Section 1, Coordinate Transformations, retrieved Oct. 21, 2013, from http://www.lems.brown.edu/vision/people/leymarie/Refs/Photogrammetry/Atkinson90/C . . . , 5 pages.
Australian Office Action for Australian Application No. 2010201839, dated Apr. 14, 2011, 2 pages.
Australian Office Action, dated Oct. 1, 2013, for Australian Application No. 2010219392, 4 pages.
Autodesk, "Autodesk ImageModeler—Features," retrieved on Sep. 30, 2008, from http:///usa.autodesk.com/adsk/servlet/index?siteID=123112&id=115639 . . . , 1 page.
Automatic House Reconstruction, retrieved on Sep. 29, 2008, from http://www.vision.ee.ethx.ch/projects/Amobe_I/recons.html, 7 pages.
Azuma et al., "View-dependent refinement of multiresolution meshes with subdivision connectivity," *Proceedings of the Second International Conference on Computer Graphics, Virtual Reality, Visualization, and Interaction (Afigraph 2003)*, Capetown, South Africa, Feb. 2003, pp. 69-78.
Baillard et al., :Automatic reconstruction of piecewise planar models from multiple views, CVPR99, vol. 2, 1999, pp. 559-565, 7 pages.
Bazaraa et al., *Nonlinear Programming Theory and Algorithms*, Second Edition, John Wiley & Sons, Inc., New York, 1993, 330 pages.
Bhat et al., "A Perceptually-Motivated Optimization-Framework for Image and Video Processing," Computer Science & Engineering Technical Report, UW-CSE-Aug. 6, 2002, University of Washington, Seattle, WA, Jun. 2008, 10 pages.
Bhat et al, "Fourier Analysis of the 2D Screened Poisson Equation for Gradient Domain Problems," ECCV 2008, 14 pages.
Bhat et al., "GradientShop: A Gradient-Domain Optimization Framework for Image and Video Filtering," ACM TOG 29(2), Mar. 2010, 14 pages.
Bhat et al., "Piecewise Image Registration in the Presence of Large Motions," CVPR 2006, New York, NY, Jun. 2006, 7 pages.
Bhat et al., "Using Photographs to Enhance Videos of a Static Scene," Eurographics Symposium on Rendering 2007, 12 pages.
Bignone et al., "Automatic Extraction of Generic House Roofs from High Resolution Aerial Imagery," *Proc. ECCV*, 1996, 12 pages.
Canadian Office Action, for Canadian Application No. 2,641,373, dated Jan. 9, 2012, 4 pages.
Canadian Office Action, dated Sep. 24, 2013, for Canadian Application No. 2,641,373, 4 pages.
Capell et al., "A Multiresolution Framework for Dynamic Deformations," Computer Science & Engineering Technical Report, UW-CSE-Feb. 4, 2002, University of Washington, Seattle, WA, Apr. 2002, 8 pages.
Chevrier et al., "Interactive 3D reconstruction for urban areas—An image based tool," *CAAD Futures*, 2001, 13 pages.
Chuang et al., "A Bayesian Approach to Digital Matting," IEEE Computer Vision and Pattern Recognition 2001, Kauai, Hawaii, Dec. 2001, 8 pages.
Chuang et al., "Animating Pictures with Stochastic Motion Textures," SIGGRAPH 2005, Los Angeles, CA, Aug. 2005, 8 pages.
Chuang et al., "Animating Pictures with Stochastic Motion Textures," Technical Report UW-CSE-Apr. 4, 2002, SIGGRAPH, Los Angeles, CA, Aug. 2005, 7 pages.
Chuang et al., "Environment Matting Extensions: Towards Higher Accuracy and Real-Time Capture," SIGGRAPH 2000, New Orleans, LA, Jul. 24-28, 2000, 11 pages.
Chuang et al., "Environment Matting Extensions: Towards Higher Accuracy and Real-Time Capture," Tech Report, SIGGRAPH 2000, New Orleans, LA, Jul. 24-28, 2000, 10 pages.
Chuang et al., "Shadow Matting and Compositing," SIGGRAPH 2003, San Diego, CA, Jul. 2003, 7 pages.
Ciarcia et al., "Automated Roof Identification Systems and Methods," U.S. Appl. No. 12/590,131, filed Nov. 2, 2009, 74 pages.
Ciarcia et al., "Automated Roof Identification Systems and Methods," U.S. Appl. No. 12/590,131, Notice of Allowance, dated Aug. 26, 2013, 9 pages.

(56) References Cited

OTHER PUBLICATIONS

Ciarcia et al., "Automated Roof Identification Systems and Methods," Office Action dated Jan. 9, 2013, for U.S. Appl. No. 12/590,131, 14 pages.

Ciarcia, "Systems and Methods for Point-to-Point Registration Using Perspective Imagery From Independent Sources Without Image Acquisition Metadata," U.S. Appl. No. 13/646,466, filed Oct. 5, 2012, 41 pages.

Colburn et al., "Image-Based Remodeling," IEEE Transactions on Visualization and Computer Graphics, vol. 19, No. 1, Jan. 2013, 11 pages.

Curless et al., "Better Optical Triangulation Through Spacetime Analysis," Computer Systems Laboratory Technical Report CSL-TR-95-667, Stanford University, Stanford, CA, Apr. 1995, 12 pages.

Curless et al., "Computer model and 3D fax of Happy Buddha," retrieved Oct. 25, 2013, from http://www-graphics.stanford.edu/projects/faxing/happy/, 4 pages.

Curless et al., "A Volumetric Method for Building Complex Models from Range Images," SIGGRAPH '96, New Orleans, LA, Aug. 4-9, 1996, 10 pages.

Curless et al., "Better Optical Triangulation through Spacetime Analysis," 1995 5$^{th}$ International Conference on Computer Vision, Boston, MA, Jun. 20-23, 1995, 8 pages.

Curless, "New Methods for Surface Reconstruction from Range Images," Dissertation, Submitted to the Department of Electrical Engineering and the Committee of Graduate Studies of Stanford University, Jun. 1997, 209 pages.

Curless, "From Range Scans to 3D Models," *ACM SIGGRAPH Computer Graphics* 33(4): 38-41, 1999.

Debevec et al., "Modeling and Rendering Architecture from Photographs: A hybrid geometry—and image-based approach," *SIGGRAPH conference proceedings*, retrieved from www.cs.berkeley.edu/~malik/papers/debevecTM96.pdf., 1996, 10 pages.

Delaney, "Searching for Clients From Above—More Small Businesspeople Use Aerial Mapping Services to Scout Potential Customers," *The Wall Street Journal*, Jul. 31, 2007, retrieved on Feb. 25, 2010, from http://online.wsj.com/public/article/SB118584306224482891.html?mod=yahoo_free, 3 pages.

Drawing received Jan. 31, 2012.

*Eagle View Tech.* v. *Aerialogics LLC*, Case No. 2:12-cv-00618-RAJ, Prior Art Presentation, Aug. 17, 2012, 61 pages.

ECE 390, Introduction to Optimization, Spring 2004, Introductory Course, retrieved Oct. 25, 2013, from http://liberzon.csl.illinois.edu/04ECE390.html, 1 page.

Ekman, "Price Estimation Tool," Office Action for U.S. Appl. No. 13/843,437, dated Aug. 14, 2013, 9 pages.

Falkner et al., *Aerial Mapping 2nd Edition*, Lewis Publishers (CRC Press LLC), 2002, "Chapter 11—Aerotriangulation," 23 pages.

Faugeras et al., "3-D reconstruction of Urban Scenes from Sequences of Images," Institut National De Recherche En Informatique Et En Automatique, No. 2572, Jun. 1995, 27 pages.

Faugeras, "What can be seen in three dimensions with an uncalibrated stereo rig?," *Computer Vision—ECCV'92*: 563-578, 1992. (18 pages).

Fisher et al., *Dictionary of Computer Vision and Image Processing*, John Wiley & Sons, Ltd., West Sussex, England, 2005, 182 pages.

Fritsch, "Introduction into Digital Aerotriangulation," Photogrammetric Week '95, Wichman Verlag, Heidelberg, 1995, pp. 165-171, 7 pages.

Furukawa et al., "Manhattan-world Stereo," CVPR 2009, Miami, Florida, Jun. 2009, 8 pages.

Furukawa et al., "Reconstructing Building Interiors from Images," ICCV 2009, Kyoto, Japan, Sep. 2009, 8 pages.

Furukawa et al, "Towards Internet-scale Multi-view Stereo," CVPR 2010, Jun. 2010, 8 pages.

Georgeiv et al., "Spatio-Angular Resolution Tradeoff in Integral Photography," Proceedings of Eurographics Symposium on Rendering, 2006, 10 pages.

GEOSPAN Corporation, "Digital Geo-Referenced Oblique Aerial Imagery Solution EPP-REP No. 8444 5/13," GEO-NY0000868, 2007, 28 pages.

Goesele et al., "Multi-View Stereo for Community Photo Collections," Proceedings of ICCV 2007, Rio de Janeiro, Brazil, Oct. 2007, 8 pages.

Goesele et al., "Multi-View Stereo Revisited," CVPR 2006, New York, NY, Jun. 2006, 8 pages.

Goldman et al., "Interactive Video Object Annotation," Computer Science & Engineering Technical Report, UW-CSE-Jul. 4, 2001, University of Washington, Seattle, WA, Apr. 2007, 7 pages.

Goldman et al., "Schematic Storyboarding for Video Editing and Visualization." SIGGRAPH 2006, Boston, MA, Aug. 2006, 10 pages.

Goldman et al., "Shape and Spatially-Varying BRDFs From Photometric Stereo," IEEE Transactions on Pattern Analysis and Machine Intelligence, vol. 32, No. 6, Jun. 2010, 12 pages.

Goldman et al., "Shape and Spatially-Varying BRDFs From Photometric Stereo," ICCV 2005, Beijing, China, Oct. 2005, 8 pages.

Goldman et al., "Video Object Annotation, Navigation, and Composition," UIST 2008, 10 pages.

Gonzalez et al., *Digital Image Processing*, Addison-Wesley Publishing Company, Inc., Reading, Massachusetts, 1993, 372 pages.

Gülch et al., "On the Performance of Semi-Automatic Building Extraction," In the International Archives of Photogrammetry and Remote Sensing, vol. 23, 8 pages, 1998.

Gupta et al., "Enhancing and Experiencing Spacetime Resolution with Videos and Stills," Computer Science & Engineering Technical Report, UW-CSE-Apr. 8, 2001, University of Washington, Seattle, WA, Apr. 2008, 6 pages.

Gupta et al., "DuploTrack: A Real-time System for Authoring and Guiding Duplo Block Assembly," UIST 2012, Boston, MA, Oct. 2012, 13 pages.

Gupta et al., "Enhancing and Experiencing Spacetime Resolution with Video and Stills," ICCP 2009, San Francisco, CA, Apr. 2009, 9 pages.

Gupta et al., "Single Image Deblurring Using Motion Density Functions," ECCV 2010, Crete, Greece, Sep. 2010, 14 pages.

Hartley et al., "2.4 A Hierarchy of Transformations", Multiple View Geometry in Computer Vision, Cambridge University Press, Second Edition, 2003, 9 pages.

Hartley et al., "Appendix 6: Iterative Estimation Methods," Multiple View Geometry in Computer Vision, Cambridge University Press, Second Edition, 2003, 34 pages.

Hartley et al., "Invariant and Calibration-Free Methods in Scene Reconstruction and Object Recognition," Final Technical Report, Feb. 28, 1997, 266 pages.

Hartley et al., *Multiple View Geometry in Computer Vision*, Second Edition, Cambridge University Press, Cambridge, England, 2003, 672 pages.

Held et al., "3D Puppetry: A Kinect-based Interface for 3D Animation," UIST 2012, Boston, MA, Oct. 2012, 11 pages.

Henricsson et al., "3-D Building Reconstruction with ARUBA: A Qualitative and Quantitative Evaluation," Institute of Geodesy and Photogrammerty, Swiss Federal Institute of Technology, 2001, 13 pages.

Hudson, "Merging VRML Models: Extending the Use of Photomodeller," Thesis, in TCC 402, Presented to the Faculty of the School of Engineering and Applied Science, University of Virginia, Mar. 23, 1998, 23 pages.

International Preliminary Report on Patentability for International Application No. PCT/US2011/023408, dated Aug. 16, 2012, 7 pages.

International Search Report and Written Opinion for International Application No. PCT/US2013/023502, dated Apr. 30, 2013, 8 pages.

International Search Report for International Application No. PCT/US11/23408, dated Aug. 11, 2011, 2 pages.

International Search Report for International Application No. PCT/US2013/023503, dated Apr. 30, 2013, 5 pages.

International Search Report and Written Opinion for International Application No. PCT/US2013/024523, dated Nov. 13, 2013, 15 pages.

(56) References Cited

OTHER PUBLICATIONS

Kolman, "Chapter 4, Linear Transformations and Matrices, 4.1: Definition and Examples," Elementary Linear Algebra, Second Edition, Macmillan Publishing Co,. Inc., 1997, 12 pages.
KP Building Products, "Vinyl Siding Estimating and Installation Guide," 2007, 32 pages.
Krainin et al., "Autonomous Generation of Complete 3D Object Models Using Next Best View Manipulation Planning," ICRA 2011, Shanghai, China, May 2011, 7 pages.
Kushal et al., "Photo Tours," 3DimPVT, Oct. 2012, 8 pages.
Levoy et al., "The Digital Michelangelo Project: 3D Scanning of Large Statues," SIGGRAPH 2000, New Orleans, LA, Jul. 24-28, 2000, 14 pages.
Levoy, "The Digital Michelangelo Project," retrieved Oct. 25, 2013, from http://www-graphics.stanford.edu/projects/mich/, 10 pages.
Li et al., "Automated Generation of Interactive 3D Exploded View Diagrams," ACM Transactions on Graphics 27(3), SIGGRAPH 2007, Aug. 2007, 7 pages.
Li et al., "Interactive Cutaway Illustration of Complex 3D Models," ACM Transactions on Graphics 26(3), SIGGRAPH 2007, Aug. 2007, 11 pages.
Lueders, "Infringement Allegations by EagleView Technologies," Feb. 10, 2009, 3 pages.
Mahajan et al., "A Theory of Frequency Domain Invariants: Spherical Harmonic Identities for BRDF / Lighting Transfer and Image Consistency," IEEE Pattern Analysis and Machine Intelligence, 30(2), Feb. 2008, 14 pages.
Mahajan et al., "A Theory of Spherical Harmonic Identities for BRDF/Lighting Transfer and Image Consistency," ECCV 2006, Graz, Austria, May 2006, 14 pages.
Mann, "Roof with a view," *Contract Journal* 431(6552):29, Nov. 23, 2005, 2 pages.
Mikhail et al., *Introduction to Modern Photogrammetry*, John Wiley & Sons, Inc., New York, 2001, 247 pages.
Miller et al., "Miller's Guide to Framing and Roofing," McGraw Hill, New York, pp. 131-136 and 162-163, 2005, 9 pages.
Minialoff, "Introduction to Computer Aided Design," Apr. 2000, 4 pages.
Noronha et al., "Detection and Modeling of Buildings from Multiple Aerial Images," Institute for Robotics and Intelligent Systems, University of Southern California, Nov. 27, 2001, 32 pages.
Noronha et al., "Detection and Modeling of Buildings from Multiple Aerial Images," *IEEE Transactions on Pattern Analysis and Machine Intelligence* 23(5):501-518, 2001, 32 pages.
Office Action received in Reexamination of U.S. Pat. No. 8,078,436 B2, Supplemental Reexamination Patent, dated Jul. 25, 2013, 72 pages.
Office Action received in Reexamination of U.S. Pat. No. 8,145,578 B2, Supplemental Reexamination Patent, dated Jul. 25, 2013, 24 pages.
Pershing et al., "Aerial Roof Estimation System and Method," Amendment in Response to Office Action received in Reexamination of U.S. Pat. No. 8,145,578 B2, Control No. 96/000,005, filed Oct. 25, 2013, 318 pages.
Pershing et al., "Aerial Roof Estimation System and Method," Amendment in Response to Office Action received in Reexamination of U.S. Pat. No. 8,078,436 B2, Control No. 96/000,004, filed Oct. 25, 2013, 229 pages.
Pershing et al., "Aerial Roof Estimation System and Method," Notice of Allowance dated Feb. 3, 2012, for U.S. Appl. No. 12/148,439, 35 pages.
Pershing et al., "Aerial Roof Estimation System and Method," Office Action dated Apr. 25, 2011, for U.S. Appl. No. 12/148,439, 52 pages.
Pershing et al., "Aerial Roof Estimation System and Method," Office Action dated Aug. 16, 2010, for U.S. Appl. No. 12/148,439, 47 pages.
Pershing et al., "Aerial Roof Estimation System and Method," Office Action dated Aug. 25, 2011, for U.S. Appl. No. 12/148,439, 77 pages.
Pershing et al., "Aerial Roof Estimation System and Method," Office Action dated Oct. 10, 2012, for U.S. Appl. No. 13/371,271, 7 pages.
Pershing et al., "Aerial Roof Estimation System and Method," Notice of Allowance dated Jul. 29, 2013, for U.S. Appl. No. 13/371,271, 15 pages.
Pershing et al., "Aerial Roof Estimation System and Method," U.S. Appl. No. 60/925,072, filed Apr. 17, 2007, 16 pages.
Pershing et al., "Aerial Roof Estimation System and Methods," Office Action dated Aug. 28, 2012, for U.S. Appl. No. 13/287,954, 12 pages.
Pershing et al., "Aerial Roof Estimation System and Methods," Office Action dated May 22, 2013, for U.S. Appl. No. 13/287,954, 25 pages.
Pershing et al., "Aerial Roof Estimation Systems and Methods," Notice of Allowance dated Oct. 14, 2011, for U.S. Appl. No. 12/253,092, 30 pages.
Pershing et al., "Aerial Roof Estimation Systems and Methods," Office Action dated May 10, 2011, for U.S. Appl. No. 12/253,092, 26 pages.
Pershing et al., "Automated Techniques for Roof Estimation," U.S. Appl. No. 61/197,072, filed Oct. 31, 2008, 32 pages.
Pershing et al., "Geometric Correction of Rough Wireframe Models Derived From Photographs," U.S. Appl. No. 61/300,414, filed Feb. 1, 2010, 22 pages.
Pershing, "Concurrent Display Systems ANF Methods for Aerial Roof Estimation," Notice of Allowance dated Feb. 16, 2012, for U.S. Appl. No. 12/467,250, 19 pages.
Pershing, "Concurrent Display Systems ANF Methods for Aerial Roof Estimation," Office Action dated Sep. 7, 2011, for U.S. Appl. No. 12/467,250, 14 pages.
Pershing, "Concurrent Display Systems and Methods for Aerial Roof Estimation," Office Action dated Aug. 28, 2012, for U.S. Appl. No. 13/474,504, 8 pages.
Pershing, "Concurrent Display Systems and Methods for Aerial Roof Estimation," Office Action dated Jun. 19, 2013, for U.S. Appl. No. 13/474,504, 14 pages.
Pershing, "Pitch Determination Systems and Methods for Aerial Roof Estimation," Notice of Allowance dated Feb. 16, 2012, for U.S. Appl. No. 12/467,244, 20 pages.
Pershing, "Pitch Determination Systems and Methods for Aerial Roof Estimation," Office Action for U.S. Appl. No. 13/438,288, dated Aug. 24, 2012, 8 pages.
Pershing, "Pitch Determination Systems and Methods for Aerial Roof Estimation," Office Action dated May 21, 2013, for U.S. Appl. No. 13/438,288, 11 pages.
Pershing, "Pitch Determination Systems and Methods for Aerial Roof Estimation," Office Action dated Aug. 26, 2011, for U.S. Appl. No. 12/467,244, 17 pages.
Pershing, "Systems and Methods for Estimation of Building Floor Area," U.S. Appl. No. 13/385,607, filed Feb. 3, 2012, 41 pages.
Pershing, "Systems and Methods for Estimation of Building Floor Area," U.S. Appl. No. 13/757,712, filed Feb. 1, 2013, 95 pages.
Pershing, "Systems and Methods for Estimation of Building Wall Area," U.S. Appl. No. 13/757,694, filed Feb. 1, 2013, 96 pages.
Pershing, "User Interface Techniques for Roof Estimation," U.S. Appl. No. 61/197,904, filed Oct. 31, 2008, 62 pages.
Pershing et al., Aerial Roof Estimation System and Method, Notice of Allowance, for U.S. Appl. No. 13/371,271, dated Jul. 29, 2013, 15 pages.
Pershing et al., "Automated Roof Identification Systems and Methods," Notice of Allowance for U.S. Appl. No. 12/590,131, dated Aug. 26, 2013, 9 pages.
Pershing, "Systems and Methods for Estimation of Building Floor Area," Office Action for U.S. Appl. No. 13/757,712, dated Jul. 18, 2013, 18 pages.
Pershing, "Systems and Methods for Estimation of Building Wall Area," Office Action for U.S. Appl. No. 13/757,694, dated Oct. 8, 2013, 15 pages.
Pershing, "Systems and Methods for Estimation of Building Floor Area," Notice of Allowance for U.S. Appl. No. 13/757,712, dated Nov. 25, 2013, 15 pages.

(56) References Cited

OTHER PUBLICATIONS

PhotoModeler, "Measuring & Modeling the Real World," retrieved Sep. 30, 2008, from http://www.photomodeler.com/products/photomodeler.htm, 2 pages.
Pictometry Online, "Government" Oct. 7, 2008, retrieved Aug. 10, 2011, from http://web.archive.org/web/20081007111115/http://www.pictometry.com/government/prod . . . , 3 pages.
Pictometry, "Electronics Field Study™ Getting Started Guide," Version 2.7, Jul. 2007, 15 pages.
Pictometry, "FAQs," Sep. 22, 2008, retrieved on Aug. 10, 2011, from http://www.web.archive.org/web/20080922013233/http://www.pictometry.com/about_us/faqs.sht . . . , 3 pages.
Pictometry.com, "Frequently Asked Questions," May 24, 2005, retrieved Mar. 28, 2012, from URL=http://web.archive.org/web/20050524205653/http://pictometry.com/faq.asp, 9 pages.
Pictometry.com, "Frequently Asked Questions," retrieved on Apr. 9, 2011, from http://replay.waybackmachine.org/20050801231818/http:///www.pictometry.com/faq.asp, 10 pages.
Pictometry.com, "Frequently Asked Questions," retrieved on Aug. 1, 2005, from http://replay.waybackmachine.org/20050801231818/http:///www.pictometry.com/faq.asp, 10 pages.
Pictometry.com, "Frequently Asked Questions," retrieved on Feb. 10, 2012, from http://replay.waybackmachine.org/20050801231818/http:///www.pictometry.com/faq.asp, 6 pages.
Pictometry, "Frequently Asked Questions," Dec. 2006, retrieved Apr. 9, 2011, from http://replay.waybackmachine.org/20050801231818/http://www.pictometry.com/faq.asp, 10 pages.
Pictometry.com, "Pictometry Announces Software and Web-based Solution for Engineers, Architects, and Planners," Press Release, Jan. 22, 2004, 3 pages.
Poullis et al., "Photogrammetric Modeling and Image-Based Rendering for Rapid Virtual Environment Creation," http://handle.dtic.mil/100.2/ADA433420, 1998, 7 pages.
Precigeo.com, "Welcome to precigeoRoof," URL=http://web.archive.org/web/20070106063144/roof.precigeo.com, retrieved Apr. 30, 2009, 1 page.
Precigeo.com, "Welcome to precigeo™," "Welcome to precigeoRoof," "Why precigeoRoof," "How precigeoRoof Works," "How precigeoRoof Can Help Me," all retrieved on Feb. 26, 2010, from http://web.archive.org/, pp. 1-5; "Why precigeoRisk Works" and :Welcome to precigeoRisk, retrieved on Aug. 14, 2010, from http://web.archive.org, pp. 6-11, 11 pages total.
Precigeo.com, "Welcome to precigeo™," URL=http://web.archive.org/20080110074814/http://www.precigeo.com, retrieved Feb. 17, 2009, 1 page.
Precigo.com, "How precigeoRoof Works," URL=http://web.archive.org/web/20070107012311/roofprecigeo.com/how-precigeo-roof-works.htm, retrieved Apr. 30, 2009, 2 pages.
Reddy et al., "Frequency-Space Decomposition and Acquisition of Light Transport under Spatially Varying Illumination," ECCV 2012, Florence, Italy, Oct. 2012, 15 pages.
RoofCAD, "Satellite Takeoff Tutorial-Pitched Roof," received Jan. 31, 2012, 25 pages.
Scholze et al., "A Probabilistic Approach to building Roof Reconstruction Using Semantic Labeling," *Pattern Recognition 2449/2002*, Springer Berlin/Heidelberg, 2002, 8 pages.
Schutzberg et al., "Microsoft's MSN Virtual Earth: The Map is the Search Platform," *Directions Magazine*, retrieved Feb. 6, 2009, from http://www.directionsmag.com/article.php?article_id=873&try=1, 10 pages.
Seitz et al., "A Comparison and Evaluation of Multi-view Stereo Reconstruction Algorithms," CVPR 2006, New York, NY, Jun. 2006, 8 pages.
Sengül, "Extracting Semantic Building Models From Aerial Stereo Images and Convesion to Citygml," Thesis, Istanbul Technical University Institute of Science and Technology, May 2010, 138 pages.
Shan et al., "Refractive Height Fields from Single and Multiple Images," CVPR 2012, Providence, RI, Jun. 2012, 8 pages.

Shan et al., "Refractive Height Fields from Single and Multiple Images," CVPR 2012, Providence, RI, Jun. 2012, poster, 1 page.
Sorcerer software screenshot, modified on Sep. 6, 2012, 1 page.
Steuer, "Heigh Snakes: 3D Building Reconstruction from Aerial Image and Laser Scanner Data," Joint Urban Remote Sensing Event (JURSE 2011), Munich, Germany, Apr. 11-13, 2011, pp. 113-116.
University of Washington, College of Arts & Sciences, Mathematics, Course Offerings, Autumn Quarter 2013 and Winter Quarter 2014, retrieved Oct. 25, 2013, from http://www.washington.edu/students/crscat/math.html, 16 pages.
U.S. Appl. No. 60/425,275, filed Nov. 8, 2002, 32 pages.
Wattenberg et al., "Area, Volume, and Torque in Three Dimensions," retrieved on Sep. 24, 2013, from http://www.math.montana.edu/frankw/ccp/multiworld/twothree/atv/learn.htm, 14 pages.
Weeks et al., "A Real-Time, Multichannel System with Parallel Digital Signal Processors," *Proceedings of IEEE International Conference on Acoustics, Speech and Signal Processing (ICASSP 1990)* 3: 1787-1790, Apr. 1990.
Wolf, *Elements of Photogrammetry*, McGraw-Hill Kogakusha, 1974, "Chapter Fourteen: Aerotriangulation; 41-1 Introduction," pp. 351-352, 3 pages.
Wood et al., "Surface Light Fields for 3D Photography," SIGGRAPH 2000, New Orleans, LA, Jul. 24-28, 2000, 10 pages.
Written Opinion for International Application No. PCT/US11/23408, dated Aug. 11, 2011, 5 pages.
Written Opinion for International Application No. PCT/US2013/023503, dated Apr. 30, 2013, 4 pages.
Written Opinion for International Application No. PCT/US2013/023502, dated Apr. 30, 2013, 3 pages.
Wu et al., "Multicore Bundle Adjustment," CVPR 2011, Colorado Springs, CO, Jun. 2011, 8 pages.
Wu et al., "Schematic Surface Reconstruction," CVPR 2012, Providence, RI, Jun. 2012, 1 page.
www.archive.org Web site showing alleged archive of PhotoModeler Web Site http://www.photomodeler.com/pmpro08.html from Feb. 9, 2006 (retrieved Oct. 21, 2013), 4 pages.
www.archive.org Web site showing alleged archive of German Aerowest Web Site http://aerowest.de/ from Feb. 6, 2006 (retrieved Sep. 20, 2012) and translated to English, 61 pages.
www.archive.org Web site showing alleged archive of German AeroDach Web Site http://www.areodach.de from Jun. 13, 2004 (retrieved Sep. 20, 2012) and translations to English, 21 pages.
YouTube, "Pictometry Online Demo," retrieved on Feb. 6, 2006, from http://www.youtube.com/watch?v=jURSKo0OD0, 1 page.
YouTube, "Pictometry Online Webinar for MAIA Members," uploaded Apr. 8, 2011, retrieved from http://www.youtube.com/watch?v=RzAXK2avqQQ, 2 pages.
Zhang et al., "Rapid Shape Acquisition Using Color Structured Light and Multi-Pass Dynamic Programming," International Symposium on 3D Data Processing Visualization and Transmission, Padova, Italy, Jun. 2002, 13 pages.
Zhang et al., "Shape and Motion Under Varying Illumination: Unifying Structure from Motion, Photometric Stereo, and Multi-view Stereo," ICCV 2003, Nice, France, Oct. 2003, 8 pages.
Zhang et al., "Spacetime Stereo: Shape Recovery for Dynamic Scenes," CVPR 2003, Madison, Wisconsin, Jun. 2003, 8 pages.
Zheng et al., "A Consistent Segmentation Approach to Image-based Rendering," Technical Report CSE-Sep. 3, 2002, 2002, 8 pages.
Zheng et al., "Parallax Photography: Creating 3D Cinematic Effects form Stills," Proceedings of Graphics Interface 2009, Kelowna, BC, CA, May 2009, 8 pages.
Ziegler et al., "3D Reconstruction Using Labeled Image Regions," Mitsubishi Research Laboratories, http://www.merl.com, Jun. 2003, 14 pages.
Zongker et al., "Environment Matting and Compositing," SIGGRAPH '99, Los Angeles, CA, Aug. 9-13, 1999, 10 pages.
Australian Office Action, dated Jun. 21, 2013, for Australian Application No. 2011210538, 3 pages.
Australian Office Action, dated Oct. 30, 2014, for Australian Application No. 2013204089, 5 pages.
Pershing et al., "Aerial Roof Estimation System and Method," Office Action for Reexamination of U.S. Pat. No. 8,145,578 B2, Control No. 96/000,005, dated Apr. 16, 2014, 59 pages.

(56) References Cited

OTHER PUBLICATIONS

Pershing, "Aerial Roof Estimation Systems and Methods," Notice of Allowance for U.S. Appl. No. 13/287,954, dated Dec. 19, 2013, 40 pages.
Pershing, "Pitch Determination Systems and Methods for Aerial Roof Estimation," Office Action for U.S. Appl. No. 13/438,288, dated Dec. 16, 2013, 24 pages.
Pershing, "Concurrent Display Systems and Methods for Aerial Roof Estimation," Office Action for U.S. Appl. No. 13/474,504, dated Dec. 20, 2013, 18 pages.
Pershing et al., "Aerial Roof Estimation System and Method," Amendment for U.S. Appl. No. 12/148,439, filed Jan. 18, 2011, 43 pages.
Pershing et al., "Aerial Roof Estimation System and Method," Amendment for U.S. Appl. No. 12/148,439, filed Jul. 25, 2011, 10 pages.
Pershing et al., "Aerial Roof Estimation System and Method," Amendment for U.S. Appl. No. 12/148,439, filed Nov. 23, 2011, 24 pages.
Pershing et al., "Aerial Roof Estimation Systems and Methods," Amendment for U.S. Appl. No. 12/253,092, filed Aug. 10, 2011, 15 pages.
Pershing et al., "Aerial Roof Estimation Systems and Methods," Amendment for U.S. Appl. No. 13/287,954, filed Feb. 28, 2013, 14 pages.
Pershing et al., "Aerial Roof Estimation Systems and Methods," Amendment for U.S. Appl. No. 13/287,954, filed Nov. 22, 2013, 33 pages.
Pershing et al., "Aerial Roof Esimation System and Method," Amendment for U.S. Appl. No. 13/371,271, filed Mar. 11, 2013, 31 pages.
Transcription of points of potential interest in the attached YouTube video titled: "Pictometry Online Demo," retrieved on Feb. 10, 2010, 9 pages.
YouTube, "Pictometry Online Demo," DVD, Feb. 25, 2010.
"R2V User's Manual, Advanced Raster to Vector Conversion Software," Publicly available Sep. 16, 2000, Able Software Corp., Lexington, MA, 164 pages.
Appli-cad, "World Class Technology Leading the Way in Roofing Software—Product Bulletin," Nov. 2002, 98 pages.
Avrahami et al., "Extraction of 3D Spatial Polygons Based on The Overlapping Criterion for Roof Extraction From Aerial Images," CMRT05. IAPRS, vol. XXXVI, Part 3/W24, pp. 43-48, Vienna, Austria, Aug. 29-30, 2005. (6 pages).
Bertan et al., "Automatic 3D Roof Reconstruction using Digital Cadastral Map, Architectural Knowledge and an Aerial Image," IEEE International Conference on Geoscience and Remote Sensing Symposium, Sep. 2006, pp. 1407-1410, 4 pages.
Charaniya et al., "3D Urban Reconstruction from Aerial LiDAR data," Computer Science, University of California, Santa Cruz, pp. 1-43, IEEE, 2004.
Collins et al., "The Ascender System: Automated Site Modeling from Multiple Aerial Images," *Computer Vision and Image Understanding* 72(2):143-162, Nov. 1998.
Declaration of Harold Schuch, In re Inter Partes Review of U.S. Pat. No. 8,078,436, dated Feb. 5, 2016, 36 pages.

Ex Parte Reexamination Certificate (11th), Ex Parte Reexamination Ordered under 35 U.S.C. 257, for U.S. Pat. No. 8,078,436 C1, Pershing et al., "Aerial Roof Estimation Systems and Methods," certificate issued Aug. 27, 2014, 4 pages.
Forlani et al., "Complete classification of raw LIDAR data and 3D reconstruction of buildings," *Pattern Anal Applic* 8:357-374, 2006.
Gleicher, "Image Snapping," Advanced Technology Group, Apple Computer, Inc., 1995, 8 pages.
Hsieh, "Design and Evaluation of a Semi-Automated Site Modeling System," Digital Mapping Laboratory, School of Computer Science, Carnegie Mellon University, Pittsburgh, PA, CMU-CS-95-195, Nov. 1995, 84 pages.
Jaynes et al., "Recognition and reconstruction of buildings from multiple aerial images," *Computer Vision and Image Understanding* 90:68-98, 2003.
Läbe et al., "Robust Techniques for Estimating Parameters of 3D Building Primitives," International Society for Photogrammetry and Remote Sensing vol. 32, Part 2, Commission II, Proceedings of the Commission II Symposium, Data Integration Techniques, Jul. 13-17, 1998, 8 pages.
McGlone et al., "Projective and Object Space Geometry for Monocular Building Extraction," Digital Mapping Laboratory, School of Computer Science, Carnegie Mellon University, Pittsburgh, PA, pp. 54-61, IEEE, 1994.
McKeown et al., "Chapter 9: Feature Extraction and Object recognition, Automatic Cartographic Feature Extraction Using Photogrammetric Principles," in Digital Photogrammetry: An Addendum to the Manual of Photogrammetry, Greve, C., (ed.), Bethesda, Maryland, American Society for Photogrammetry and Remote Sensing, 1996, 19 pages.
Noronha et al., "Detection and Modeling of Buildings from Multiple Aerial Images," *IEEE Transactions on Pattern Analysis and Machine Intelligence* 23(5):2-32, May 2001.
Perlant et al., "Scene Registration in Aerial Image Analysis," Photogrammetric Engineering and Remote Sensing 56(4):481-493, Apr. 1990.
Pershing et al., "Aerial Roof Estimation Systems and Methods," Non-Final Office Action, dated Mar. 29, 2016 for U.S. Appl. No. 14/195,543, 25 pages.
Pershing et al., "Aerial Roof Estimation Systems and Methods," Amendment, filed Oct. 25, 2013, for U.S. Pat. No. 8,078,436 B2, Control No. 96/000,004, 225 pages.
Pershing et al., Petition for Inter Partes Review of U.S. Pat. No. 8,078,436, issued Dec. 13, 2011, "Aerial Roof Estimation Systems and Methods," dated Feb. 8, 2016, 66 pages.
Pictometry, "Electronic Field Study™ User Guide," Version 2.7, Jul. 2007, 508 pages. (537 pages).
Shahrabi, "Automatic Recognition and 3D Reconstruction of Buildings through Computer Vision and Digital Photogrammetry," Institut für Photogrammetrie der Universität Stuttgart, 2000. pp. 5-110.
Australian Government IP Australia, Examination Report No. 1 regarding Australian Patent Application No. 2016210592, dated Jul. 12, 2017.
Australian Government IP Australia, Examination Report No. 1 regarding Australian Patent Application No. 2016202022, dated Jul. 11, 2017.

\* cited by examiner

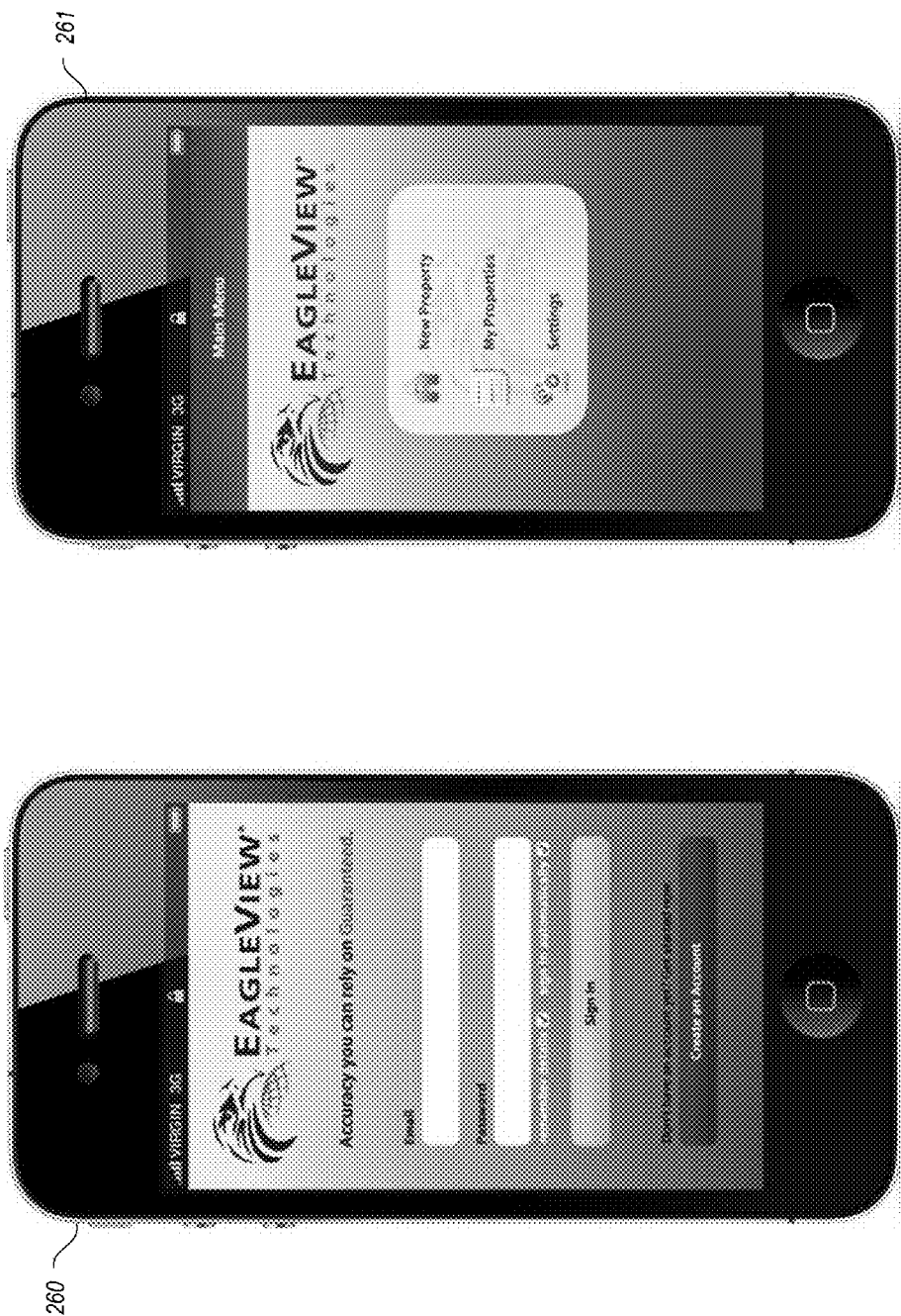

Near Field $$\frac{|l_2 - l_1|}{l_2} \longrightarrow 1$$

Far Field $$\frac{|l_2 - l_1|}{l_2} \longrightarrow 0$$

PROPERTY MANAGEMENT ON A SMARTPHONE

BACKGROUND

Technical Field

The present disclosure relates to systems and methods used to track and manage multiple properties and the various attributes and characteristics of each property and buildings on the property on a smartphone or mobile device.

Description of the Related Art

Property management systems that track conditions, features, and other attributes of one or more properties have typically used paper-based systems that have involved manual updates when property data is changed or new properties to manage are added. In some instances, features and attributes of different properties have been stored as individual records in a database, for example a government database containing property records for parcel numbers, address, year built, square footage estimate, and the like.

Pitch determination systems that are used, for example, to determine a pitch of a roof have traditionally involved a person visiting the property and measuring the roof using a tape measure and level. Recently, systems have been introduced by EagleView Technologies, Inc. that allow multiple aerial images to be used to render a three-dimensional model of the roof and to produce a roof report from which the pitch of a roof may be determined.

BRIEF SUMMARY

In one embodiment, a property management system operates on a smartphone device and allows a user to identify one or more properties to be managed, to order a roof report for the one or more properties and to have the result of that roof report returned to and stored on the smartphone device. The property management system also allows the smartphone user to edit or add data associated with the property, including the roof report for the property, by adding photos, editing photos, annotating photos, and updating and adding text information to the property data stored on the smartphone.

Systems and methods for determining pitch are also disclosed that allow a smartphone to be used to determine the pitch of a facet of an object. In one embodiment, the smartphone uses an image representing a facet of an object for which a pitch is to be determined and receives an indication from a user of the start and end point of a line on the facet. The system uses metadata information contained in the image and the indication of the facet to determine the pitch of the facet. In another embodiment, the system allows a user to take a picture of the facet to be measured with a smartphone camera. The system uses features of the phone, such as the accelerometer, to determine the orientation of the camera when the picture was taken. This information, along with the user's identification of the facet to be measured, is used to determine the pitch of the facet. In other embodiments, visual recognition is used to identify a facet within an image and to calculate the pitch of the facet.

BRIEF DESCRIPTION OF THE SEVERAL VIEWS OF THE DRAWINGS

FIGS. 5A-5L are example screenshots from one embodiment for capturing, modifying, and annotating image data for one or more buildings on one or more properties.

DETAILED DESCRIPTION

Figure 1:
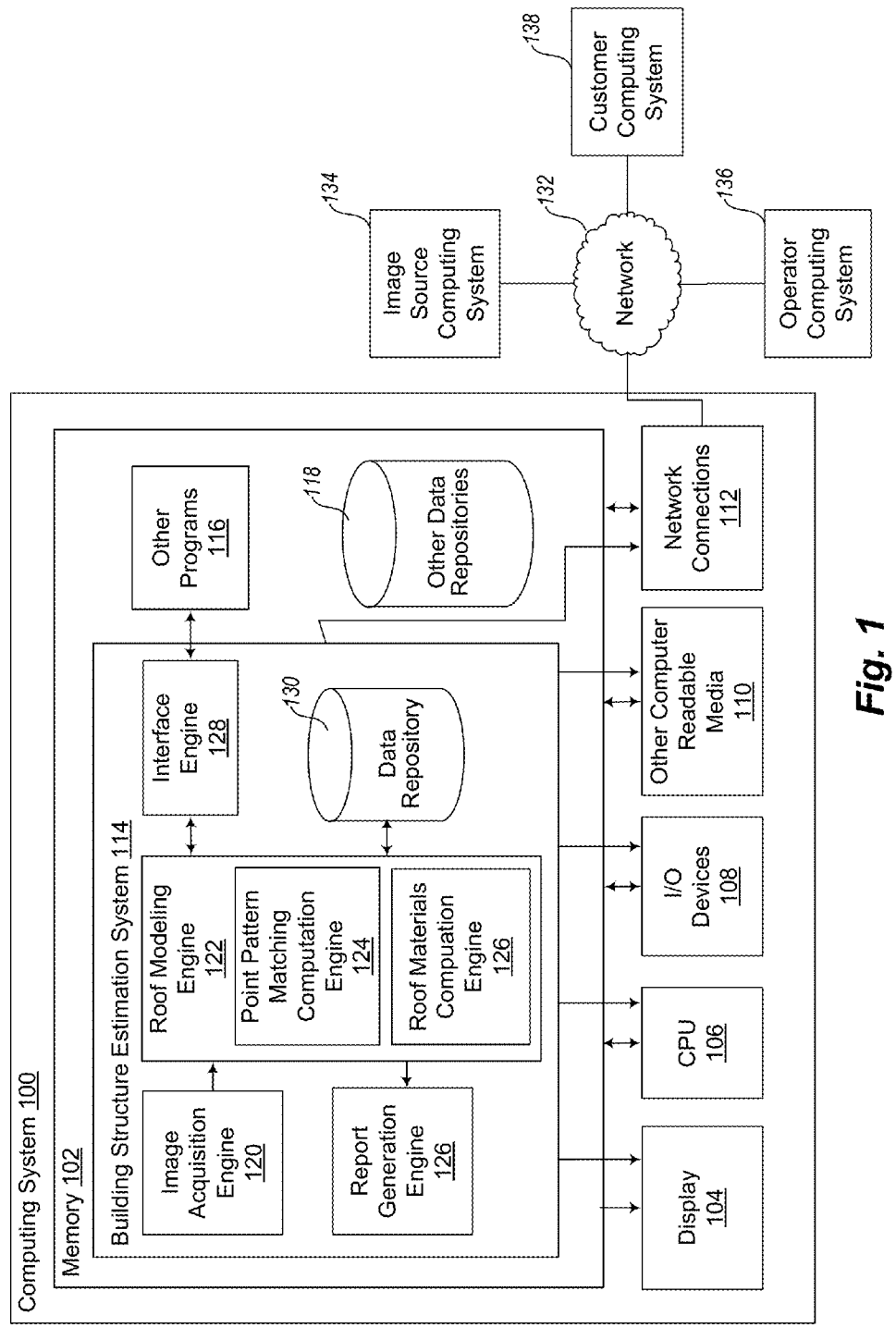
FIG. 1 describes an overview of an architecture to implement a property management system on a smartphone, as well as a property management system that runs on a smartphone and is coordinated with the database on the server.

FIG. 1 shows one embodiment of a block diagram of a computer hardware system to obtain and described herein provide enhanced computer- and network-based methods, techniques, and systems for building structure estimation employing perspective imagery from independent sources.

FIG. 1 is therefore one example block diagram of a computing system 100 for practicing embodiments of the statistical point pattern matching method described herein, and for practicing embodiments of a building structure estimation system based on the point pattern matching, according to one embodiment.

One or more general purpose or special purpose computing systems may be used to implement the computer- and network-based methods, techniques, and systems for point pattern matching computation described herein and for practicing embodiments of a building structure estimation system based on the point pattern matching. More specifically, the computing system 100 may comprise one or more distinct computing systems present at distributed locations. In addition, each block shown may represent one or more such blocks as appropriate to a specific embodiment or may be combined with other blocks. Moreover, in one example embodiment, the various components of a Building structure estimation system 114 may physically reside on one or more machines, which use standard inter-process communication mechanisms (e.g., TCP/IP) to communicate with each other. Further, the Building structure estimation system 114 may be implemented in software, hardware, firmware, or in some combination to achieve the capabilities described herein.

Examples of computing systems and methods to obtain a roof report are shown and described in detail in U.S. Pat. Nos. 8,078,436 and 8,170,840 and these can be used as one component of the present embodiment, as well as other roof report generation systems. For completeness, one potential system for creating such a report will be described herein as follows.

In the embodiment shown, the computing system 100 comprises a computer memory ("memory") 102, a display 104, one or more Central Processing Units ("CPU") 106, Input/Output devices 108 (e.g., keyboard, mouse, joystick, track pad, CRT or LCD display, and the like), other computer-readable media 110, and network connections 112. A building structure estimation system 114 is shown residing in the memory 102. In other embodiments, some portion of the contents or some or all of the components of the building structure estimation system 114 may be stored on and/or transmitted over the other computer-readable media 110. The components of the building structure estimation system 114 preferably execute on one or more CPUs 106 and generate roof estimate reports, as described herein. Other code or programs 116 (e.g., a Web server, a database management system, and the like) and potentially other data repositories, such as data repository 118, also reside in the memory 102, and preferably execute on one or more CPUs 106. Not all of the components in FIG. 1 are required for each implementation. For example, some embodiments embedded in other software do not provide means for user input, for display, for a customer computing system, or other components. Currently, some inputs to the building structure estimation system 114 are automatically generated, but other inputs may be entered manually to supplement data acquired through automated means. Further automation of the building structure estimation system, including automation of roof materials overage estimation is a goal addressed by the method described herein, along with other methods.

In a typical embodiment, the building structure estimation system 114 includes an image acquisition engine 120; a roof modeling engine 122; a point pattern matching computation engine 124, and a roof materials overage computation engine 125 within, or as part of, the roof modeling engine 122; a report generation engine 126, an interface engine 128, and a data repository 130. Other and/or different modules may be implemented. In addition, the building structure estimation system 114 interacts via a network 132 with an image source computing system 134, an operator computing system 136, and/or a customer computing system 138. Communication system 132 may utilize one or more protocols to communicate via one or more physical networks, including local area networks, wireless networks, dedicated lines, intranets, the Internet, and the like.

The image acquisition engine 120 performs at least some of the functions described herein, with respect to the processes described herein. In particular, the image acquisition engine 120 interacts with the image source computing system 134 to obtain one or more images of a building, and stores those images in the building structure estimation system data repository 130 for processing by other components of the building structure estimation system 114.

The roof modeling engine 122 performs at least some of the functions described with reference to FIGS. 2-13 below. In particular, the roof modeling engine 122 generates a model based on one or more images of a building that are obtained from the building structure estimation system data repository 130 or directly from the image source computing system 134. As noted, model generation may be performed semi-automatically, based on at least some inputs received from the operator computing system 136.

In addition, at least some aspects of the model generation may be performed automatically. In particular, to generate a 3D model, the roof modeling engine 122 may use output from the point pattern matching computation engine 124 which employs variational analysis to compute a point-to-point probability spread function. The point-to-point probability spread function can be used to estimate which individual points on one image of the building most likely match corresponding points on another image of the building (i.e., the point pattern matching computation engine endeavors to "optimize" point matching associations). This estimation may be based on adaptive predominance voting probabilities generated from shape pattern matches. The shape pattern matches can be created by comparing combinations of points on an orthogonal view of the building with specific other points on an oblique view of the building, and as further described herein.

Property Management

Figure 2B:
FIGS. 2A-2AD are example screenshots of one embodiment for acquiring and tracking data for one or more buildings on one or more properties.
Figure 2A:
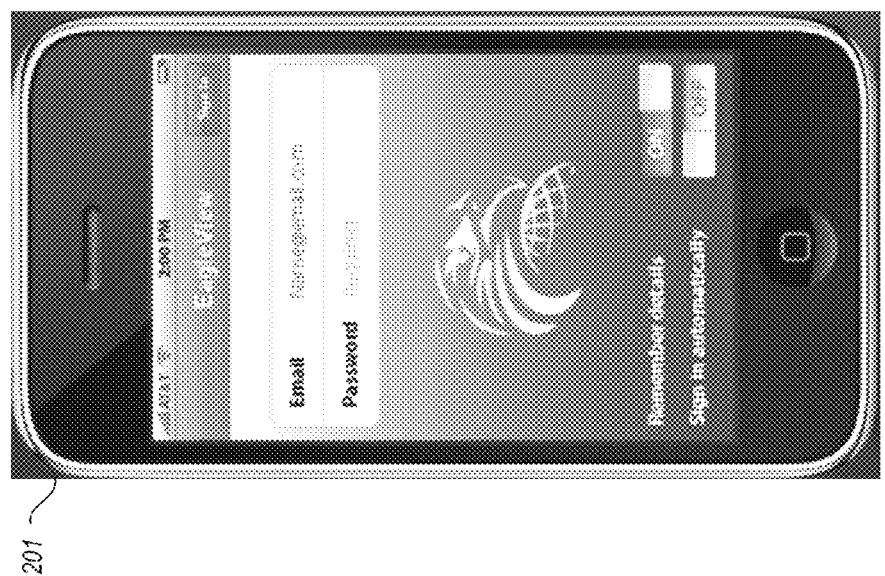

FIGS. 2A-2AD describe systems and methods for using a smartphone to manage multiple properties, and to access the attributes and characteristics of buildings on the properties. The term "smartphone" as used herein is intended in its broadest sense to include any Internet capable small mobile device and as such includes within its meaning a tablet, mini-computer or other mobile device that has a wireless connection to the Internet and an internal microprocessor.

In one or more embodiments, property management systems, including software modules may be used to track physical features of property, such as location of the property, valuation of the property, number of buildings on the property, and information about the buildings on the property. This information may include photographs of different areas of individual buildings such as roofs, walls, interiors, surrounding areas outside the building structure such as groundcover, shrubs that may be growing against the structure, and other building conditions that can visually documented and assessed. Property management systems may also be used to store building information such as two-dimensional or three-dimensional models of the building including the roof structure. Other information may be kept in a property management system including ownership of the property, taxes paid on the property, reports of repairs or insurance claims against structures of the property, and the like.

The information stored in a property management system on a smartphone may be implemented by entering all data directly into the smartphone, however the preferred embodiment is for property management information to be shared between the smartphone at one or more property management databases on a server. In this way, property management information updated at the server can be sent to the smartphone device, and information gathered by the property management system on the smartphone device can be used to update information for the property on the server. One embodiment of sharing would be to synchronize the database on the smartphone via a web service that also queries the server database.

In one or more implementations, the system on the smartphone is able to retrieve information about properties that was acquired through products that were ordered about those properties. For example, roof reports, walls reports, solar reports, and other similar reports may be ordered for a property from EagleView Technologies, Inc. These reports provide detailed analysis and description of characteristics of the property that include for example the number of facets on a roof, the pitch of each facet, the square footage of the roof, a three-dimensional model of the building, walls information for the building, total living area within the structure, and the like.

For example, a user at a property site, such as an insurance adjustor or a contractor, may use the property management system on the contractor's smartphone to determine if such a report exists for the property. If so, the user can look through the list of properties on the smartphone, locate the property, and view the property information. Optionally, the user may query the server to see if updated information on the property may be available. If such a report does not exist for a property, then the user can order one from the property management system on the smartphone. In some cases, the results of a report request may be returned within several minutes. For example, if a contractor is available at a customer site and a report request is returned within the period of time that the contractor is at the property, the contractor will be able to provide the customer with an accurate repair or construction bid estimate before the contractor leaves the property. This has the advantage of providing the property owner with a quick, accurate bid, and the advantage of not requiring separate trips on behalf of the contractor to the property.

In some embodiments, in addition to reports other items may be requested for download, including data, diagrams, GIS data, and geometric models of buildings relevant to the property of interest and immediate surrounding areas.

In one embodiment, if a three-dimensional model or diagram derived from a model already existed on the server because of a previous request for a model of a property or the property model was pre-computed for a particular geographic area, a model of the property, including any regeneration of diagrams or documents related to the model, would be immediately downloaded to the smart phone. In the case that the three-dimensional model was not on the smart phone or on the server, the model, and any diagrams or documents derived from the model, would be generated on demand from the imagery and associated image metadata for the property, or from intermediate precursor data for the property such as point clouds derived from the images and metadata.

FIG. 2A-2AD show examples of an interface of a property management system on a smartphone.

FIG. 2A shows screen 201 used to login to the property management system requiring an email name and a password. The system also allows the user to remember the details selected when previously using the system, as well as allowing the user to sign in automatically.

FIG. 2B shows screen 202 that is displayed when the smartphone is updating the orders for property reports in its database with orders in the server database. FIG. 2C shows screen 203 that is displayed as a result of the update, and for recent properties that have been viewed, lists the address of the property, a claim number associated with the property, a thumbnail image of the property, and also a date and time that reflects the time that the order was completed. In one embodiment, the claim number could be used to list the displayed properties. In other embodiments, other fields could be chosen to include on the screen, including but not limited to a report type or a category ID. There are also buttons at the bottom of the screen that can be used to sort the results for the displayed orders. For example, these buttons can be used to show only completed orders, in-progress orders, or newly placed orders. In addition, a settings button is available to change settings or default values for the property management system.

Figure 2D:
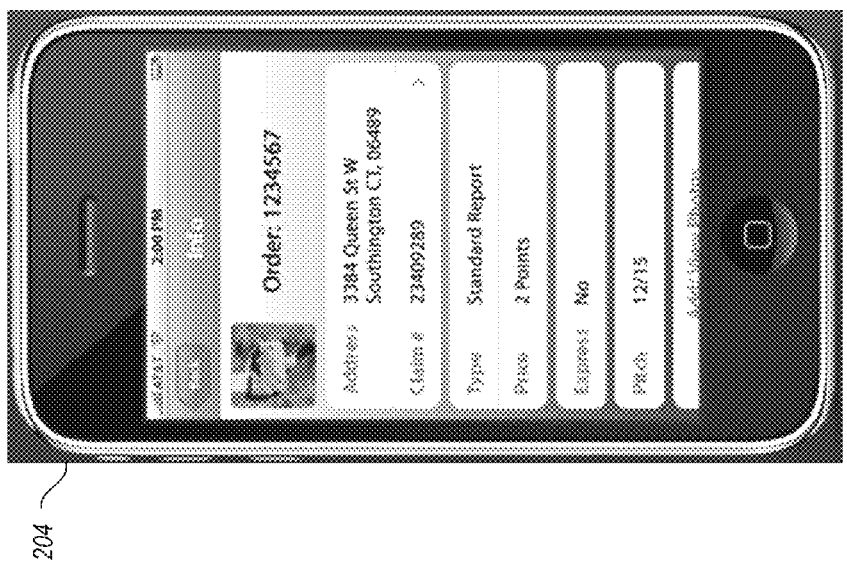
Figure 2C:
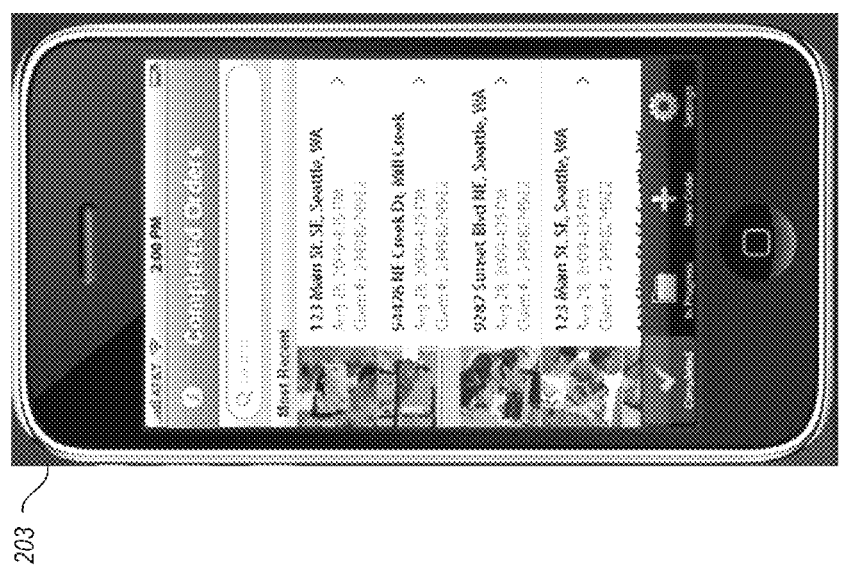

FIG. 2D shows screen 204 that is displayed when a specific property is selected from the previous screen. Information about the property is shown including a thumbnail image, order number, address, claim number, type of report, price of the report, whether the report was requested as an express report, and pitch of the roof for a building on the property. In addition, a button is displayed at the bottom which allows the user to add photos to the report, such as photos taken with the user's smartphone camera, or images stored on the user's smartphone.

In one or more embodiments, photos or video that is taken of property or buildings on a property can be used as a source of imagery to be used in combination with, or in place of aerial imagery for generating three-dimensional models of structures and other objects and features of the property.

Figure 2F:
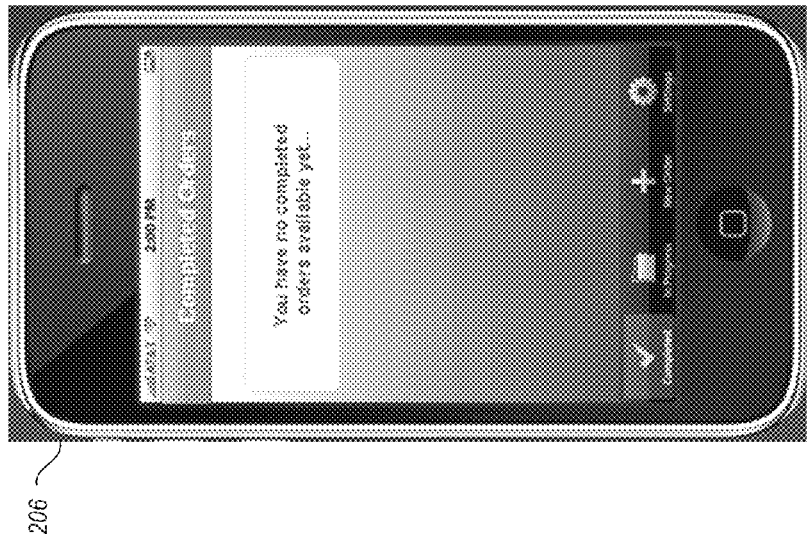
Figure 2E:
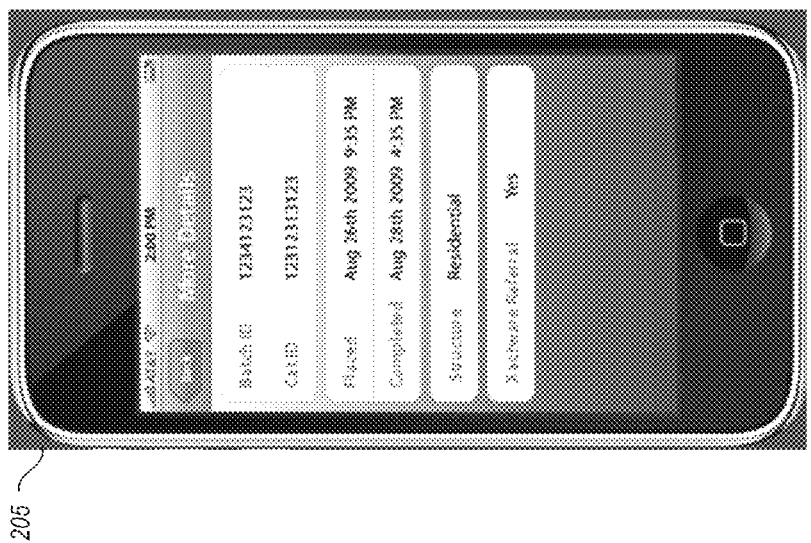

FIG. 2E shows a screen 205 that shows more details on the information for the property, including the batch ID of the report, cat ID, the date and time that the order was placed and was completed, the type of structure of buildings on the property, and whether this was a referral from another property evaluation company.

FIG. 2F shows screen 206 that is displayed when the user selects the completed orders button at the lower part of the screen. In this example, the user does not have any completed orders that are available, therefore nothing is shown in this screen shot. If there were a completed order, it would be shown here.

Figure 2H:
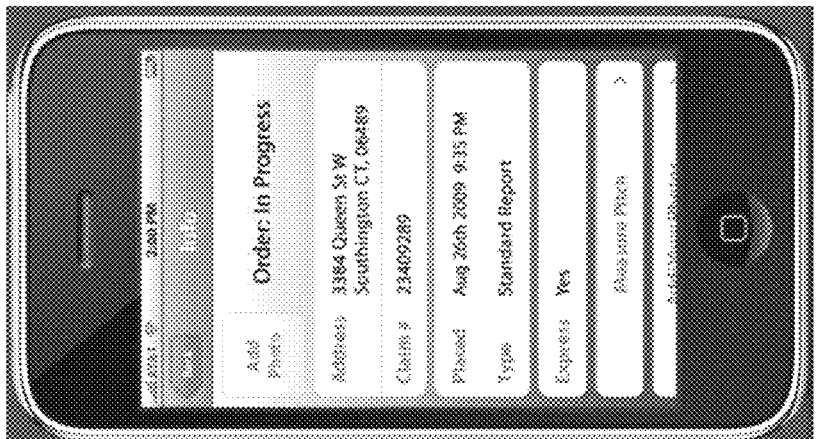
Figure 2G:

FIG. 2G shows screen 207 which is displayed when the "In Progress" button at the bottom of the screen is clicked. A search area is displayed at the top of the screen, and below the search area the most recent accessed orders in progress are displayed for each property. A thumbnail image if available is displayed on the left hand side next to the address of the property. The date an order was placed, as well as the claim number for the property is shown. The arrow to the right of each property listing can be selected for more detailed information.

FIG. 2H shows screen 208 which is displayed when more information is requested by selecting the right arrow on the preview screen. The status of the order for the property is shown as "In Progress," and next to that a button is displayed that allows the smartphone user to add a photo or other image of the property if available. Below that, the address of the property, claim number, date and time the report was placed, the type of report, and whether the report was marked as express is also shown. In addition, the "Measure Pitch" button may be selected, which takes the user to the screen 224. The user is also allowed to add or view photos associated with the property.

Figure 2J:
Figure 2I:

FIG. 2I shows screen 209 that allows the user to sort orders by one or more criteria, such as but not limited to the date the order was placed (either newest first or oldest first), claim number, cat ID, and batch ID.

FIG. 2J shows the screen 210 which is displayed when the user places a new order. The user has the option of either adding a current location, or adding a new address.

Figure 2L:
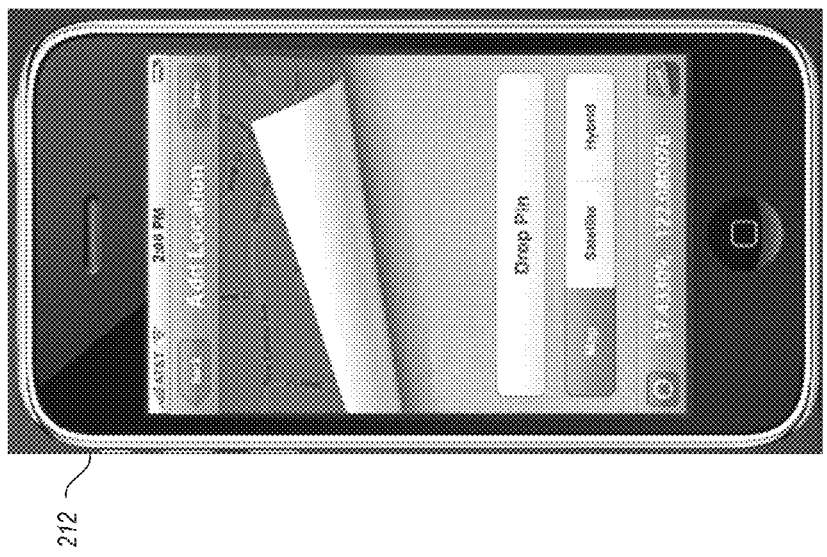
Figure 2K:

FIG. 2K shows screen 211 which is displayed when the user selects the "Add Current Location" button from the previous screen. A map is presented that shows the locations available, and highlights one location for a report with a pin below an abbreviated address. An arrow next to the address allows the user to enter or view more information. In addition, the latitude and longitude of the property is displayed at the lower part of the screen.

FIG. 2L shows screen 212 which is displayed when the rolled up map icon at the bottom of the previous screen is selected. The user is given the option to view either a street map, a satellite map, or a hybrid of both maps. When the user is ready to identify the location, the user selects the "Drop Pin" button to either drop or move the pin.

Figure 2N:
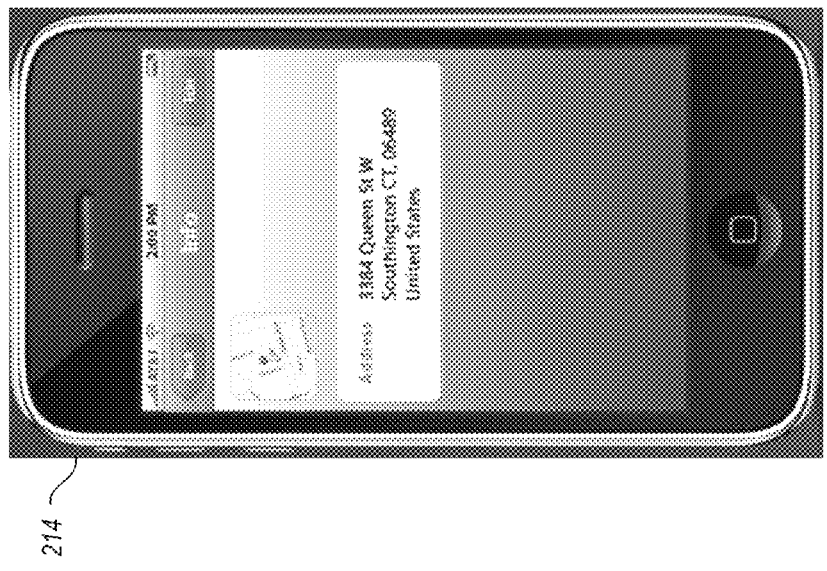
Figure 2M:
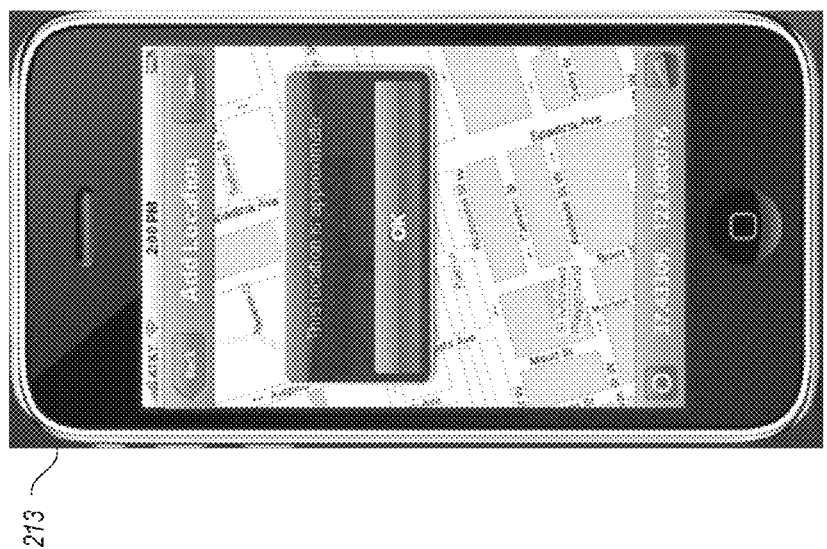

FIG. 2M shows screen 213 which is displayed after the actions on the previous screen are complete if the listed address is not exact, for example the listed house number does not exist. If this occurs, FIG. 2N showing screen 214 is displayed that presents the nearest correct address. FIG. 2O shows screen 215 which is an interface to allow the user to enter corrections to the address, or to enter in an entirely new address.

Figure 2P:
Figure 2O:

FIG. 2P shows screen 216 which is displayed when the user selects the "Add New Address" button from screen 210. The user may enter the street address, city, state, and ZIP Code. In addition, the user can designate a country, which is shown here as the United States.

Figure 2R:
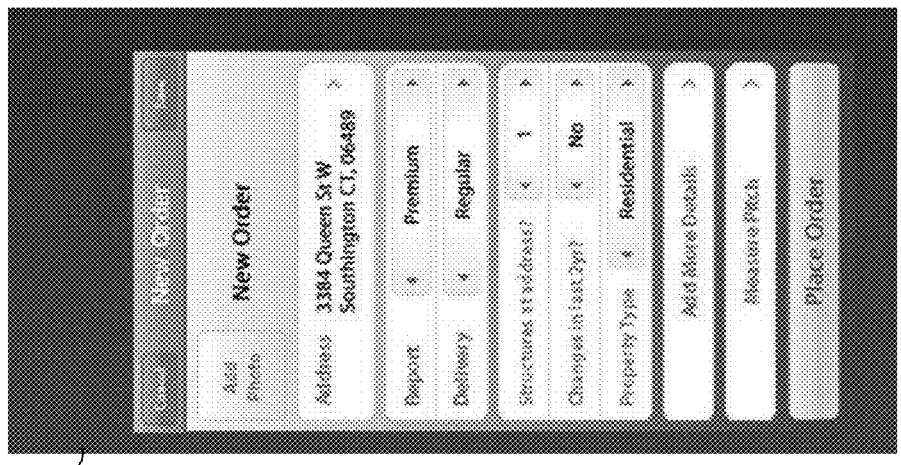
Figure 2Q:
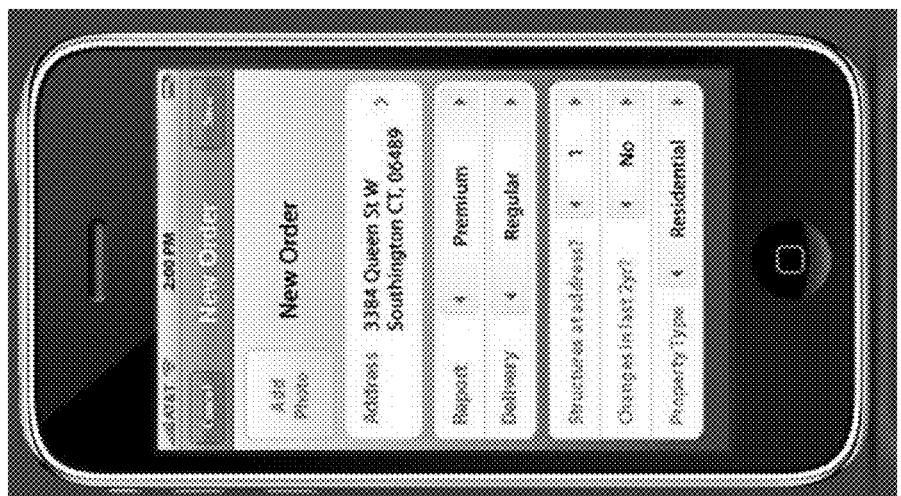

FIG. 2Q shows screen 217 which is displayed after address information is added from the previous screen. A "New Order" title serves as a placeholder for the order next to the "Add Photo" button. The entered address is also displayed. The user is able to select the report to order by toggling through the report selection options by selecting the left or right arrow keys. In this example, a "Premium" report is selected. The user also selects the delivery speed of the report by toggling through the delivery options by selecting the left or right arrow keys. In this example, a "Regular" report is ordered. Similarly, the user can specify the number of structures located at the property address, whether there had been any changes within the last two years, and the property type, which includes but is not limited to residential and commercial.

FIG. 2R shows screen 218 which is a continuation of screen 217 that is displayed when the user scrolls down screen 217. The user is able to select the "Add More Details" button or the "Measure Pitch" button which would take the user to screen 222. The user places the order by selecting the "Place Order" button.

Figure 2T:
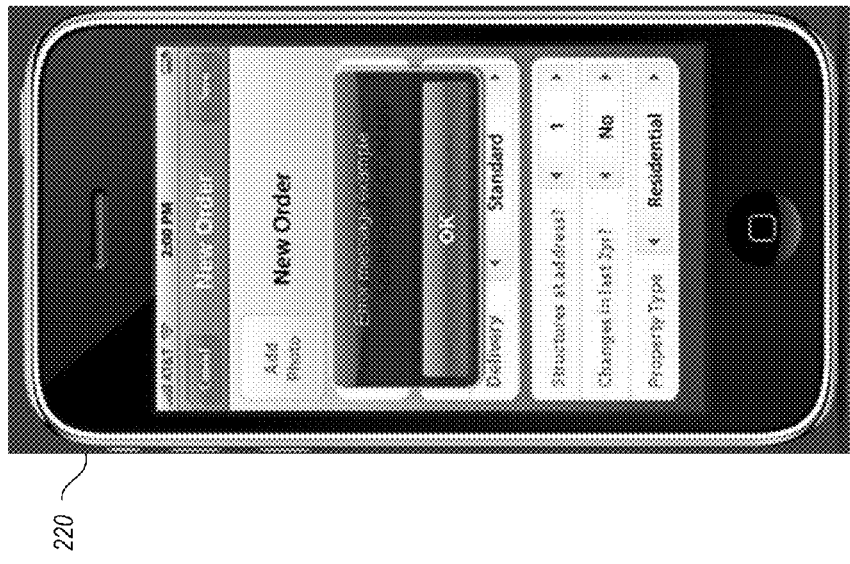
Figure 2S:
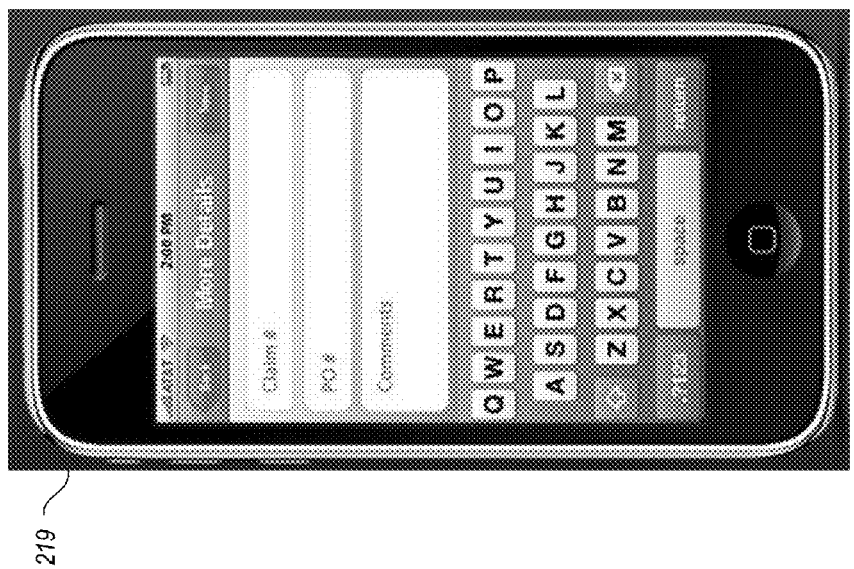

FIG. 2S shows screen 219 which is displayed when the "Add More Details" button on screen 218 is selected. Here, the user is able to enter a claim number, a purchase order number, or additional comments in free-text form to be associated with the order. In some embodiments, additional information may entered into this screen including, but not limited to claim information, building ID, promotion code, or other.

FIG. 2T shows screen 220 which may be displayed if a user incorrectly enters data while placing a new order. The text shown, "Error message example" in some embodiments may be replaced with text that specifically describes the error and how the user can correct the error.

Figure 2V:
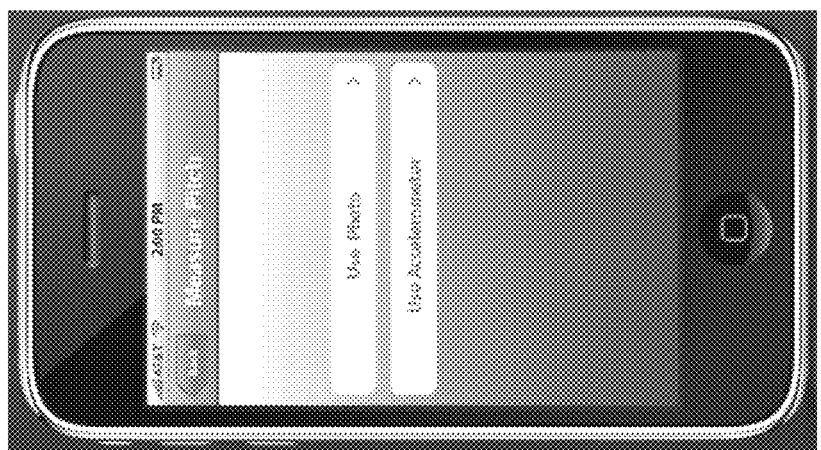
Figure 2U:
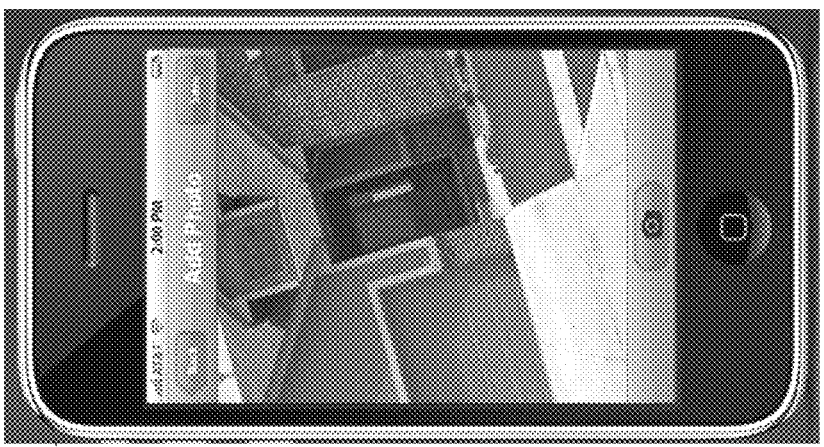

FIG. 2U shows screen 221 which is shown when the user selects the "Add/View Photos" button on screen 208. In some embodiments, the smartphone device camera is activated and allows the user to take one or more photographs of the building if the user is at the building location. In other embodiments, the user is able to identify stored images of the property, such as pictures previously taken, and add them to the order. In some embodiments, these pictures may be used during the process of analyzing the property during the processing and completion of the order. These photos may also be used as a part of the final report itself.

FIG. 2V shows screen 222 which is displayed when the "Measure Pitch" button is selected, such as the one in screen 208. In this embodiment, the screen is used to select two options to measure pitch via the "Use Photo", and "Use Accelerometer" buttons.

Figure 2X:
Figure 2W:
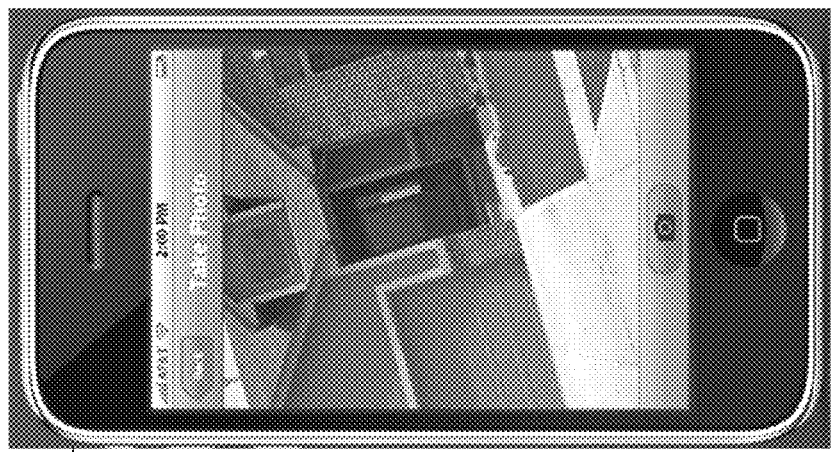

FIG. 2W shows screen 223 which is displayed when the "Use Photo" button is selected in screen 222. The smartphone camera is then activated and the user takes a picture of the facet for which pitch is to be measured. FIG. 2X shows screen 224 which is the result of the picture-taking step in screen 223. Here, the user has taken a picture of the gable of a garage in order to determine the pitch of each side of the gable. In the embodiment shown here, the user will use a "scissor marker" that is described below in further detail.

Figure 2Z:
Figure 2Y:
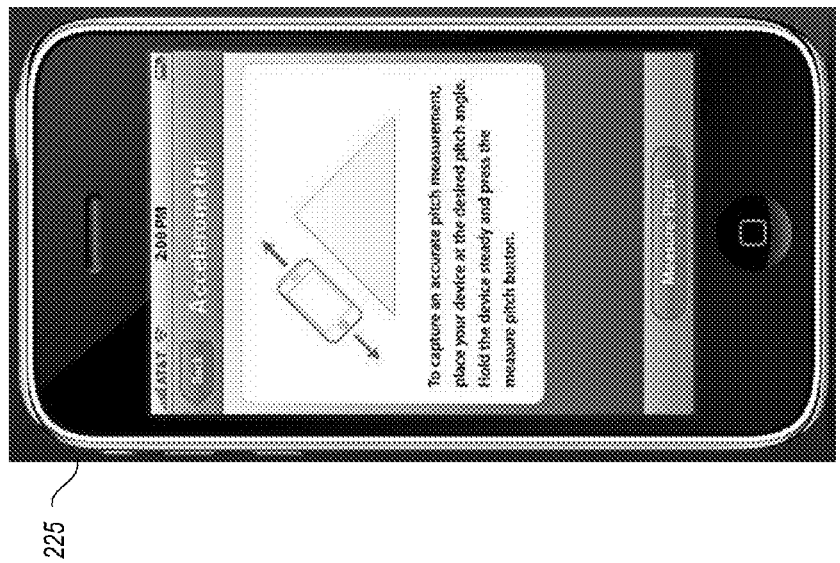
Figure 2A:
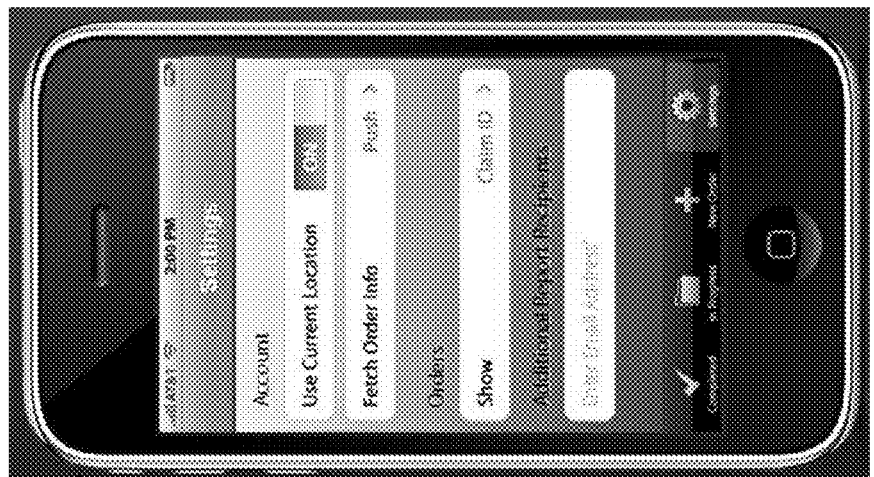
Figure 2A:
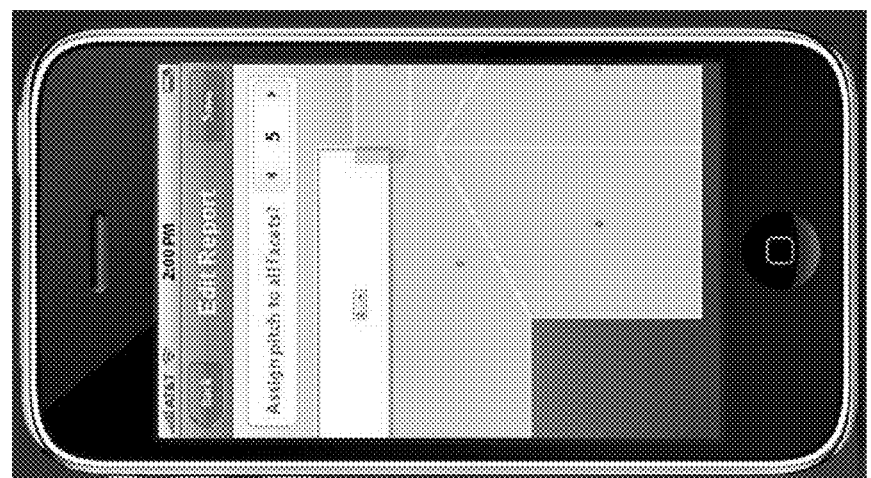
Figure 2A:
Figure 2A:
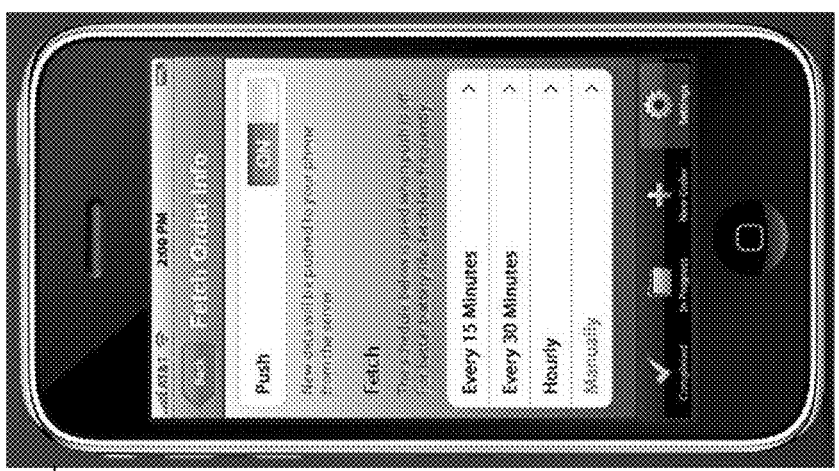

FIG. 2Y shows screen 225 which is displayed when the "Use Accelerometer" button is selected in screen 222. In one embodiment shown here, the smartphone acts as a carpenter's level which can be placed against a surface for which the pitch is to be measured, such as against a rafter to measure its pitch. Once the smartphone is in place, the user selects the "Measure Pitch" button. Other processes and methods of determining pitch are described below.

FIG. 2Z shows screen 236 which is displayed as a result of the pitch measurement from screen 225. Here, the pitch is reported in standard roofing terminology of 5/12. In other embodiments, the pitch may be represented as an angle, a gradient, or some other measure.

FIG. 2AA shows screen 227 which is displayed after a roof pitch is determined, for example from screen 225. Here, the user would access screen 227 by clicking the "Edit Report" button under a completed order detail page. In some embodiments, this would also be an additional button to the "View Report" page. Here, the property manager system on the smartphone that has received detailed data on the structure of the roof, for example through a completed roof report order, and can construct a two-dimensional or three-dimensional diagram of the house. This diagram would then be shown on screen 227 for the user to assign pitches to individual facets of the building. In one or more embodiments, this model of the house can be scrolled, or zoomed in or zoomed out to view the full structure, and to read or apply proper pitches.

FIG. 2AB describes screen 228 which allows the user to change settings within the property manager system on the smartphone by selecting the settings button on the lower right portion of the screen. Here, the user can adjust account information, such as whether to use the current location of the smartphone device as a location for the account, or whether to automatically fetch order information corresponding to the account location, or whether to wait for the smartphone user to ask for order information to be downloaded. In addition, the user can choose whether to show claim ID within reports, and also specify additional email addresses to which reports should be sent.

FIG. 2AC shows screen 229 which is displayed by selecting the right arrow next to "Fetch Order Info" on screen 228. Here, the user is able to select how data that is updated on the server may be sent to the smartphone. This data may include but is not limited to order status, order information, a final property report, or any other property-related data, which may include three-dimensional models, diagrams, or data. A user may turn the push feature on if the user has a low-cost/high-bandwidth data connection such as a Wi-Fi connection. If the user has a slower or more expensive data connection, the user may turn the push feature off, and instead specify at what intervals data from the server should be fetched. In one embodiment described in screen 229, the user is given the option to fetch data every 15 minutes, every 30 minutes, hourly, or to not have data automatically fetched at all but rather wait for the user to manually ask for the data.

In other embodiments, different methods may be used to determine what data is sent from the server to the user's smartphone, and at what time it is sent. For example, suppose a roof report for a property exists that contains roof measurements, a three-dimensional model of the house structure, pitch data for facets of the roof, total living area, property condition assessments, and several pictures of the house and surrounding area. If this roof report on the server that was downloaded to the users smartphone device has been subsequently changed, for example additional images of the property have been added to the report at the server, it is not necessary to resend the entire roof report, but only send the data that has changed. In one embodiment, this is accomplished by looking at the timestamps of the relative files, and only sending data from the server that has a timestamp newer that the timestamp on the corresponding data on the smartphone device.

FIG. 2AD shows screen 230 which allows the user to designate data fields to display. Here, the user has the choice of Cat ID, claim number, batch ID, or status.

The assignee of the present application, Eagle View Technologies, has filed a number of applications on various software products that assist contractors in preparing bids to repair roofs, install siding and perform construction products. The issued patents include U.S. Pat. Nos. 8,170,840; 8,078,436 and the pending applications include Ser. Nos. 13/757,694 and 13/757,712 both of them filed on Feb. 1, 2013 and naming Chris Pershing as an inventor. The patents and applications provide examples of reports that are supplied to contractors to assist them in preparing construction bids. According to one embodiment of the present invention, a contractor or other user can receive these reports as an active computer data file and sent to the property management system on the user's smartphone.

Figure 3B:
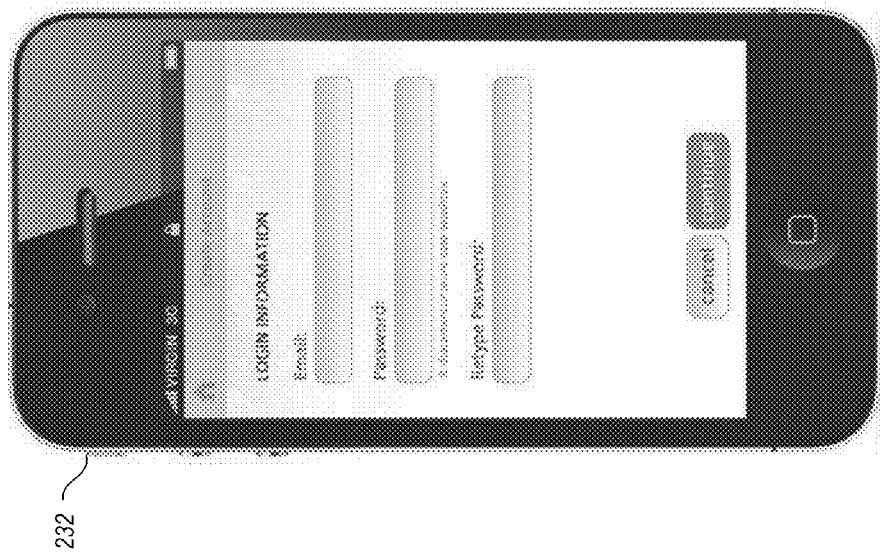
FIGS. 3A-3X are example screenshots of one embodiment for acquiring and tracking data for one or more buildings on one or more properties.
Figure 3A:
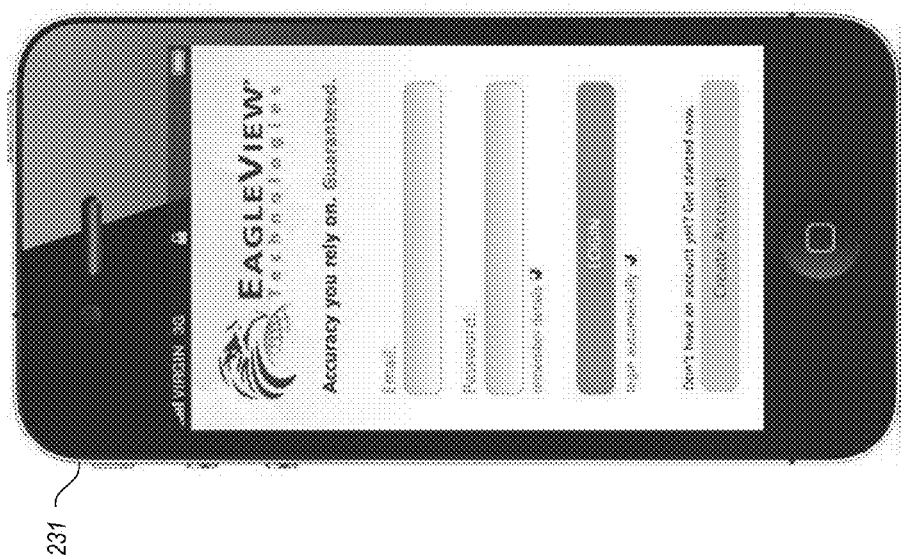
Figure 3D:
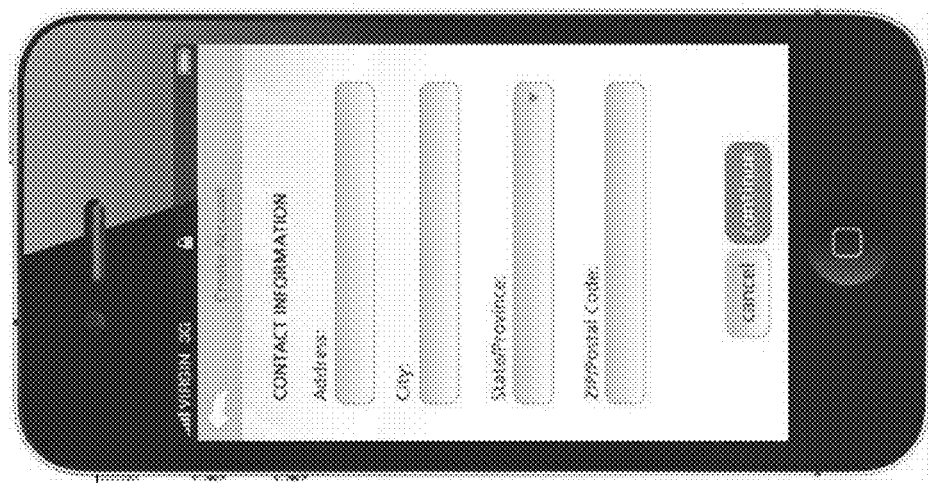
Figure 3C:
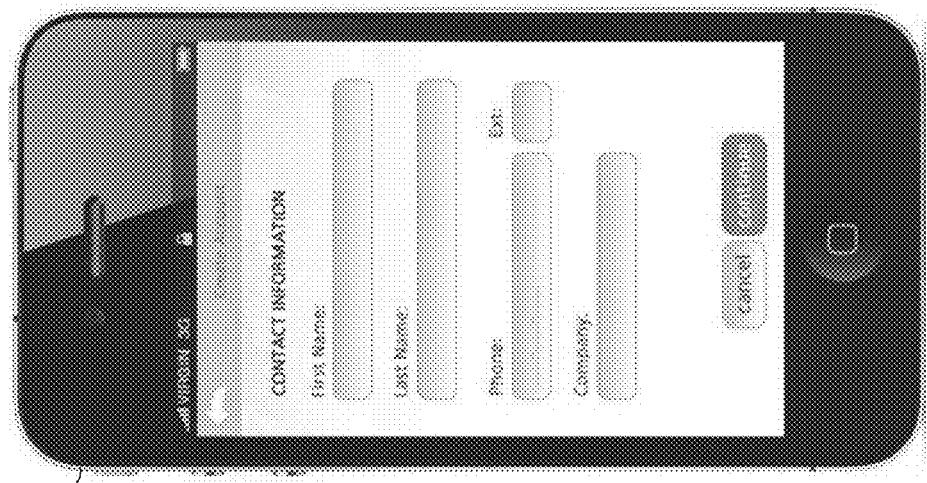
Figure 3F:
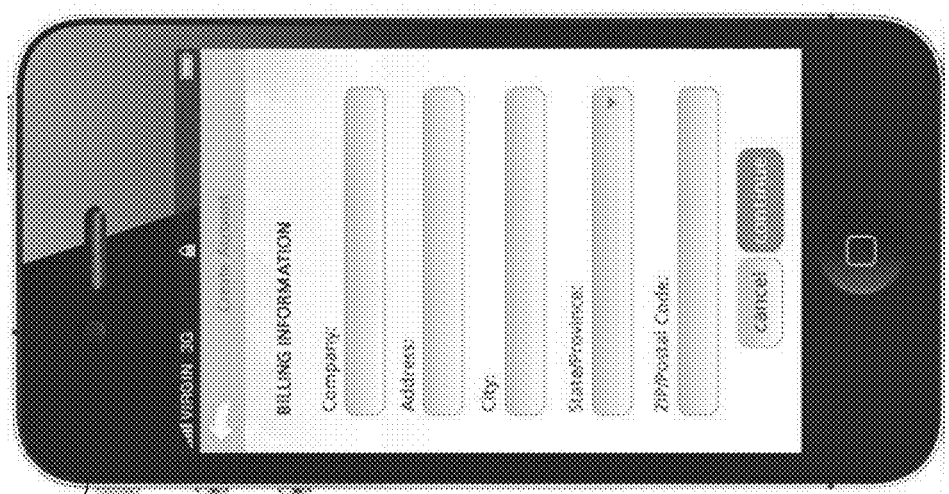
Figure 3E:
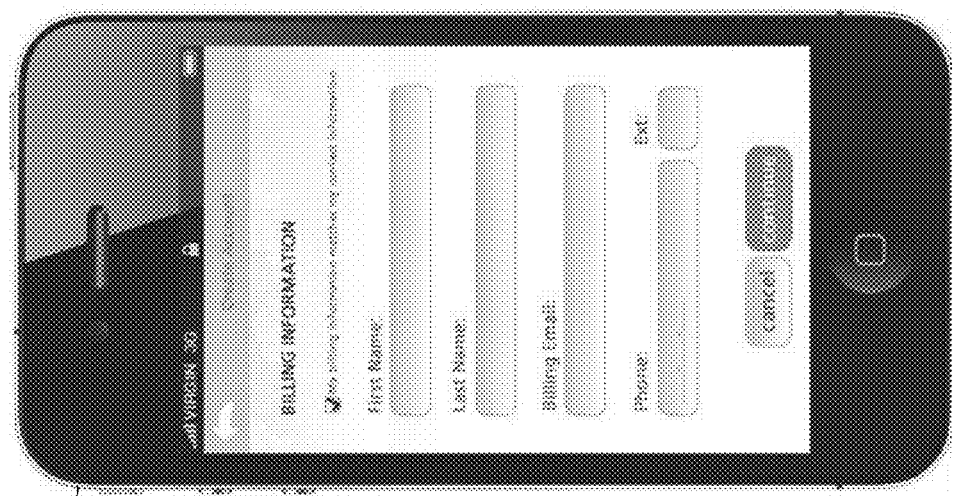
Figure 3H:
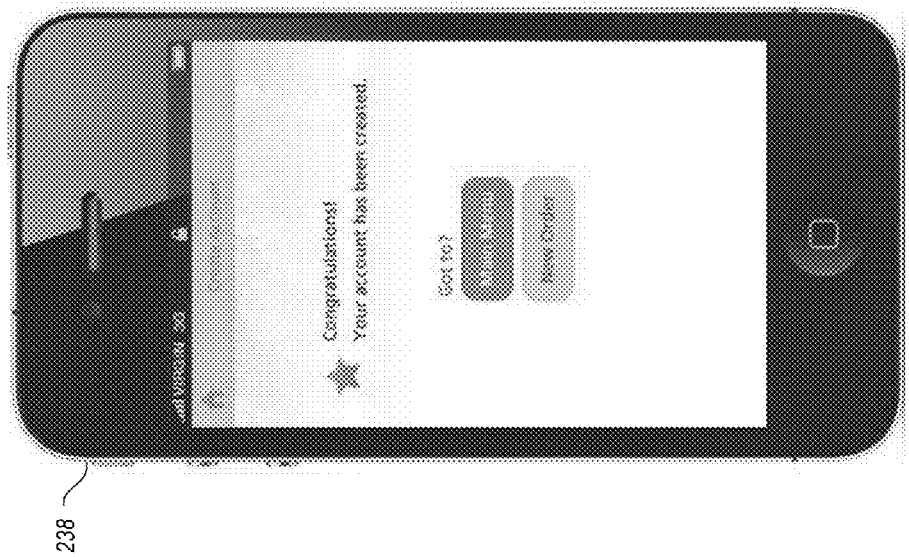
Figure 3G:
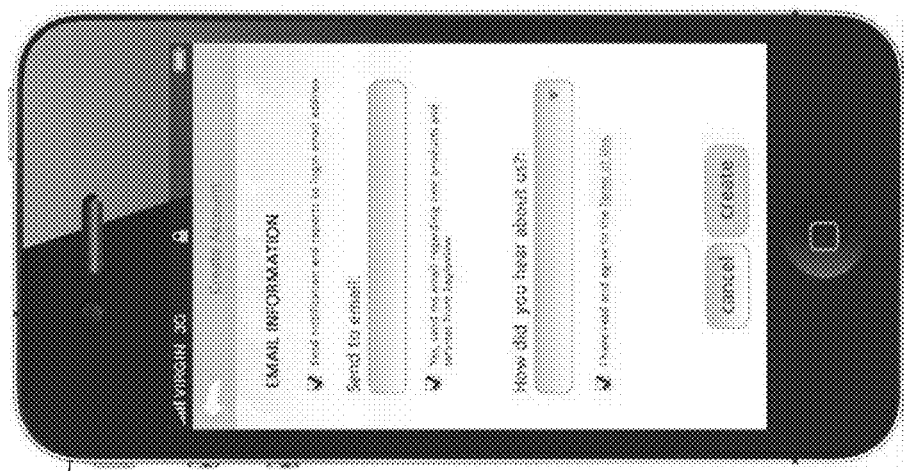
Figure 3J:
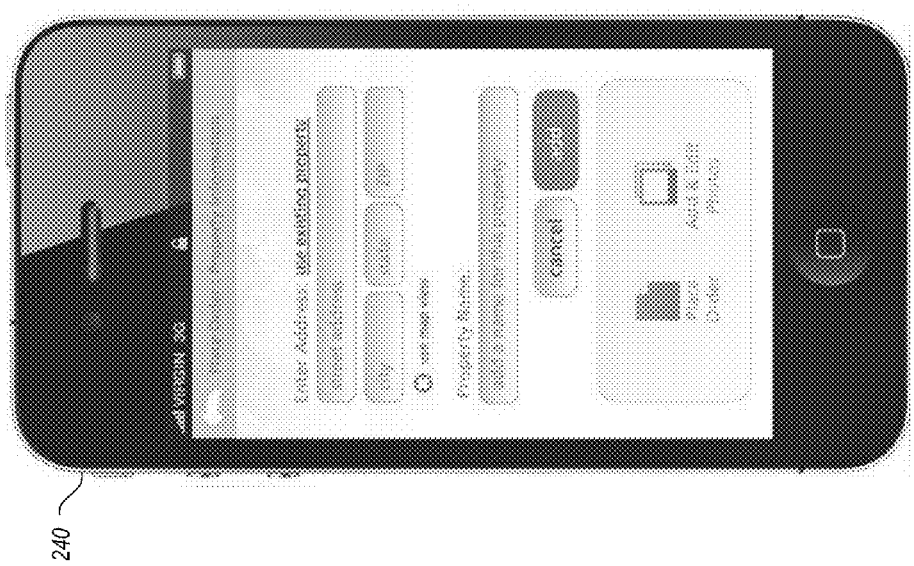
Figure 3I:
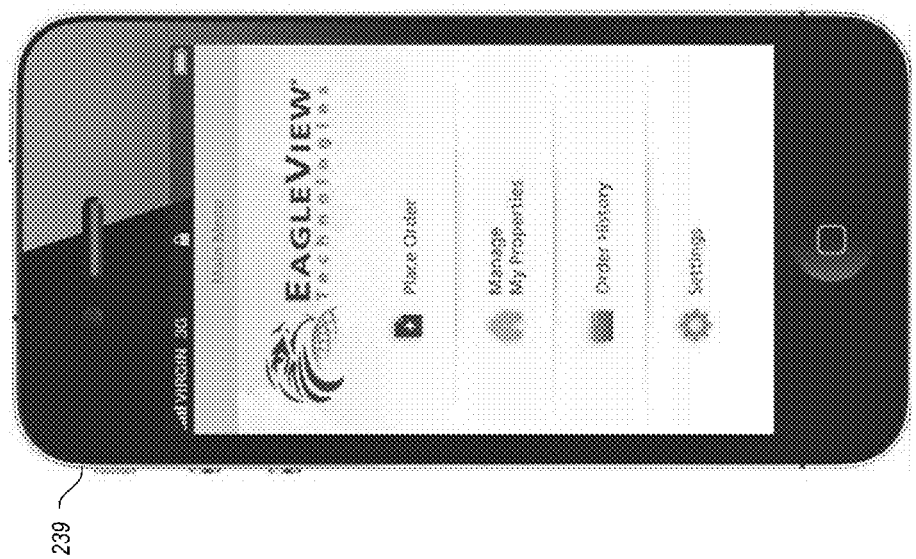
Figure 3L:
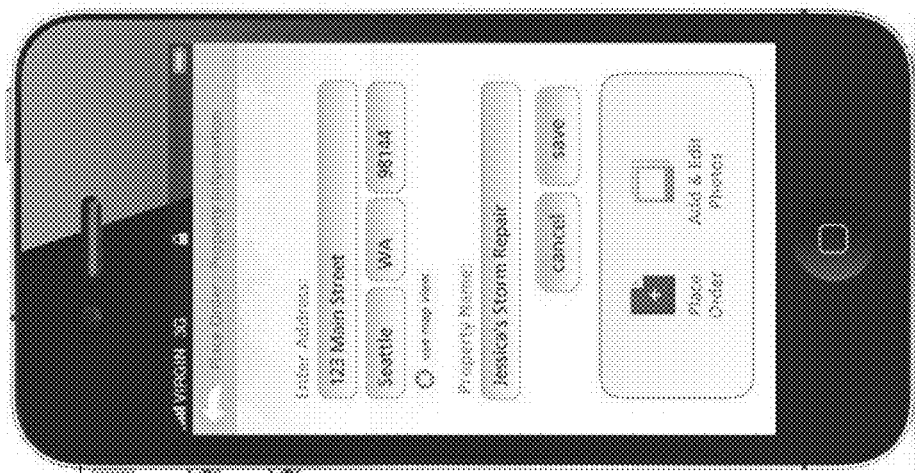
Figure 3K:
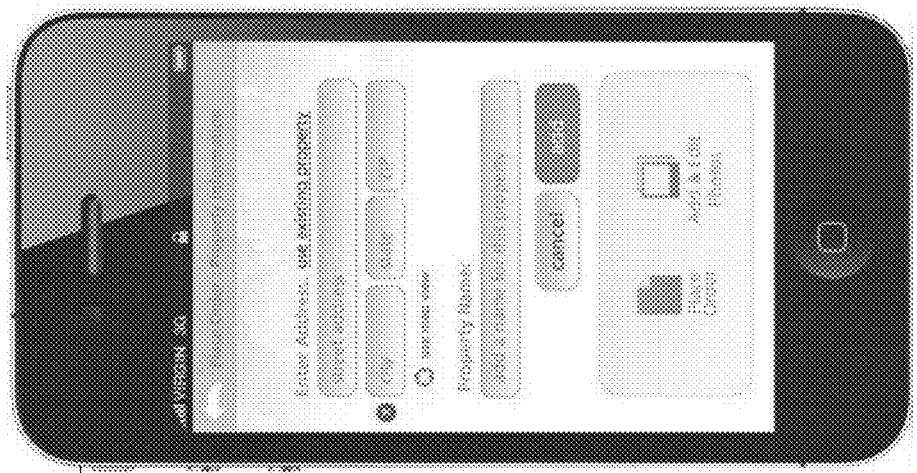
Figure 3N:
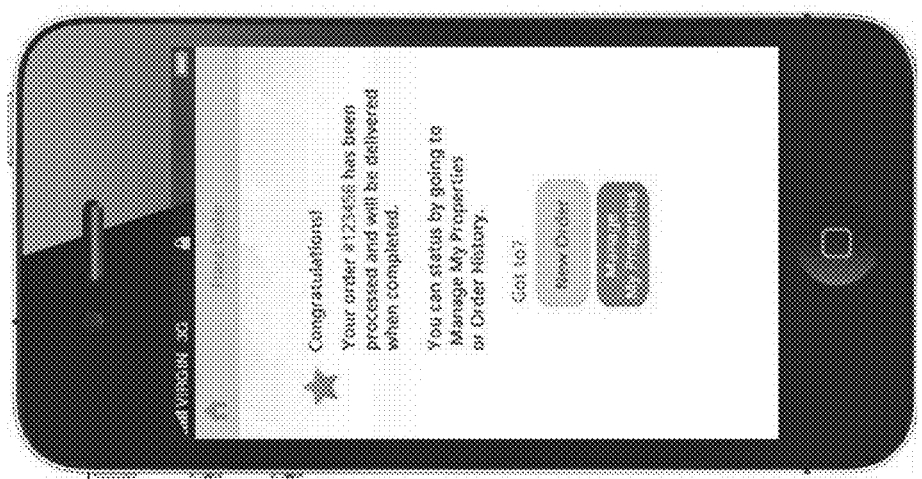
Figure 3M:
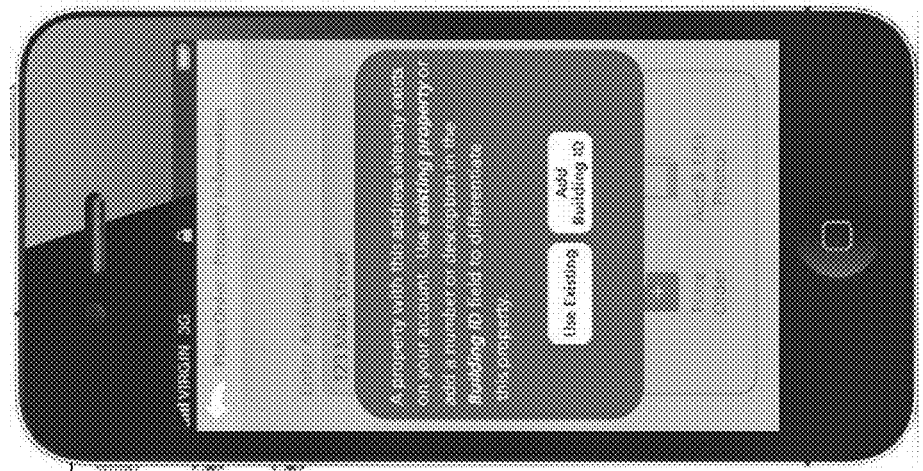
Figure 3P:
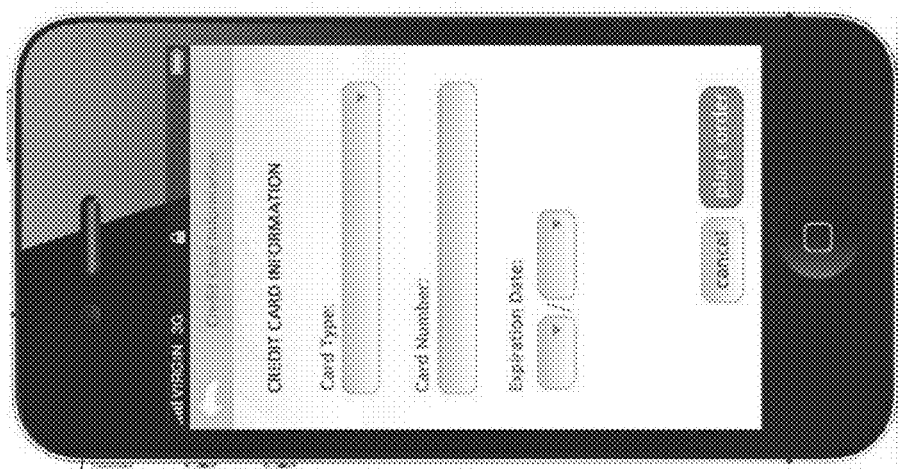
Figure 3O:
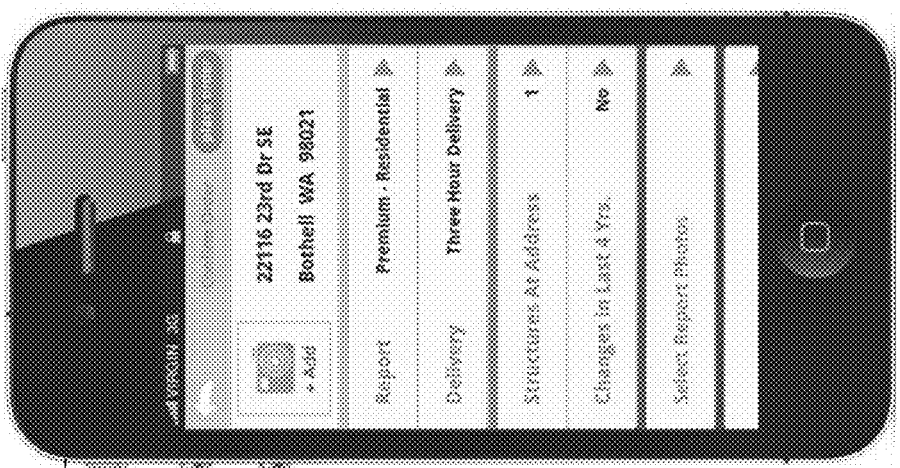
Figure 3R:
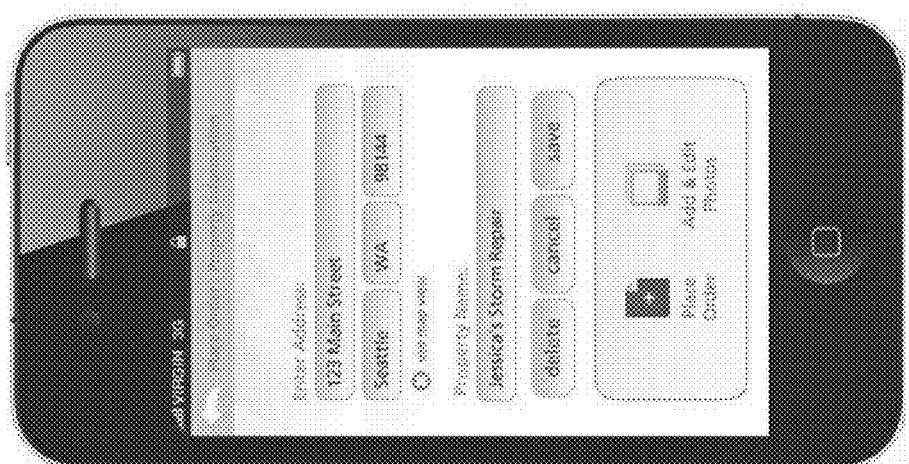
Figure 3Q:
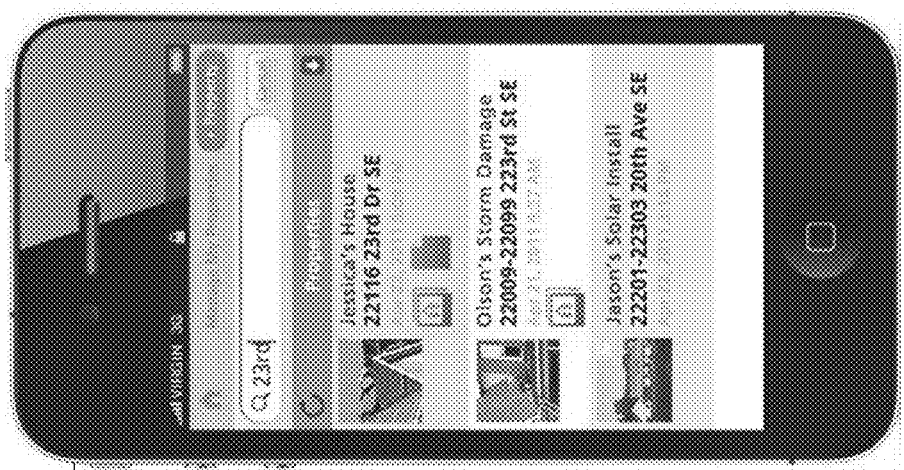
Figure 3T:
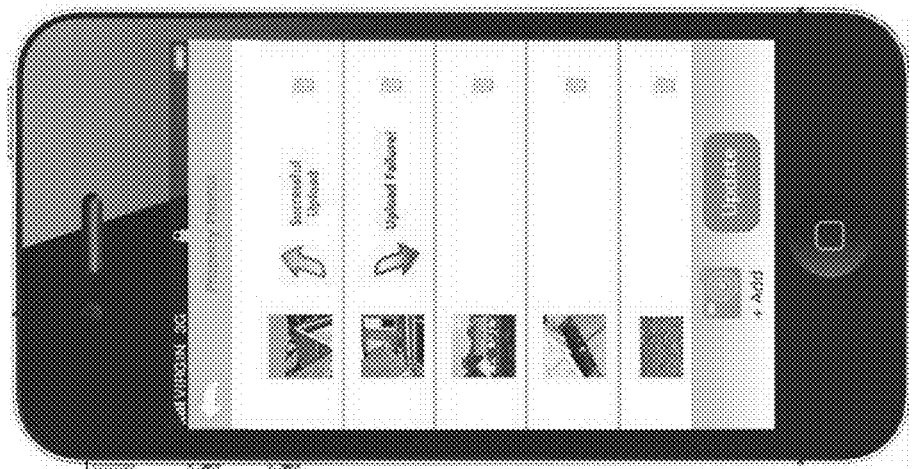
Figure 3S:
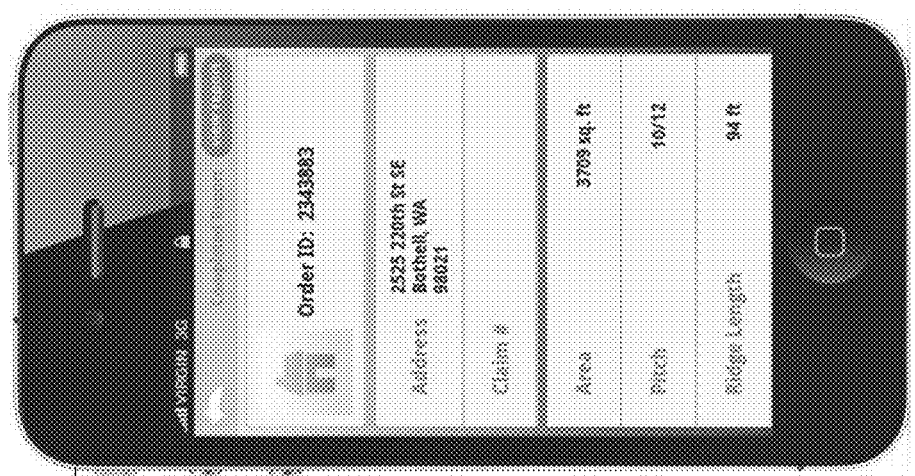
Figure 3V:
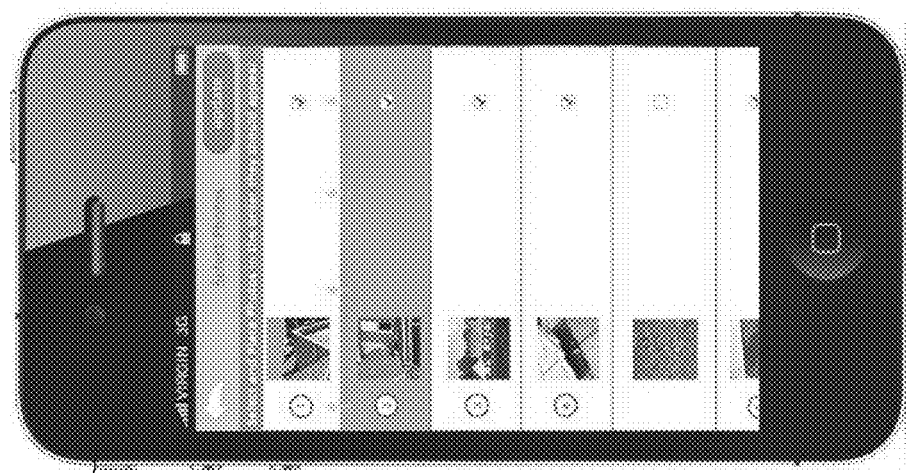
Figure 3U:
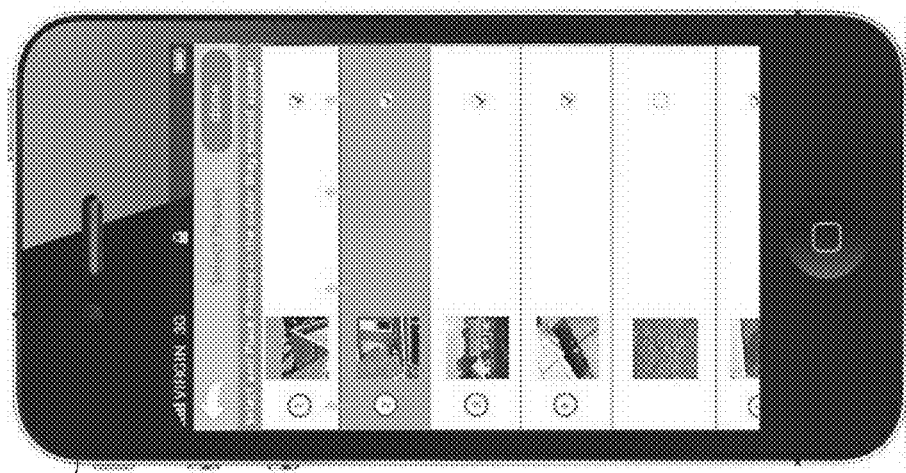
Figure 3X:
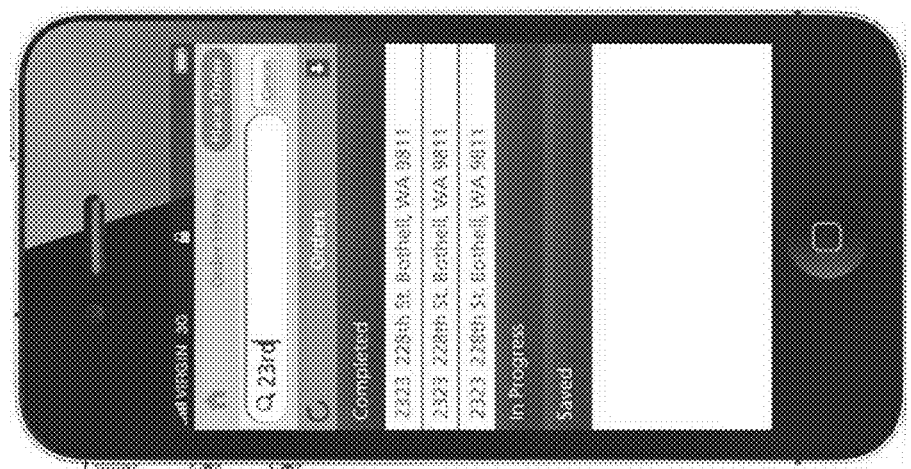

FIG. 3A-3X shows another embodiment of a property manager system on a smartphone device.

FIG. 3A shows screen 231 which is a welcome screen displayed to the user that allows the user to login by providing an email and a password, or to create an account on the smartphone.

FIG. 3B shows screen 232 which is displayed when the user selects "Create Account" on screen 231. The user is asked to enter an email, password, and then retype the password. To create the account the user selects the continue button.

FIG. 3C shows screen 233 which is displayed when the user selects the continue button on screen 232. The user is asked for a first name, last name, phone with extension, and company name. To enter this information the user selects the continue button.

FIG. 3D shows screen 234 which is displayed when the user selects the continue button on screen 233. The user is asked to enter an address, city, state or province, and zip or postal code. To enter this information the user selects the continue button.

FIG. 3E shows screen 235 which is displayed when the user selects the continue button on screen 234. The user is asked to enter billing information including first name, last name, billing email, and phone number. The user also has the option to select the checkbox which indicates that contact information should be used for billing information. To enter this information the user selects the continue button.

FIG. 3F shows screen 236 which is displayed when the user selects the continue button on-screen 235. The user is asked to enter billing information including company name, company address, city, state or province, and zip or postal code. To enter this information the user selects the continue button.

FIG. 3G shows screen 237 which is displayed when the user selects the continue button in screen 236. The user is asked to provide email information that is used to send notification and reports to. The user may choose to use the login email address, or specify another email address to be used. The user may also request to be sent email regarding new products and services from EagleView Technologies, Inc. Finally, the user is asked to check that the terms of use have been read and agreed to. To enter this information the user selects the create button.

FIG. 3H shows screen 238 which is displayed when the user selects the create button in screen 237. This screen informs the user that an account has been created, and allows the user to go to the main menu or to place a new order.

FIG. 3I shows screen 239 which is displayed when the user selects the main menu button in screen 238. This screen gives the user the option to place an order, manage my properties, view order history, or change settings.

FIG. 3J shows screen 240 which is displayed when the user selects the place order button in screen 239, or selects the new order button in screen 238. The screen allows the user to place an order for a property product. The screen allows the user to use an existing property in the property manager system, or to specify a new address to be used. The user may also give this new address a property name for easy reference in the future. In addition, the user may use a map view to identify the property location. The user also has the option to add and edit photos related to the property at the time the order is placed. For example, the user may be at the property location use the camera in the smartphone to various pictures of the building and surrounding area to be used when the order is processed, or to be attached to the order once the order is complete. The user selects the place order button once all desired information is added.

FIG. 3K shows screen 241 which is displayed when the add button of screen 240 was selected for no data was entered into any fields. A circle with a small "x" is displayed to indicate the error.

FIG. 3L shows screen 242 which shows the user entering an address into the place order screen, and assigning the property name "Jessica's Storm Repair" as a reference to this order.

FIG. 3M shows screen 243 which is displayed as a result of selecting the place order button of screen 242. Here, the property management system found an already existing address corresponding to 123 Main Street in Seattle. The system displays an error message and suggests the user select either the existing property feature of screen 240, or add a number or a description in the building ID field to associate another building with this property.

FIG. 3N shows screen 244 which reports a product has been successfully ordered. The user is given the option to place a new order, or go to manage my properties.

FIG. 3O shows screen 245 that is used to confirm an order prior to the order being placed. The screen consists of the order address, with a button next to the address that allows the user to add additional photos, either from the smartphone camera or from an existing image. In addition, the user is asked to select a type of report, in this case a Premium Residential report. A delivery option may also be selected, in this case a Three Hour Delivery. The user may also specify the number of structures at the address, in this case there is one structure, and to specify whether there had been any changes in the last four years. In addition, the user is able to select report photos, in this case photos to be included along with the received report. The user selects the place order button to continue to the payment option.

FIG. 3P shows screen 246 that is used to receive credit card information when submitting a report. The user is asked to enter a card type, such as Visa or American Express, the card number, and expiration date. To place the order, user selects the place order button at the lower right.

FIG. 3Q shows screen 247 that is displayed as a result of the user selecting manage my properties in screen 239. In this screen, lists of properties managed by the user are displayed. The properties are identified by property name, address, date and time associated with the property, and a thumbnail view of the property to the left. The user also has the option to add a text annotation or additional photos or images to the property. A particular property may be searched by entering a portion of the name or address into the search box at the top of the screen.

FIG. 3R shows screen 248 that is displayed as a result of entering property information while placing an order. Once all information is entered, the user has the option to delete, cancel, or save the order for later placement.

FIG. 3S shows screen 249 which displays a completed report that was ordered by the user using the previous steps. This screen shows the order ID number, address of the property, claim number if available, and one or more information items from the report. In this example, an area of 3709 is shown, the pitch of the roof of the house is shown as 10/12, and the ridge lengths of the roof are shown as 94 feet. The user also has the option to view the entire report on the smartphone device by clicking the view report button in the upper right corner.

FIG. 3T shows screen 250 which is displayed when property photos that are part of the completed report are reviewed. A list of photo thumbnails is presented in a column that describes the content of the associated picture. In this example, the user has selected the first and second images to update with new images taken by the camera in the user's smartphone. Here, the first image was successfully uploaded and the second image failed to upload. In some embodiments, the user can determine as part of the settings how often and how many times the system should attempt to upload the image. This screen also allows the user to add additional photos by clicking the add button in the lower left.

FIG. 3U shows screen 251 which allows the user to reorder the sequence of the pictures. This screen shows the user successfully reordering the photos. The user can confirm these changes by clicking the done button in the upper right-hand corner.

FIG. 3V shows screen 252 which allows the users to reorder the sequence of the pictures. Here, the user is able to select the highlighted picture corresponding to number two, and drag that up so that picture number two becomes the first picture in the list, and the former picture number one becomes the second picture in the list. The user will continue this process until the photos are in the desired order, then the user will click the update button in the upper right corner.

Figure 3W:
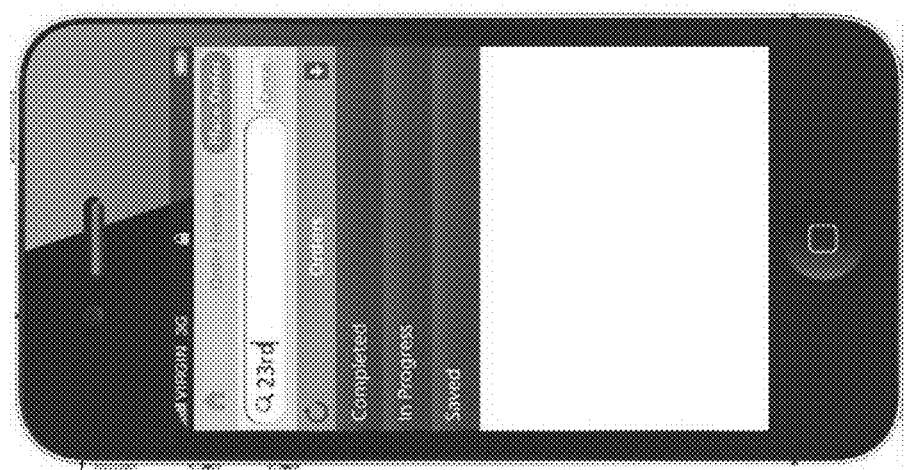

FIG. 3W shows screen 253 which allows the user to view the order history for products placed. The orders may be sorted as completed, in progress, or saved orders to be added later. The user may also do a text search for property information in the search box at the top.

FIG. 3X shows screen 254 which shows the three properties with completed orders.

Three Dimensional Models

FIGS. 4A-4E are examples of property estimation and inspection methods and systems that run on smartphone or tablet devices that allow users to build, update, and use three-dimensional models of one or more buildings on a property. In some cases these three-dimensional models appear as wireframes, and may be used in conjunction with photos, report results data, customer or user annotations, and data from any other source that may be related to the associated property.

There are a number of advantages for working with three-dimensional models of buildings associated with the property. A user, which may be a contractor, can easily interact with the customer at the building location to help the customer choose a feature for the structure, such as a certain type of siding for the walls of the structure, or type of shingles for the roof. The contractor can select and apply examples of how the materials would appear on the structure, and then allow the customer to rotate the structure to see how the material would appear at different angles. The advantage for both the customer and the contractor is a quicker decision from the customer that matches the customer's tastes. In another example, an inspector or estimator will be able to take a tablet, walk around a property, and annotate features of a building to make notes that may affect repair or insurance estimates. For example, an inspector may note bricks extending halfway up a wall. In another example, on-site inspectors may be able to fill in additional information to be included in the three-dimensional model that could not be identified during the original analysis of the property using aerial images. For example, a tree may block a deck or a window from view on the side of a house that could not be seen without an on-site property inspection. In another example, an on-site inspector or estimator can make annotations on the three-dimensional model, such as describing conditions of a particular area of a roof. A contractor may use this to show area of damage to a customer, or to describe to the customer how a proposed chimney, a proposed skylight, or a proposed room addition may appear in final form.

Figure 4A:
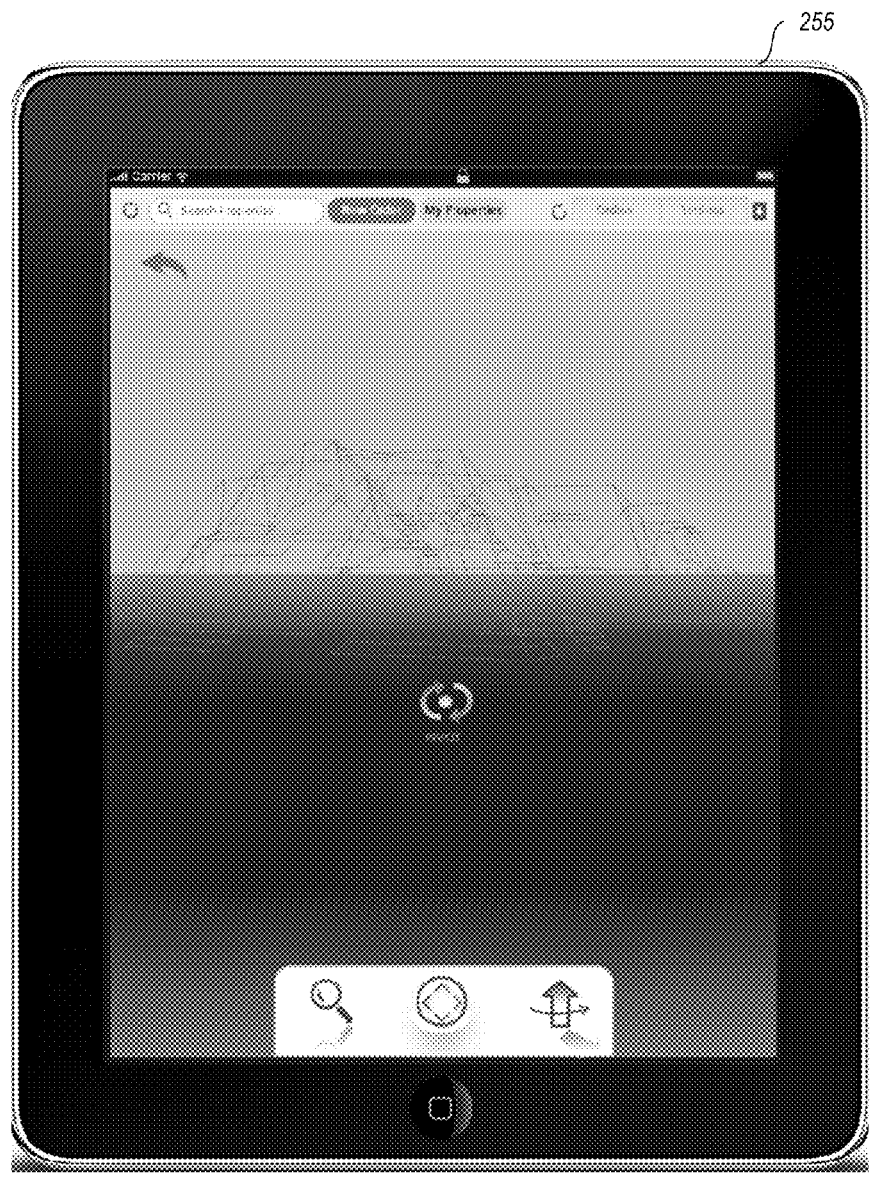
FIGS. 4A-4E are example screenshots from one or more embodiments for acquiring and updating three-dimensional models for one or more buildings on one or more properties.

FIG. 4A shows screen 255 which displays a three-dimensional wireframe rendering of a complex roof of a home. The three-dimensional model from which this wireframe is rendered may have come from a roof report from EagleView Technologies, Inc. that was ordered by a user using the property manager system on a smartphone device. The model information may have come from other sources or multiple sources, including updates to three-dimensional model made by the tablet user when inspecting the property location. In this embodiment, the wireframe may be rotated using the pivot tool in the center of the diagram, zoomed in using the magnifying glass, or rotated in the third direction by using the up arrow with the side cross arrow through it. In addition, because this is part of the property management system, a customer can place a new order for a product by clicking the new order button, can look at the my properties information associated with the user, review orders, or change settings as described above.

Figure 4B:
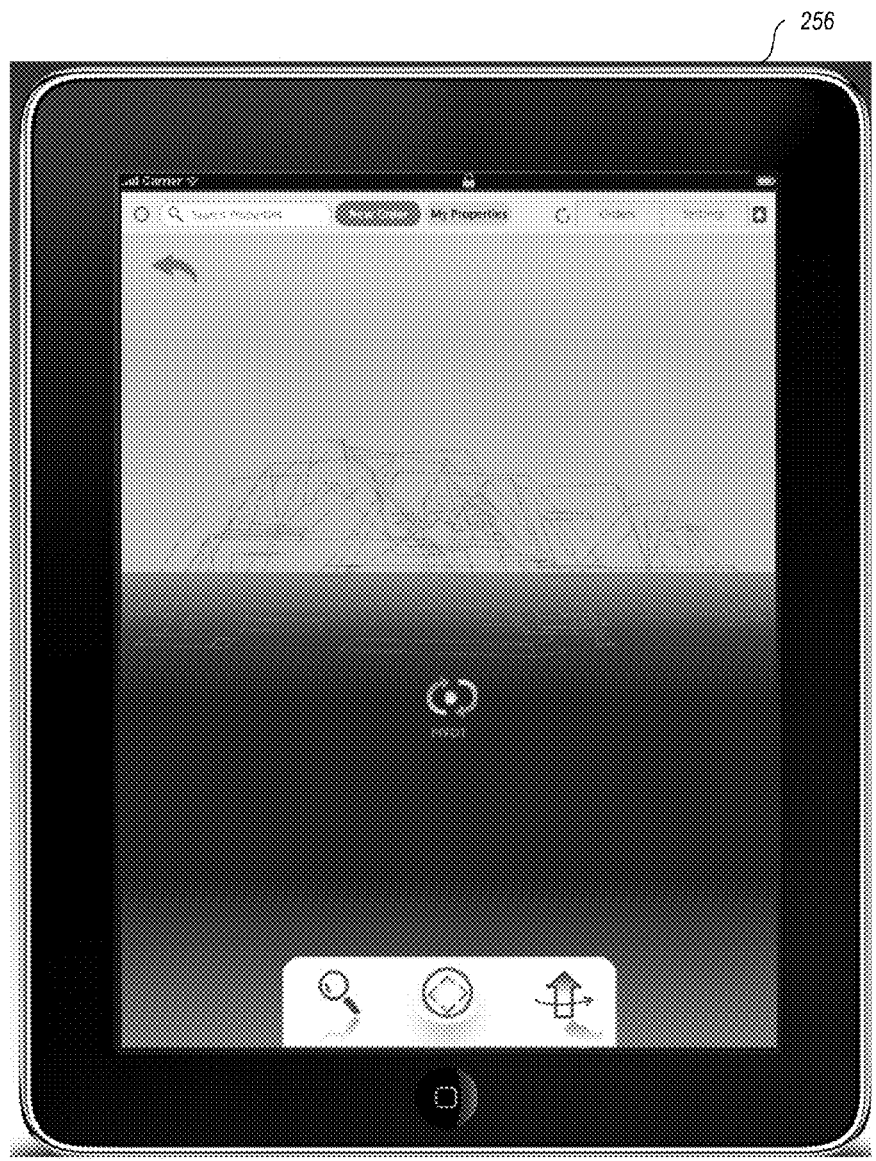

FIG. 4B shows screen 256 which differs from screen 255 in that a higher resolution for the wireframe image is used.

Figure 4C:
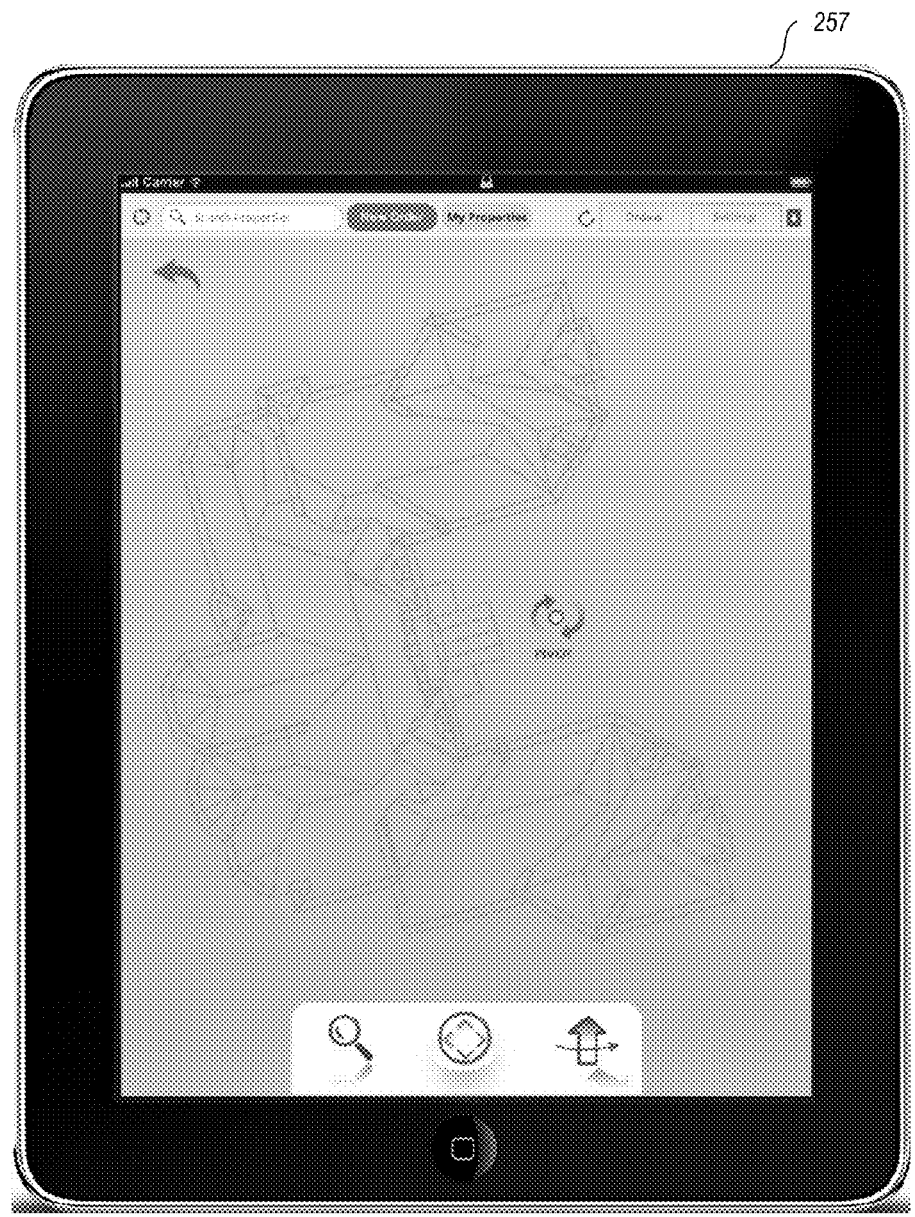

FIG. 4C shows screen 257 which displays a top-down view of the three-dimensional model of the house shown in screen 256. Here, the image can be rotated clockwise or counterclockwise.

Figure 4D:

FIG. 4D shows screen 258 that describes an embodiment of a property management system on a tablet that is showing an order for an EagleView roof report that has been processed and delivered to the tablet. The report includes the address of the property listed in the upper left, with a current image of the property immediately below the address. This image shows damage to the property that needs to be repaired. The right side of the report contains details such as order number claim number area of roof and so on. The lower right includes photos and graphical representations of the property. Here, the user can add their own photos to associate with the property, select specific photos to be added to the roof report that is created for the property, view the property as a PDF document, or view the annotatable three-dimensional model of the building on the property.

Figure 4E:
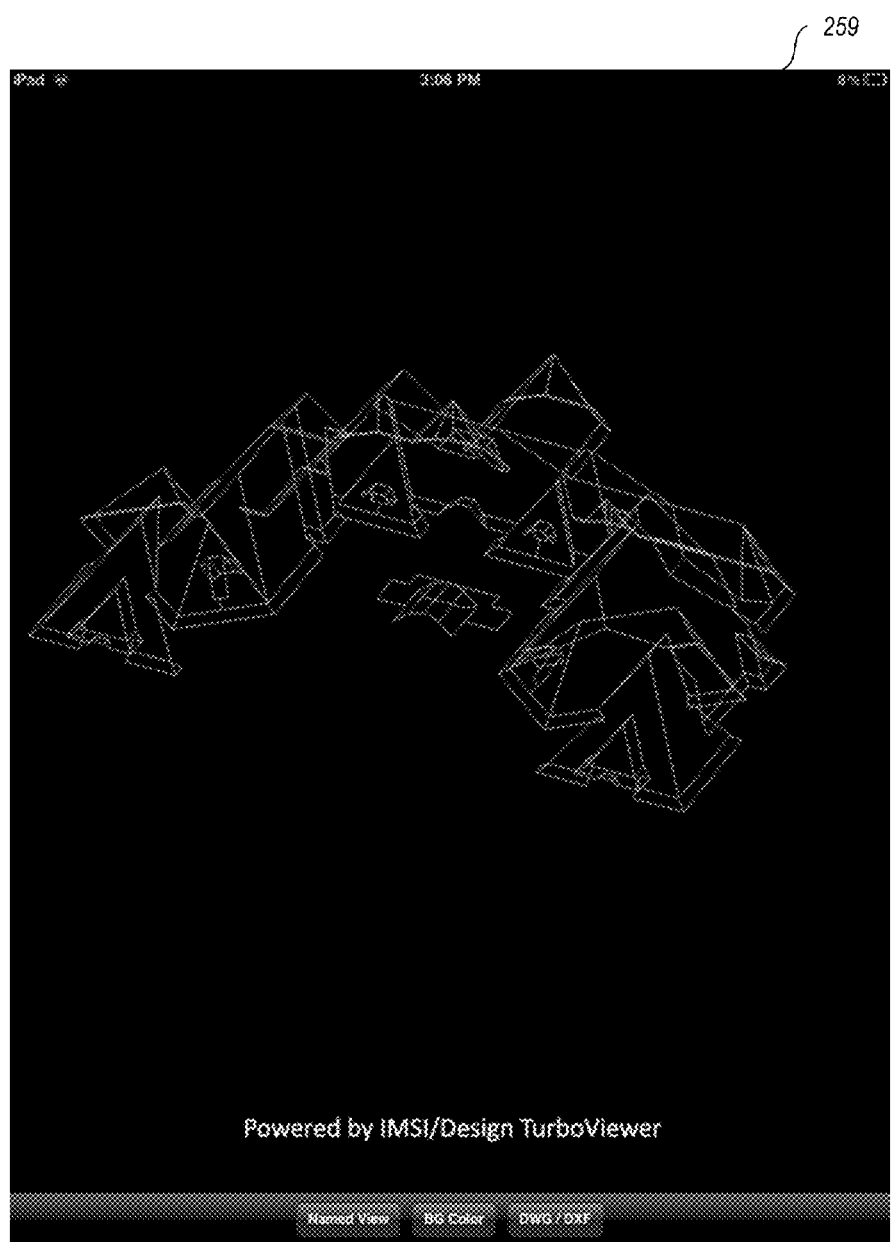

FIG. 4E shows screen 259 which is an example of a three-dimensional wireframe model exported to other software systems, in this case by TurboViewer.

FIGS. 5A-5L are examples of another embodiment of a property management system on a smartphone that allows editing and annotation to photos.

FIG. 5A shows screen 260 which shows an initial property management system screen allowing a user to either sign in, or create a new account.

FIG. 5B shows screen 261 which allows the logged-in user to either create a new property entry to look at the user's existing properties, or to adjust settings.

Figure 5D:
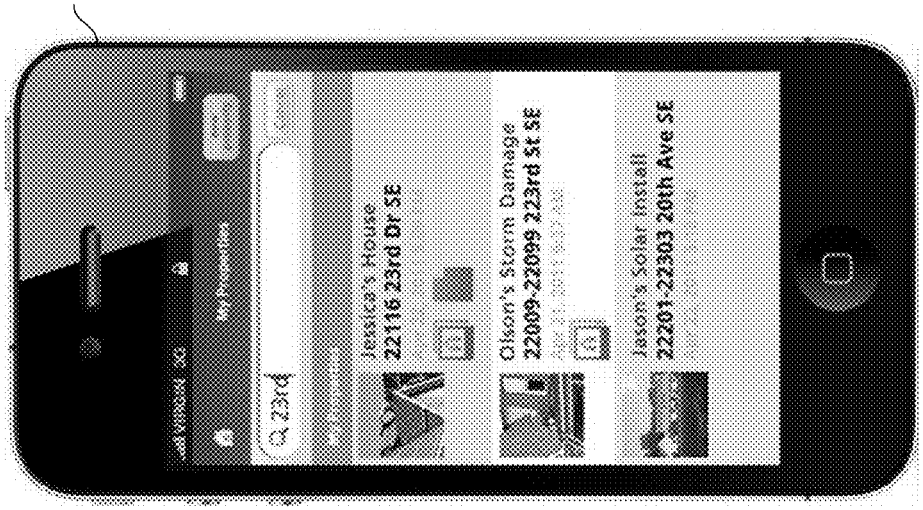
Figure 5C:

FIG. 5C shows screen 262 which is displayed when a user selects the new property button of screen 261 to create a new property entry. The user is asked to provide a name and address for the property, or optionally to use the current GPS location of the smartphone as the address. The user is also able to add photos which may be taken using this camera in the smartphone, or added from existing images. Users are also able to order reports, such as a roof report from EagleView Technologies, Inc. by selecting the order report button. To make the change, the user selects the save button at the lower left.

FIG. 5D shows screen 263 which is displayed when the user selects the "my properties" button from screen 261. A list of properties is displayed including the property name, address, date related to the property, and thumbnail of the property to the left of the property name. In addition, additional files, and annotations may be added to the property by selecting the buttons immediately below the property address.

Figure 5F:
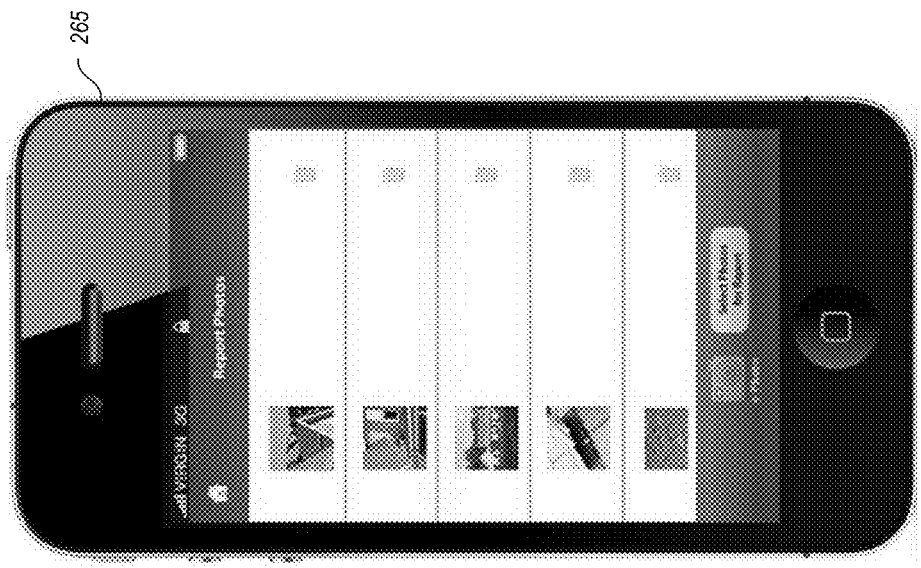
Figure 5E:
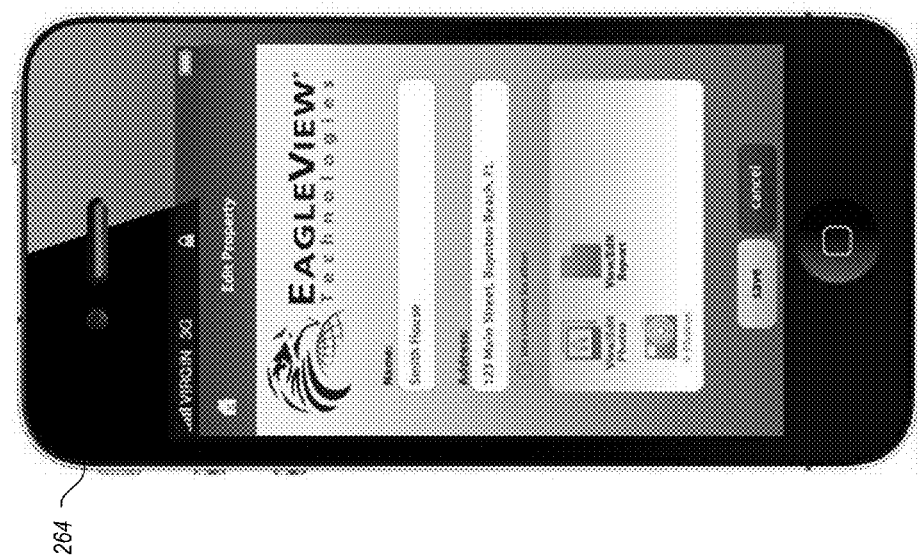

FIG. 5E shows screen 264 which displays the "Edit Property" screen to screen identifies the property name, property address, and options which may be used to edit or annotate the property. In this example, the user has the option to view or edit photos, view or edit the report, or add additional photos. The user clicks the save button in the lower left side to save edits made with the property.

FIG. 5F shows screen 265 used to edit report photos when the user has selected the view/edit report icon in screen 264. The screen shows a list of images associated with the property that the user may select to add to the generated report. The user also has the option to add additional photos which can be taken from the smartphone camera, or taken from images already available.

Figure 5H:
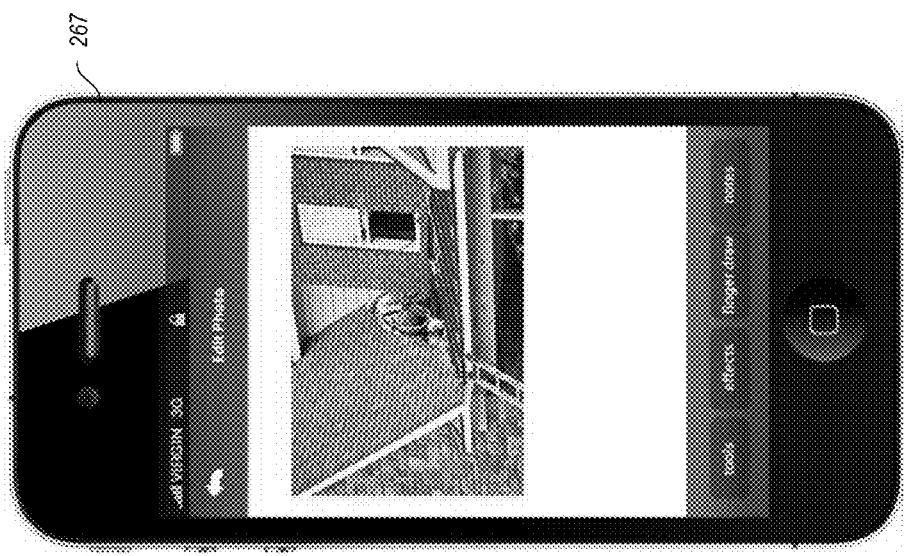
Figure 5G:
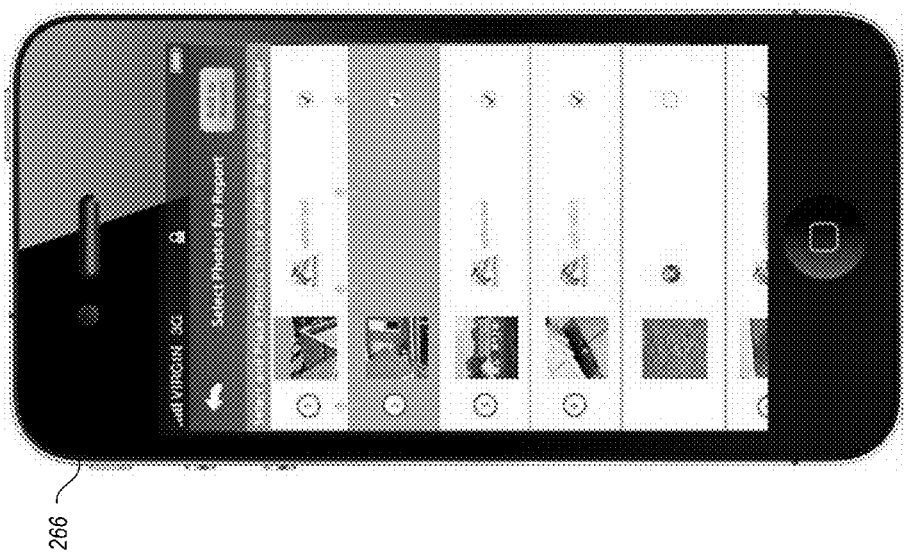

FIG. 5G shows screen 266 which allows the user to reorder the selected photos to be associated with the report.

FIG. 5H shows screen 267 which is displayed when the user selects the view/edit photos button in screen 264. This presents the photo editor component of the property management system. The photo editor gives a user the ability to modify, annotate, highlight, or add notes to a photo to enable the photo to more accurately describe a condition or situation related to the property. In one embodiment the photo editor uses utilities grouped under the "tools," "effects," "finger draw," and "notes."

Figure 5J:
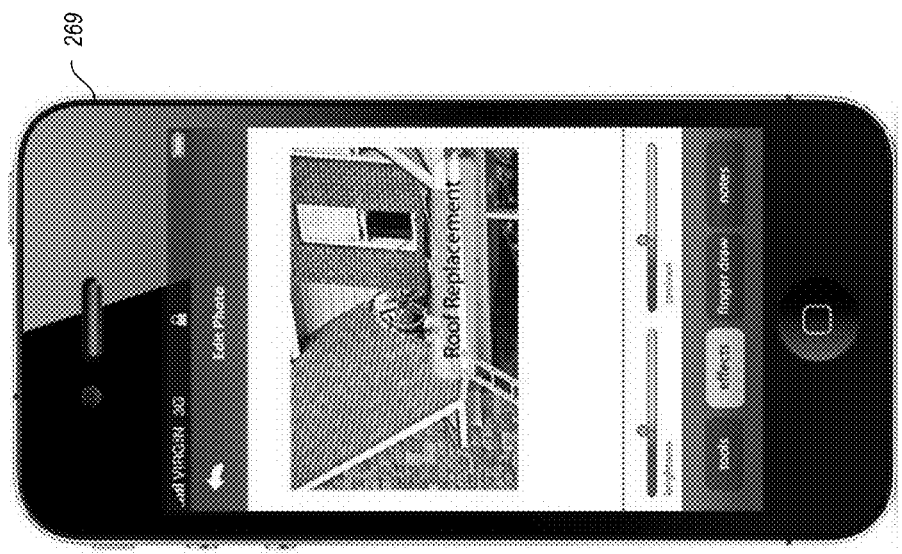
Figure 5I:
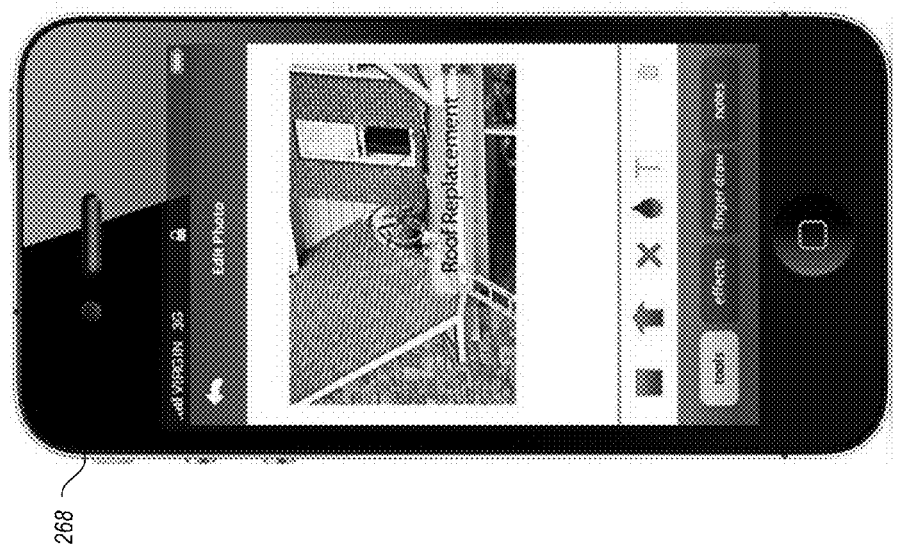

FIG. 5I shows screen 268 which is displayed when the user selects the tools button on the lower part of the screen. Tools include a square indicator which can be used to drag and drop a square on the image to highlight a particular area of the image, an arrow which can be used to point to a particular feature on an image to highlight the feature, an "X" that can be used to place an "X" on the image to identify or highlight a feature, a water drop to show areas of water damage, or a text box to place text directly on the screen.

FIG. 5J shows screen 269 which is displayed when the effects button is selected. This allows the brightness in the contrast of the image to be adjusted to make the image easier to view if it was photographed in harsh light, such as in the early morning.

Figure 5L:
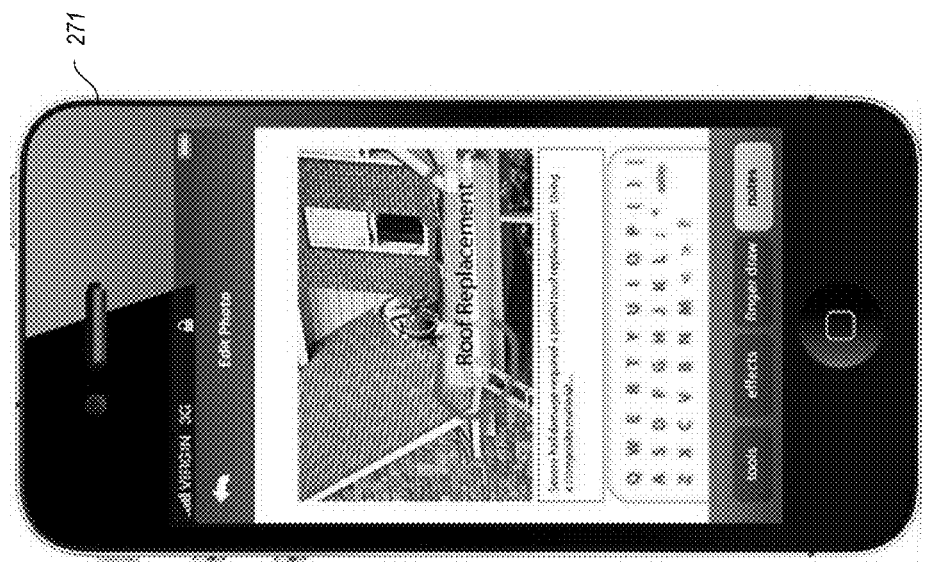
Figure 5K:
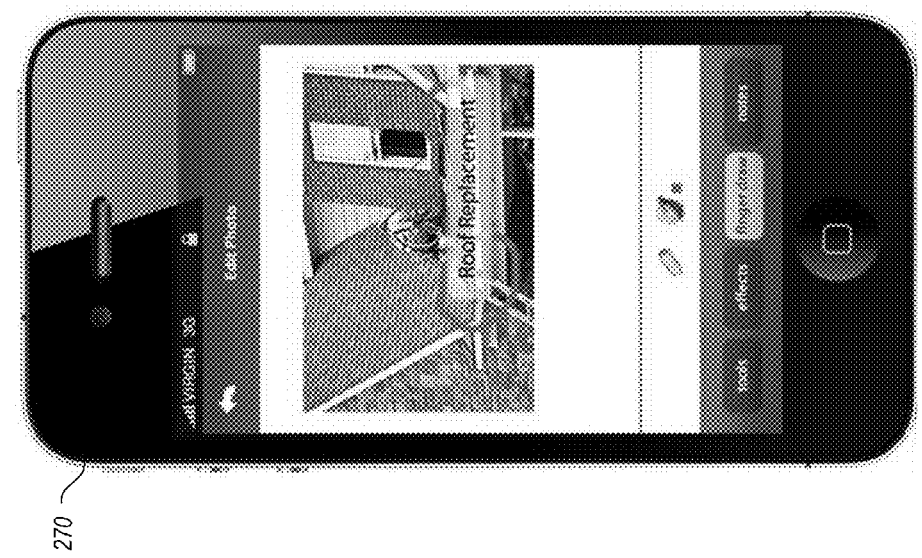

FIG. 5K shows screen 270 which is displayed when the user selects the finger draw to this tool allows the user to highlight areas of interest by drawing a line around the area using the user's finger.

FIG. 5L shows screen 271 which is displayed when the user selects the notes button. When selected, a keyboard is displayed that allows the user to enter in extended amounts of text describing features or damage to the area being viewed. This text is not displayed on the image, but is rather associated with the image and available for later viewing.

Figure 6:
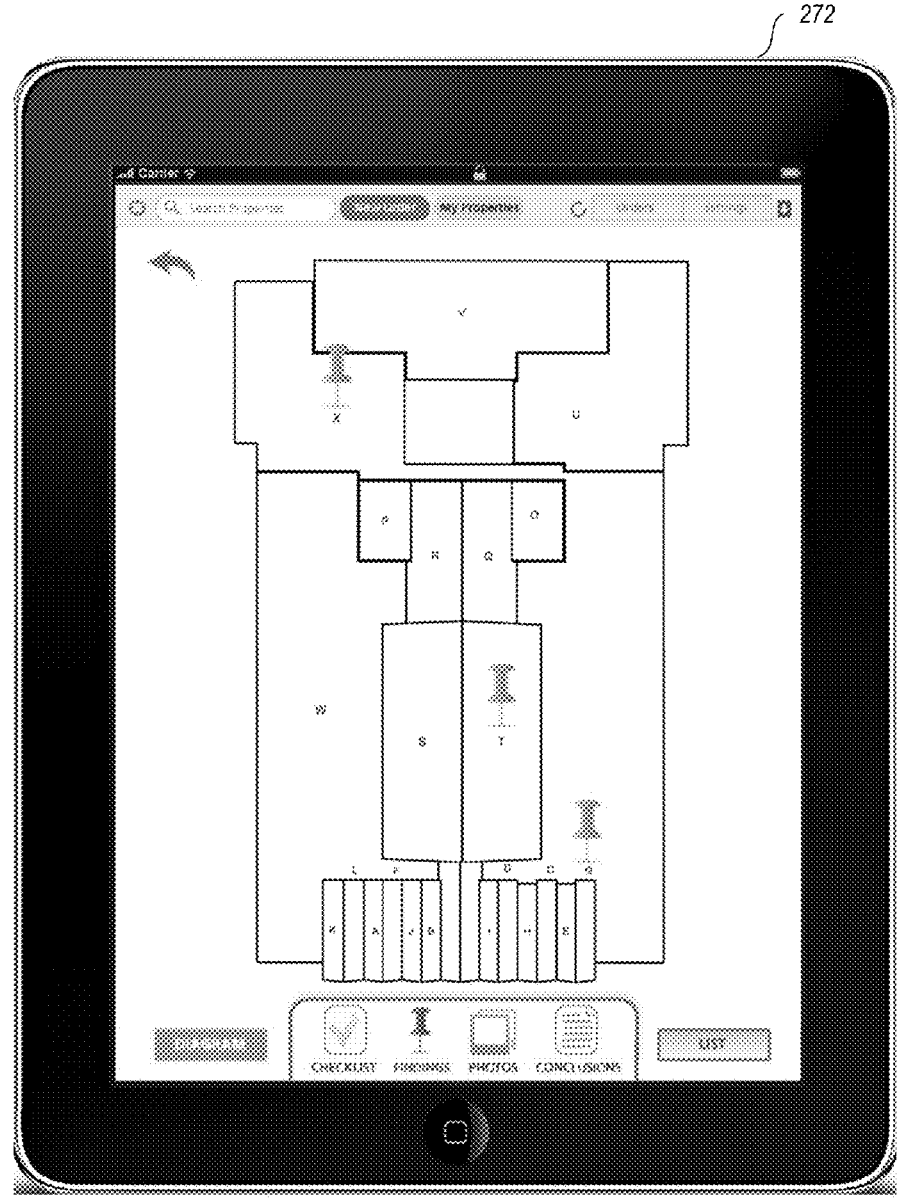
FIG. 6 is an example screenshot of a three-dimensional model used to capture, modify, and annotate building characteristics on a tablet device.

FIG. 6 shows screen 272 which is displayed when the user selects the inspection tool, which in one embodiment shows a top-down image of the building and allows a user to make annotations regarding the features and conditions of different areas of the structure. In one or more embodiments, this data is collected from two-dimensional or three-dimensional models that are captured in reports received by the property management system on the smartphone. In one example, the data from the reports received may be from an EagleView Technologies, Inc. roof report or walls report.

In some embodiments, annotations may include capturing or adding voice commentary, either as a running commentary or as part of the data package that is tied or tagged to a marker or indicator that is placed on a model or associated with a model.

This inspection tool has many advantages. For example, for an insurance claim adjuster in the field, the adjuster can use this tool to update the model of the building to represent additions to the building that did not appear in the model. The adjuster can also use this model for described damage done by hail, fire, or other disaster. Data needed to repair the defect, for example the type of material, the amount of material required, and the like may be represented on the diagram. In some embodiments, the materials may be able to be ordered directly from the screen using pricing estimator models.

Insurance underwriters may also use this tool to either augment or verify the risk management analysis of the property when determining insurability or premium amounts. For example, location of fire hydrants may be out of date or hard to see from aerial images. The existence and location of fire hydrants can be easily added using this tool.

In this embodiment, the user may identify different facets or areas of the structure, for example areas X, V, U and the like on the drawing to identify the facet or to associate related facets with each other. The user may also place pushpin icons in different areas on the structure to identify damage, or other features the user wishes to call out. In addition, the user can attach additional photos to this model, by using the camera within the tablet device or by associating an existing image with the model. In some embodiments, information can be retrieved by touching different areas of the image. For example, the user can tap a facet on the model to get information on that facet such as square footage or pitch. Finally, the user is able to record conclusions based on the on-site inspection work done at the represented building.

Pitch Determination

FIGS. 2Y-2AA, and FIGS. 7-13 describe systems and methods for determining the pitch of an object using a smartphone. For roofing contractors and other related trades that use the slope of a roof, a convenient, accurate assessment of the pitch angle of a section of roof is important. The ability to assess pitch using a mobile device like a smartphone or tablet computer while standing on the ground offers a faster, safer, and more convenient alternative to climbing onto the roof or scaling a ladder to directly assess a sloped section of a roof using mechanical or electronic pitch gauges that require physical contact with the measured surface.

One method to determine the pitch of an object uses the smartphone device in the capacity of a carpenter's level to directly measure pitch. FIG. 2Y shows one embodiment to determine the pitch of an object by placing the smartphone device at the desired pitch angle, and pressing the measure pitch button as shown. In this example, a level module determines the angle of the smartphone device by using the accelerometer data and orientation sensors within the smartphone to determine the angle of the smartphone in relation to level. In some embodiments, the smartphone device may be held against an angled rafter to determine its angle from level. FIG. 2Z shows one embodiment where the angle measurement is displayed on the smartphone device as a pitch value. FIG. 2AA shows another embodiment where the output of a pitch value for a facet of a building may be directly imported as a pitch measurement associated with a facet of the building that is represented in a two dimensional or three-dimensional model of the building.

Another embodiment of the method to determine the pitch of an object is based on using the smartphone device as a video-based carpenter's level as above. However, the actual smartphone device is not used as a physical carpenter's level. Instead, a fixed projected horizontal line is displayed on the smartphone camera display screen. The projected horizontal line stays fixed relative to the smartphone device, even though images on the camera display will move as the camera moves. To determine the pitch of one side of a gable of a house, the user stands away from the house, points the smartphone camera at the house to see the side of the gable to be measured within the camera's field of view. The user then rotates the smartphone until the projected horizontal line appears to be parallel to the side of the gable to be measured. This method uses the smartphone device's orientation sensors to determine the angle of the smartphone device and the resulting pitch of the gable. The accuracy of this method is improved as the user stands further away from the object to be measured.

Figure 7:
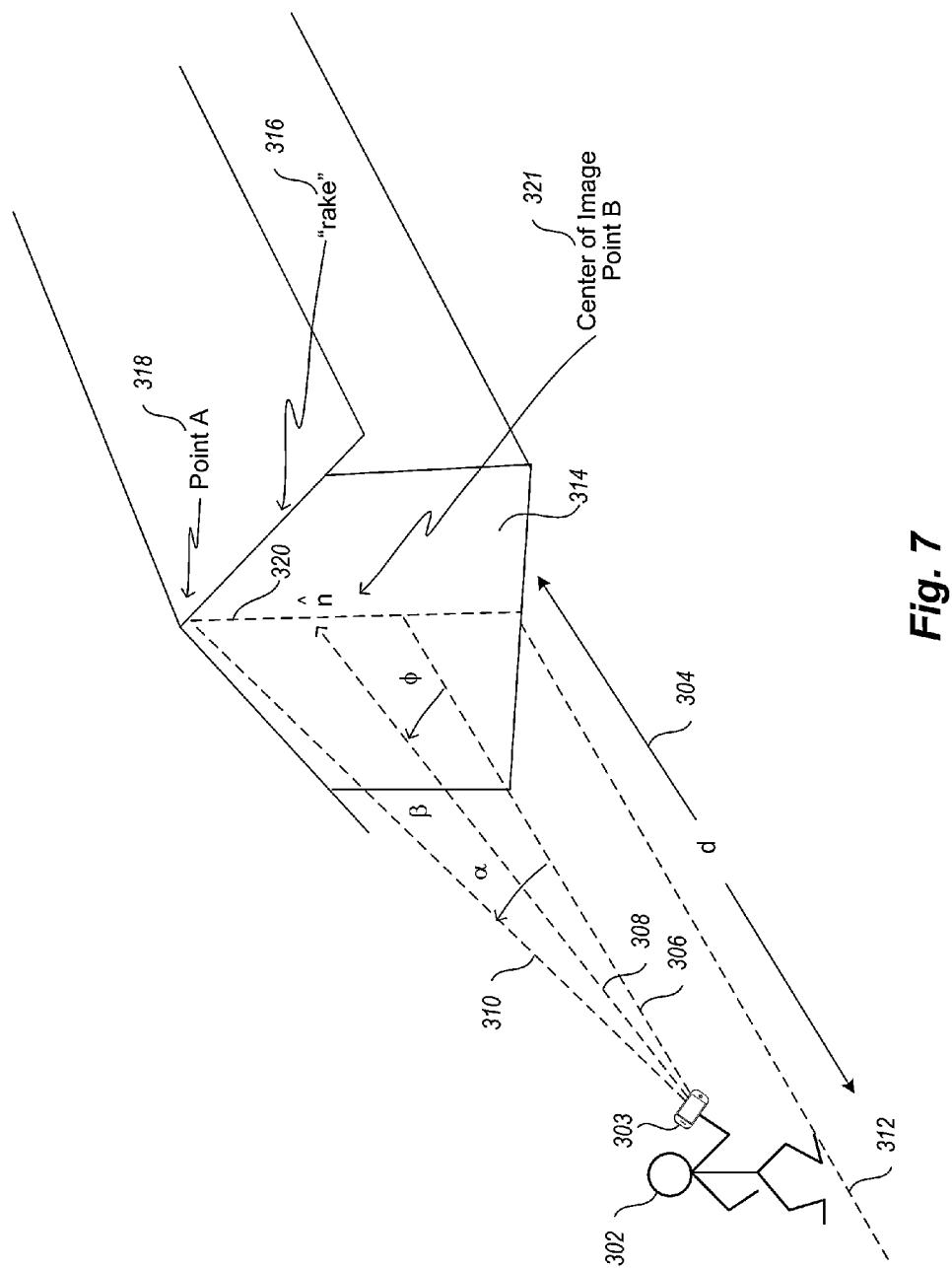
FIG. 7 is a diagram showing a part of a process for positioning the camera to determine the slope of an object at a distance using a smartphone.

Another method for determining the pitch of an object uses the smartphone device to capture an image and other optional metadata such as device orientation and information, and GPS location, and then draw markers on the image that overlay the surfaces where the pitch is to be determined. FIG. 7 shows a context diagram showing positions and angles for the disclosed method. A user with a smartphone 302 stands at a distance "d" 304 from a wall 314 to determine the angle of the rake 316 of the roof of the structure. The ground-level is represented by 312. Line 306 represents the level line between the smartphone 303 to the vertical line 320 passing through point A 318 of the structure. Line 308 represents the angle at which the smartphone 303 is being held in relation to Horizontal Line 306

Figure 10A:
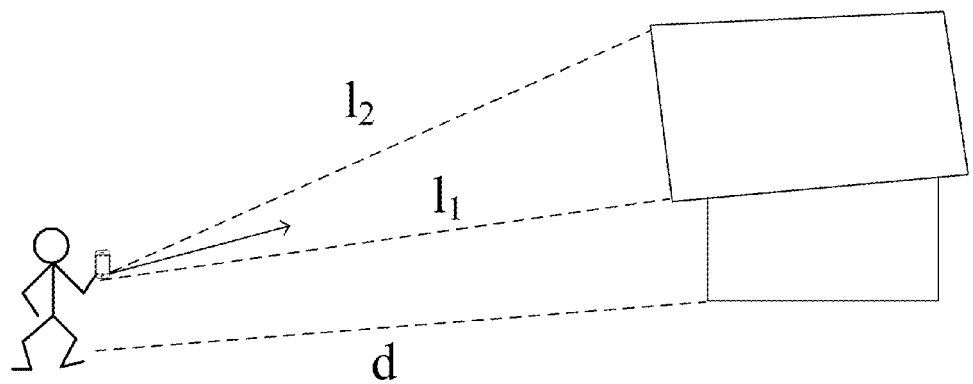
FIG. 10A is a diagram showing a part of a process for orienting the camera in a far field to determine the slope of an object at a distance using a smartphone.
Figure 10B:
FIG. 10B is a picture showing a part of a process for orienting the camera in a far field to determine the slope of an object at a distance using a smartphone.
Figure 12:
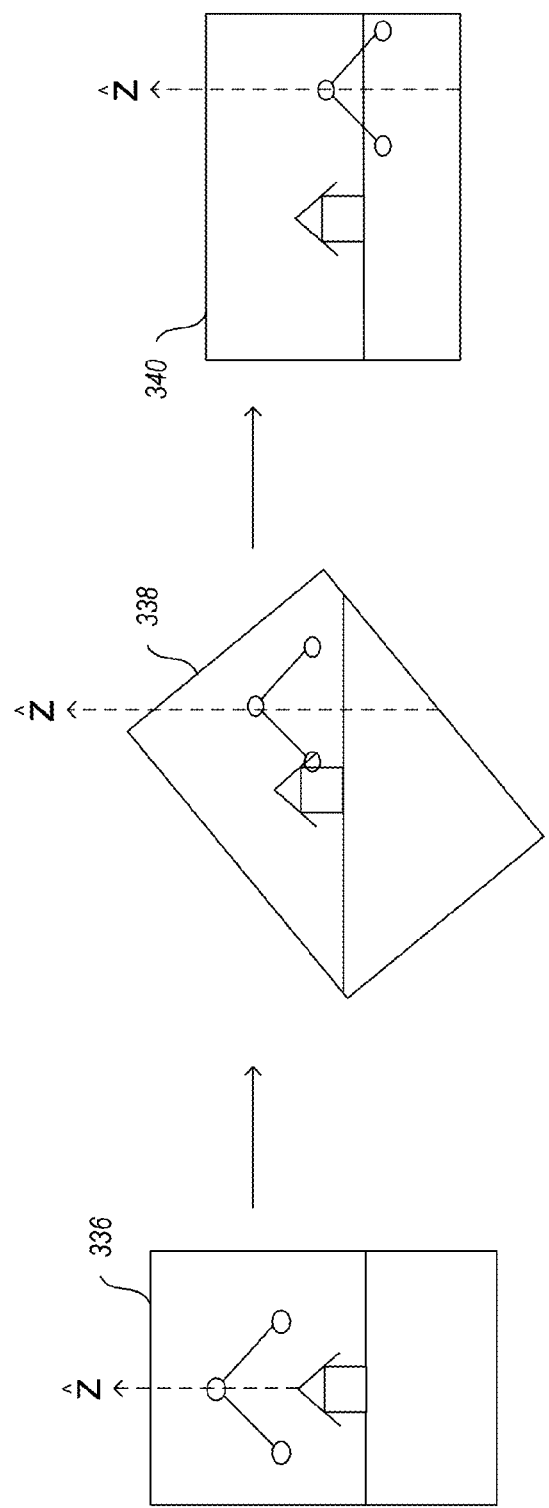
FIG. 12 is a diagram showing examples of manipulating a marker overlaid on image to determine the slope of an object at a distance using a smartphone.

FIG. 10B shows an example of a photo of a house taken with a smartphone camera, where the house has a gable feature 328. FIG. 12 shows an embodiment of a scissor marker that is a composite of two linear shapes formed by the line from point 330 to point 332, and the line from point 330 to 334, that visually present two angled surfaces commonly found on gables and gabled dormers 328. When applying this method of determining pitch, either a live image as seen on the smartphone camera display may be used, or a captured image may be used.

Figure 11:
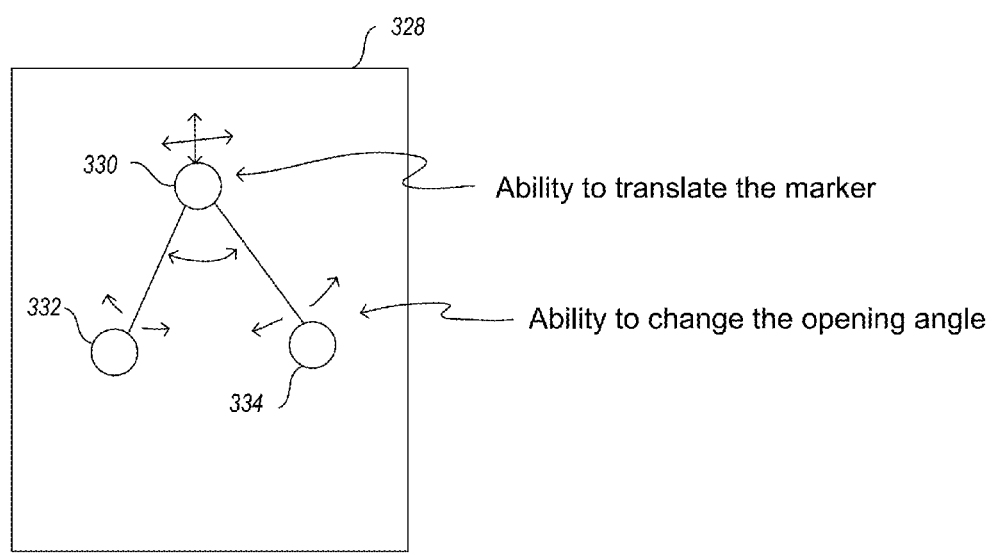
FIG. 11 is a diagram showing a part of a process involving a operation of a scissor marker which can be overlaid on image to determine the slope of an object at a distance using a smartphone.

FIG. 11 shows an example of a scissor marker within frame 328. 330 represents the top of the scissor marker which is typically placed at the vertex of the angle to be measured, for example the top peak of the gable structure. Moving point 330 will translate the entire marker either up or down on the image while leaving the angle of the scissor marker constant. To open or close the scissor marker, the user moves either point 332 or point 334 in the direction of the arrows shown, which changes the opening angle of the scissor marker.

FIG. 12 shows three different examples 336, 338, and 340 that show how the smartphone's orientation sensor can be used to maintain a proper vertical orientation of the scissor marker in a live image. This way, the user does not need to worry about the orientation of the smartphone in their hand, whether it is in portrait 336, landscape 340 or a skewed orientation mode 338 in between. When dealing with a live image on the camera, the camera can be moved until marker 330 is visually over the apex of the gable 328 to be measured. In that embodiment, the scissor marker may be fixed to a position on the screen such that the user can manipulate the opening angle, but cannot translate the marker's position. The user to manipulates the orientation of the smartphone, thereby manipulating the displayed image under the marker. Once the appropriate section of the image is under the fixed position of the scissor marker, the opening angle of the marker can be modified to match the angles of the underlying roof image.

Figure 8:
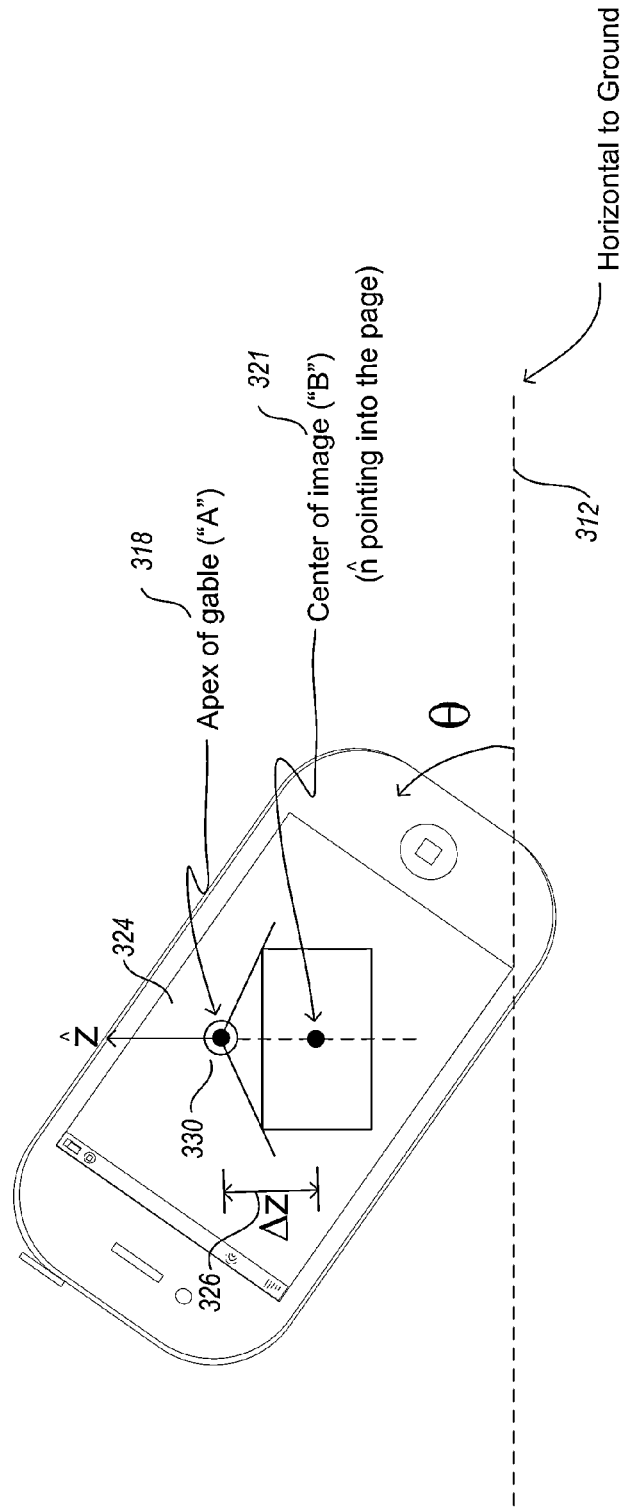
FIG. 8 is a diagram showing a part of a process for orienting the camera to determine the slope of an object at a distance using a smartphone.

For a captured image, FIG. 8 shows an embodiment where the orientation metadata captured with the image provides context by which the proper vertical orientation can be achieved. The scissor marker may be translated around the screen, by selecting 330 and moving it until it is visually over the apex of the gable 318. In one embodiment, this movement can be accomplished by the user touching marker 330 with a finger and dragging it to the proper location over the image. Likewise, the opening angle between the two linear shapes can be similarly adjusted by moving 332 and 334, either symmetrically or independently, to cause their corresponding lines that connect with 330 to overlay the edge of the gable image to be measured.

A scissor marker may exist in a number of embodiments. In one embodiment, a simple version is a half-scissor, for example consisting of a vertical reference and one adjustable arm. In another embodiment a more complex version may be a scissor that includes a third axes pointing orthogonal to the plane of the scissor. In this example, such a device could be used to orient and/or rotate the scissor cursor about the z-axis to compensate for an angle between the viewer and the gabled face. In another embodiment, the scissor curser allows the user to slide the apex of the cursor along that third axes, for example to tilt the plane of the scissor to access the pitch of a hipped face.

Figure 9A:
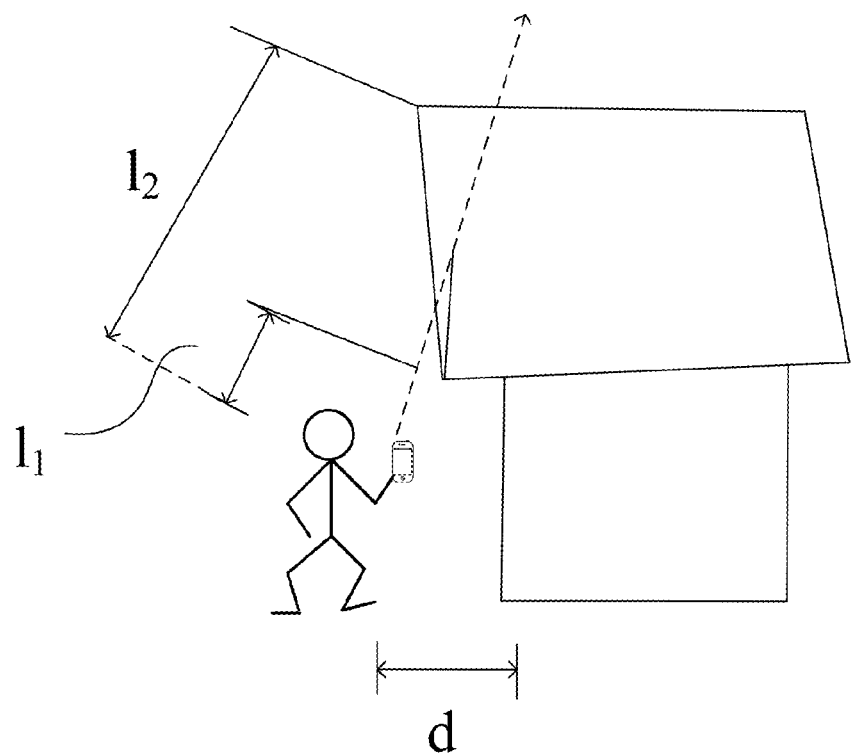
FIG. 9A is a diagram showing a part of a process for orienting the camera in a near field to determine the slope of an object at a distance using a smartphone.
Figure 9B:
FIG. 9B is a picture showing a part of a process for orienting the camera in a near field to determine the slope of an object at a distance using a smartphone.

In the above embodiments describing pitch determination, additional accuracy can be achieved by making corrections of perceived pitch due to the position of the smartphone's angle of observation. As the user approaches the building of interest, the horizontal distance from the user's mobile phone 303 to the gable as distance "d" 304 becomes smaller and the projection of the gable within the image will appear to "flatten out," and reduce the perceived pitch angle of the gable. This effect is illustrated in FIGS. 9A and 9B. By determining the angle "alpha," found in FIG. 7 between 306 and 310, the perceived pitch of the aligned pitch determination marker can be corrected to yield the correct pitch value. To determine angle "alpha," the smartphone's orientation sensors are used to capture the inclination of the smartphone device "phi", the angle of the "normal" vector 308 coming out of the camera with respect to the ground 306, either at the time of image capture by the smartphone or in real time when viewing a live image using the smartphone camera. Using the approximate knowledge of the angular field of view of the smartphone camera, the angle "beta", the angle between 308 and 310 is calculated using the pixel displacement of the location of the apex of the pitch determination marker 330 (in FIG. 8) that overlays Point A 318 (in FIG. 7) from the pixel located at the center of the image at Point B. The sum of the angle "beta" and the angle "phi" yields the desired value for the angle "alpha."

Figure 13:
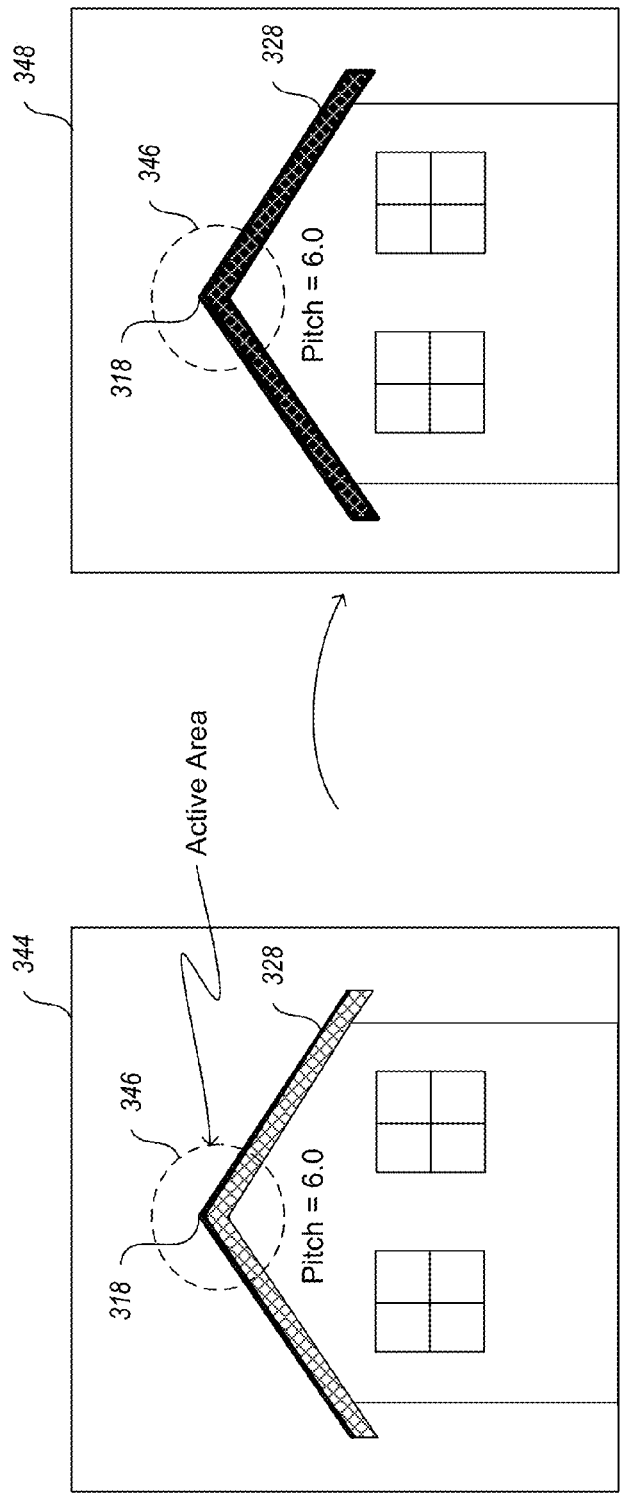
FIG. 13 is a diagram showing examples of selecting a marker overlaid on image to determine the slope of an object at a distance using a smartphone.

FIG. 13 describes another embodiment of the method for determining pitch, where the apex 318 of a gabled roof section is aligned with an active region 346. This active region may be identified as a dashed circle 346 that appears on the camera display of smartphone 303. In one or more embodiments this active region 346 may be moved by selecting and dragging it on a still frame of an image. The active region 346 may also be in a fixed position within a live image such that the user must move the smartphone camera to translate the desired roof apex in the live image under the active region. Once the active region is in position, computer vision algorithms which in one or more embodiments involve edge algorithms or boundary detection algorithms are used to assess the opening angle of the gable 328 and report its respective pitch value. In one or more embodiments, a pitch determination marker value is displayed, along with a highlight on the image to show the identified edges used to determine the pitch.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a smartphone device that includes a client property management database;
a server operably connected to the smartphone device, the server including a server property management database that is synchronized at least in part with the client property management database when changes are made to the client property management database on the smartphone device; and
a non-transitory memory connected to a processor within on the smartphone device, the non-transitory memory having computer-executable instructions stored thereon that, when executed by the processor, cause the processor to:
receive information identifying one or more properties, send an order for a roof report for the one or more properties to the server,
receive the roof report for the one or more properties from the server,
synchronize the client property management database on the smartphone device with the server property management database by storing the roof report for the one or more properties received from the server in the client property management database and updating the client property management database when the roof report is changed in the server property management database on the server,
obtain an image representing a facet of a roof of a structure on the one or more properties, wherein the image contains an orientation value of an inclination relative to level of a camera that captured the image when the image was captured,
calculate a pitch of the facet using an angle at a common node of a scissor marker overlaid on the image,
adjust the calculated pitch of the facet based on the orientation value of the camera and a position of the common node in the image,
wherein adjusting the calculated pitch of the facet of the object comprises:
determining an angle of inclination of the smartphone device, and
calculating an angular field of view based on a pixel displacement of the position of the common node from a center pixel location of the image;
update the roof report with the adjusted calculated pitch of the facet, and
output at least a portion of the roof report on the smartphone device.

2. A method, comprising:
receiving information identifying one or more properties;
sending an order for a roof report for the one or more properties to a server, the server including a server property management database;
receiving the roof report for the one or more properties from the server;
synchronizing a client property management database with the server property management database by storing the roof report for the one or more properties received from the server on the client property management database and updating the client property management database when the roof report is changed in the server property management database;
obtaining an image representing a facet of a roof of a structure on the one or more properties, wherein the image contains an orientation value of a camera that captured the image when the image was captured, the orientation value is indicative of an inclination of the camera with respect to level;
calculating a pitch of the facet using an angle at a common node of a scissor marker overlaid on the image;

adjust the calculated pitch of the facet based on the orientation of the camera and a position of the common node in the image;

wherein adjusting the calculated pitch of the facet of the object comprises:

determining an angle of inclination of the smartphone device, and calculating an angular field of view based on a pixel displacement of the position of the common node from a center pixel location of the image; and updating the roof report with the adjusted calculated pitch of the facet.

3. A system for measuring the pitch of an object in an image, comprising:

a smartphone device;

a camera of the smartphone device structured to capture an image of a facet of an object for which a pitch is to be determined;

a non-transitory memory connected to a processor within the smartphone device, the non-transitory memory having computer-executable instructions stored thereon that, when executed by the processor, cause the processor to:

receive the image representing the facet of the object for which the pitch is to be determined, wherein the image contains image metadata information with an orientation value indicative of an inclination of the camera relative to level when the image was captured by the camera;

generate a three-dimensional model of the object with the facet based on the image and the image metadata information;

receive a scissor marker from a user that overlays the image and identifies the facet of the object for which the pitch is to be determined, the scissor marker including, two lines joined at a common node that form an angle;

calculate the pitch of the facet of the object using the angle of the scissor marker created at the common node from the two lines;

adjust the calculated pitch of the facet of the object based on the orientation value of the camera and a position of the common node in the image;

wherein adjusting the calculated pitch of the facet of the object comprises:

determining an angle of inclination of the smartphone device, and calculating an angular field of view based on a pixel displacement of the position of the common node from a center pixel location of the image;

import the adjusted calculated pitch of the facet into the three-dimensional model; and output the adjusted calculated pitch of the facet of the object to the smartphone device.

4. A method for measuring the pitch of an object in an image, comprising:

capturing, by a camera, an image representing a facet of an object for which a pitch is to be determined, wherein the image contains image metadata information with an orientation value of an inclination of the camera relative to level when the image was captured;

generating a three-dimensional model of the object with the facet based on the image and the image metadata information;

receiving, at a computing device, a scissor marker from a user that overlays the image and identifies the facet of the object for which a pitch is to be determined, the scissor marker including two lines joined at a common node that form an angle;

computing, by the computing device, the pitch of the facet of the object using the angle of the scissor marker created at the common node from the two lines;

adjusting, by the computing device, the computed pitch of the facet of the object based on the orientation value of the camera and a position of the common node in the image;

wherein adjusting the computed pitch of the facet of the object comprises:

determining, an angle of inclination of the smartphone device, and calculating an angular field of view based on a pixel displacement of the position of the common node from a center pixel location of the image;

importing the adjusted computed pitch of the facet into the three-dimensional model; and outputting the adjusted computed pitch of the facet of the object to the computing device.

5. The system of claim 1, wherein the smartphone includes the camera; and wherein send an order for a roof report further includes send at least one image captured with the smartphone camera of the roof of the structure on the one or more properties.

6. The system of claim 1, wherein send an order for a roof report further includes send text information to include as a part of the roof report.

7. The system of claim 1, wherein send an order for a roof report further includes send a request to receive only those portions of the roof report on the server property management database that are newer than corresponding portions of a corresponding roof report located on the client property management database; and wherein store the roof report further includes store the received portions of the roof report on the client property management database.

8. The system of claim 1, wherein receive the roof report further includes:

determine a bandwidth of a data connection between the smartphone device and the server; and based upon the determined bandwidth, receive data associated with the order at predetermined intervals.

9. The method of claim 2, wherein sending an order for a roof report further includes sending at least one image of the roof of the structure on the one or more properties.

10. The method of claim 2, wherein sending an order for a roof report further includes sending a request to receive only those portions of the roof report on the server property management database that are newer than corresponding portions of a corresponding roof report located on the client property management database; and wherein storing the roof report further includes storing the received portions of the roof report on the client property management database.

11. The method of claim 2, wherein receiving the roof report for the one or more properties from the server further includes receiving information about the surrounding area of the one or more properties.

12. The method of claim 2, wherein receiving the roof report for the one or more properties from the server further includes receiving the roof report from the server at predetermined times of the day.

13. The system of claim 3 wherein calculate the pitch of the object further comprises:
   adjust the scissor marker to position the common node at an apex of a gable in the image; and
   adjust the angle of the two lines to match the angle of the underlying roof.

14. The system of claim 3, wherein the scissor marker is one line connected to a node having a vertical reference; and
   wherein calculate the pitch of the object further includes:
   adjust the scissor marker to position the common node at an apex of a gable in the image, and
   adjust the angle of the line to match one facet of the underlying roof.

15. The method of claim 4, wherein computing the pitch of the object further comprises:
   adjusting the scissor marker to position the common node at an apex of a gable in the image; and
   adjusting the angle of the two lines to match the angle of the underlying roof.

16. The method of claim 4, wherein the scissor marker is one line connected to a node having a vertical reference; and
   wherein computing the pitch of the object further includes:
   adjusting the scissor marker to position the common node at an apex of a gable in the image, and
   adjusting the angle of the line to match one facet of the underlying roof.

17. The method of claim 4, wherein the image is one of a live image and a stored image.

18. The system of claim 3, further comprising:
   at least one orientation sensor of the smartphone device structured to obtain the orientation value of the camera, the orientation value including an angle of observation from the camera to the object relative to level.

\* \* \* \* \*

UNITED STATES PATENT AND TRADEMARK OFFICE
CERTIFICATE OF CORRECTION

PATENT NO. : 9,959,581 B2
APPLICATION NO. : 13/844552
DATED : May 1, 2018
INVENTOR(S) : Chris Pershing Page 1 of 1

It is certified that error appears in the above-identified patent and that said Letters Patent is hereby corrected as shown below:

On the Title Page

Page 2: Column 2, Line 9:
Under (56) References Cited, U.S. Patent Documents: After "2012/0035887 A1* 2/2012 Augenbraun et al. .........703/1" insert -- 2012/0101783 4/2012 Stephens et al --

Signed and Sealed this
Thirteenth Day of November, 2018

Andrei Iancu
*Director of the United States Patent and Trademark Office*